United States Patent
Ootsuki et al.

(10) Patent No.: US 8,366,962 B2
(45) Date of Patent: *Feb. 5, 2013

(54) POLYMERIZABLE LIQUID CRYSTAL COMPOUNDS HAVING OXIRANYL GROUP, POLYMERIZABLE LIQUID CRYSTAL COMPOSITIONS AND POLYMERS

(75) Inventors: Daisuke Ootsuki, Chiba (JP); Junichi Inagaki, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 12/961,924

(22) Filed: Dec. 7, 2010

(65) Prior Publication Data

US 2011/0147656 A1    Jun. 23, 2011

(30) Foreign Application Priority Data

Dec. 17, 2009  (JP) ................................. 2009-286144
Oct. 20, 2010  (JP) ................................. 2010-235405

(51) Int. Cl.
*C09K 19/00* (2006.01)
*C09K 19/02* (2006.01)
*C09K 19/06* (2006.01)
*C09K 19/52* (2006.01)
*G02F 1/1333* (2006.01)

(52) U.S. Cl. ........... 252/299.6; 252/299.01; 252/299.61; 252/299.63; 428/1.1; 428/1.3; 349/1; 349/56; 349/182; 528/421

(58) Field of Classification Search ............. 252/299.01, 252/299.6, 299.61, 299.63; 428/1.1, 1.3; 349/1, 56, 182; 528/421
See application file for complete search history.

(56) References Cited

U.S. PATENT DOCUMENTS

2010/0117027 A1* 5/2010 Hirai et al. ............... 252/299.61
2011/0086185 A1* 4/2011 Ootsuki et al. ............ 428/1.3

FOREIGN PATENT DOCUMENTS

| DE | 10004442 | 9/2000 |
|----|----------|--------|
| JP | 07-017910 | 1/1995 |
| JP | 09-316032 | 12/1997 |
| JP | 2005-206814 | 8/2005 |
| JP | 2008-110948 | 5/2008 |
| JP | 2008-239567 | 10/2008 |
| JP | 2008-239569 | 10/2008 |

OTHER PUBLICATIONS

Mallon et al., "Synthesis and Characterization of Novel Epoxy Monomers and Liquid Crystal Thermosets", Journal of Polymer Science: Part A: Polymer Chemistry, 1993, 31(9), 2249-2260.
S. Jahromi, "Synthesis and photoinitiated polymerization of liquid crystalline diepoxides", Polymer, 1994, vol. 35, No. 3, 622-629.

\* cited by examiner

*Primary Examiner* — Geraldina Visconti
(74) *Attorney, Agent, or Firm* — J.C. Patents

(57) ABSTRACT

The main aim of the invention is to provide a polymerizable liquid crystal compound that has a liquid crystal phase with a wide temperature range centering at room temperature, has an excellent compatibility with another polymerizable liquid crystal compound, has an excellent solubility in an organic solvent and is polymerizable even in air by heat or light. A polymerizable liquid crystal compound represented by formula (1-1) or formula (1-2):

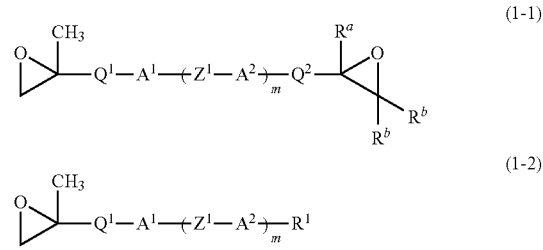

wherein $A^1$ and $A^2$ are a divalent cyclic-structure group such as cyclohexylene and phenylene; $Z^1$ is a bonding group such as a single bond and —O—; m is an integer from 1 to 5; $Q^1$ and $Q^2$ are alkylene having 1 to 20 carbons; $R^1$ is fluorine, cyano, trifluoromethyl, trifluoromethoxy, alkyl, alkoxy and so forth; and $R^a$ and $R^b$ is hydrogen, halogen or alkyl.

30 Claims, No Drawings

POLYMERIZABLE LIQUID CRYSTAL COMPOUNDS HAVING OXIRANYL GROUP, POLYMERIZABLE LIQUID CRYSTAL COMPOSITIONS AND POLYMERS

CROSS-REFERENCE TO RELATED APPLICATION

This application claims the priority benefit of Japan application serial no. 2009-286144, filed on Dec. 17, 2009 and Japan application serial no. 2010-235405, filed on Oct. 20, 2010. The entirety of each of the above-mentioned patent applications is hereby incorporated by reference herein and made a part of specification.

BACKGROUND OF THE INVENTION

1. Field of the Invention

The present invention relate to a polymerizable liquid crystal compound, a polymerizable liquid crystal composition including the compound and a polymer formed by the polymerization of the compound or the composition.

2. Related Art

A polymerizable liquid crystal compound has recently been utilized for a polymer having optical anisotropy such as a polarizing plate and an optical retardation plate. This is because the compound exhibits optical anisotropy in the liquid crystal state and then the oriented state is fixed by polymerization. The kinds of optical characteristics required for a polymer having optical anisotropy are different depending on a purpose for use, and a compound having characteristics that suit the purpose is necessary. In the compound used for such a purpose, characteristics regarding its polymer are important in addition to the characteristic of optical anisotropy. Characteristics required for the polymer include the rate of polymerization, transparency, mechanical strength, applicability, solubility, the degree of crystallinity, shrinkage, water permeability, water absorptivity, melting points, glass transition temperature, clearing points, chemical resistance and thermal resistance.

A compound having an acryloyloxy group as a polymerizable group among polymerizable liquid crystal compounds has been widely used for such purposes (patent documents Nos. 1 and 2). The acrylate has a high reactivity and the polymer derived from it has a high transparency. However, it is necessary to carry out the reaction in an atmosphere of an inert gas and to increase energy of ultraviolet irradiation, since the type of the reaction is radical polymerization. Thus, an improvement of workability such as curing in air has been required. On the other hand, a compound having an oxiranyl group is also utilized for such purposes (non-patent documents Nos. 1 and 2). The oxiranyl compound is excellent in curability in air and in workability for the curing, since cationic polymerization is not inhibited by oxygen. However, the oxiranyl compound is not preferable to the acrylate in its reactivity. The polymers of these compounds have been required to be improved in characteristics such as heat resistance, shrinkage, adhesive properties, adhesion and mechanical strength in addition to the characteristics described above. The polymers is used as ink in which an organic solvent is added to the polymers for the purpose of adjusting applicability. A polymerizable liquid crystal compound, a photopolymerization initiator, a surfactant and so forth are dissolved in an organic solvent, forming the ink, in which the viscosity of the solution and the leveling properties and so forth are adjusted, for the production of a film having optical anisotropy (which is expressed as an optically anisotropy film in this invention). The ink is applied to a transparent substrate that has been aligned, the solvent is dried, and then the polymerizable liquid crystal compound is oriented. Next, the compound is polymerized with ultraviolet irradiation or by heating, and thus the oriented state is fixed. An organic solvent such as propylene glycol monoethyl ether acetate (PG-MEA) is desirable for a solvent used in this procedure in view of environmental load and safety (mutagenicity and toxicity). However, the compounds disclosed in non-patent documents Nos. 1 and 2 have not a high solubility in such a solvent for preparing the ink with a suitable concentration.

3. Prior Art

Conventional compounds are disclosed in the following patent documents: No. 1, JP H07-017910 A (1995); and No. 2, JP H09-316032 A (1997).

Conventional compounds are disclosed in the following non-patent documents: No. 1, Polymer Chemistry, 1993, 31 (9), 2249-60; and No. 2, Polymer, 1994, 35 (3), 622-9.

SUMMARY OF THE INVENTION

The invention concerns a polymerizable liquid crystal compound shown in the following item [1], and concerns a composition including the compound, a polymer or a film formed from the compound or the composition, and a liquid crystal display device containing the film.

[1] A polymerizable liquid crystal compound represented by formula (1-1) or formula (1-2):

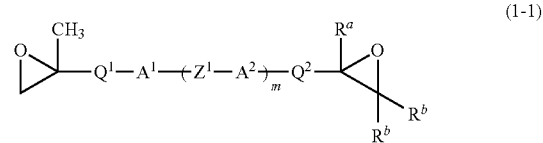

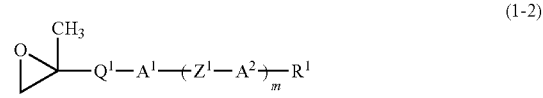

wherein $A^1$ and $A^2$ are each independently 1,4-cyclohexylene, 1,4-phenylene, pyridine-2,5-diyl, pyrimidine-2,5-diyl, naphthalene-2,6-diyl, tetrahydronaphthalene-2,6-diyl, fluorene-2,7-diyl, 1,3-dioxane-2,5-diyl, triptycene-1,4-diyl or phenylnorbornene-1,4-diyl, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl; $Z^1$ is independently a single bond, —O—, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—; m is an integer from 1 to 5, and when m is 2 or more, arbitrary two of $Z^1$ may be the same bonding groups or different groups and arbitrary two of $A^2$ may be the same rings or different rings; $Q^1$ and $Q^2$ are each independently alkylene having 1 to 20 carbons, and in the alkylene, arbitrary hydrogen may be replaced by fluorine or chlorine and arbitrary —CH$_2$— may be replaced by —O—, —COO—, —OCO—, —CH=CH— or —C≡C—; $R^1$ is hydrogen, fluorine, chlorine, cyano, trifluoromethyl, trifluoromethoxy, alkyl having 1 to 20 carbons or alkoxy having 1 to 20 carbons; $R^a$ is hydrogen, halogen or alkyl having 1 to 5 carbons; and $R^b$ is independently hydrogen, halogen or alkyl having 1 to 5 carbons.

DETAILED DESCRIPTION OF THE INVENTION

One of the advantages of the invention is to provide a polymerizable liquid crystal compound that has a liquid crystal phase with a wide temperature range centering at room temperature, has an excellent compatibility with another polymerizable liquid crystal compound, has an excellent solubility in an organic solvent and is polymerizable even in air by heat or light. Another advantage is to provide an optically anisotropic polymer that has a plurality of excellent characteristics among characteristics such as transparency, mechanical strength, shrinkage, water permeability, water absorptivity, melting points, glass transition temperature, clearing points, chemical resistance and thermal resistance. A further advantage is to provide a liquid crystal display device containing the optically anisotropic polymer.

It was a characteristic of the polymerizable liquid crystal compound of the invention that the compound had an oxiranyl group as a polymerizable group, had a methyl group at α position of the oxiranyl group, and underwent cationic polymerization. The polymerizable liquid crystal compound satisfied a plurality of such characteristics that it had a liquid crystal phase with a wide temperature range centering at room temperature, it had an excellent compatibility with another polymerizable liquid crystal compound, the solubility in organic solvent was high, it polymerized at room temperature, it polymerized even in air, it polymerized by heat, it polymerized by light, it was easily polymerized, it was stable chemically, and it was colorless. Desirable characteristics were that the solubility in a highly safe solvent was excellent when the compound was used especially for ink. A film formed by polymerization from this polymerizable liquid crystal compound satisfied a plurality of such characteristics that it had a suitable optical anisotropy, it was hard to be peeled from a supporting substrate, it had a sufficient hardness, it was transparent and colorless, the heat resistance was large, the weather resistance was large, and the photoelasticity was small. Thus, the optically anisotropic film of the invention could be utilized for elements of a liquid crystal display device, such as an optical retardation plate, a polarizer, an antireflection film, a selective reflection film, a brightness enhancement film and a viewing angle-compensation film.

The terms used in the invention will be explained first. The meanings of the term "liquid crystal" or "liquid crystalline" in this specification are not limited to characteristics having a liquid crystal phase, and includes also characteristics in which a compound can be used as a component of a liquid crystal composition when mixed with another liquid crystal compound, even though the compound itself does not have a liquid crystal phase. A compound represented by formula (1-1) may be abbreviated to "the compound (1-1)", and the same applies to a compound represented by another formula. The term "arbitrary" used for the explanation of the symbols in chemical formulas means that "not only the position of an element (or a functional group) but also its number can be selected without restriction". For example, the expression "arbitrary hydrogen may be replaced by A, B or C," means that one of hydrogens may be replaced by any one of A, B or C, and that arbitrary two of hydrogens may be replaced by a combination of A and A, B and B or C and C, and also that arbitrary two of hydrogens may be replaced by a combination of A and B, B and C or C and A. The same applies to the expression such as "in the alkylene, arbitrary —$CH_2$— may be replaced by a divalent group such as —O—." However, —$CH_2$—$CH_2$— is not replaced by adjacent two divalent groups such as —O—O—.

In the structural formula in which a substituent is bonded to carbon constituting a ring and the carbon is not specified, the substituent may be bonded to any carbon constituting the ring within a chemically reasonable extent. When the same symbols are used in a plurality of formulas, the definition of the symbols is the same, and substituents represented by the symbols may be the same or may be different in a plurality of the formulas. Incidentally, the unit, gram (g), in Examples means a value of gram displayed in a digital analytical balance. Values of percentage by weight or parts by weight are based on values thus measured.

The invention includes item [1] described above and the following item [2] to item [29].

[2] The polymerizable liquid crystal compound according to [1], wherein $A^1$ and $A^2$ are each independently 1,4-cyclohexylene, 1,4-phenylene, naphthalene-2,6-diyl or fluorene-2,7-diyl, and in the 1,4-phenylene and fluorene-2,7-diyl, arbitrary one or two hydrogens may be replaced by fluorine, methyl or trifluoromethyl.

[3] The polymerizable liquid crystal compound according to [1] or [2], wherein $Z^1$ is independently a single bond, —COO—, —COO—, —CH=CH—COO—, —$CH_2CH_2$—COO—, —OCO—CH=CH—, —OCO—$CH_2CH_2$—, —$CH_2CH_2$— or —C≡C—; and m is an integer from 1 to 3.

[4] The polymerizable liquid crystal compound according to [1] or [2], wherein $Z^1$ is independently a single bond, —COO— or —OCO—; and m is 1 or 2.

[5] The polymerizable liquid crystal compound according to any one of [1] to [4], wherein $Q^1$ and $Q^2$ are each independently alkylene having 2 to 15 carbons, and in the alkylene, arbitrary —$CH_2$— may be replaced by —O—, —COO— or —OCO—; and $R^1$ is hydrogen, fluorine, cyano, trifluoromethyl, trifluoromethoxy, alkyl having 1 to 8 carbons or alkoxy having 1 to 8 carbons.

[6] The polymerizable liquid crystal compound according to any one of [1] to [5], wherein $R^a$ is hydrogen or methyl; and $R^b$ is independently hydrogen, methyl or ethyl.

[7] The polymerizable liquid crystal compound according to [1], wherein in formula (1-1), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ and $Q^2$ are each independently alkylene having 2 to 15 carbons, and in the alkylene, arbitrary —$CH_2$— may be replaced by —O—, —COO— or —OCO—; and $R^a$ and $R^b$ are hydrogen.

[8] The polymerizable liquid crystal compound according to [1], wherein in formula (1-1), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ and $Q^2$ are each independently alkylene having 2 to 15 carbons, and in the alkylene, arbitrary —$CH_2$— may be replaced by —O—, —COO— or —OCO—; $R^a$ is methyl; and $R^b$ is hydrogen.

[9] The polymerizable liquid crystal compound according to [1], wherein in formula (1-2), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ is alkylene having 2 to 15 carbons, and in the alkylene, arbitrary —$CH_2$— may be replaced by —O—, —COO— or —OCO—; and $R^1$ is hydrogen, fluorine, cyano, trifluoromethyl, trifluoromethoxy, alkyl having 1 to 8 carbons or alkoxy having 1 to 8 carbons.

[10] A polymerizable liquid crystal composition including at least one of compounds according to any one of [1] to [9].

[11] A polymerizable liquid crystal composition including at least one polymerizable liquid crystal compound selected from the group of compounds represented by formula (1-1) and formula (1-2), and at least one compound selected from the group of compounds represented by formula (M1) and formula (M2):

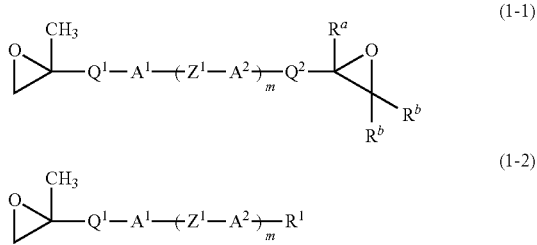

(1-1)

(1-2)

wherein $A^1$ and $A^2$ are each independently 1,4-cyclohexylene, 1,4-phenylene, pyridine-2,5-diyl, naphthalene-2,6-diyl, tetrahydronaphthalene-2,6-diyl, fluorene-2,7-diyl, 1,3-dioxane-2,5-diyl, triptycene-1,4-diyl or phenylnorbornene-1,4-diyl, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl;

$Z^1$ is independently a single bond, —O—, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—;

m is an integer from 1 to 5, and when m is 2 or more, arbitrary two of $Z^1$ may be the same bonding groups or different bonding groups and arbitrary two of $A^2$ may be the same rings or different rings;

$Q^1$ and $Q^2$ are each independently alkylene having 1 to 20 carbons, and in the alkylene, arbitrary hydrogen may be replaced by fluorine or chlorine, and arbitrary —CH$_2$— may be replaced by —O—, —COO—, —OCO—, —CH=CH— or —C≡C—;

$R^1$ is hydrogen, fluorine, chlorine, cyano, trifluoromethyl, trifluoromethoxy, alkyl having 1 to 20 carbons or alkoxy having 1 to 20 carbons;

$R^a$ is hydrogen, halogen or alkyl having 1 to 5 carbons; and $R^b$ is independently hydrogen, halogen or alkyl having 1 to 5 carbons; and P$^2$-Q$^3$-A$^3$-(Z$^2$-A$^4$)$_n$-Q$^3$-P$^2$      (M1)

P$^2$-Q$^3$-A$^3$-(Z$^2$-A$^4$)$_n$-R$^2$      (M2)

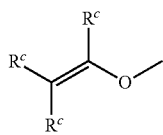

(p-1)

-continued

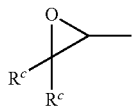

(p-2)

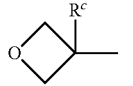

(p-3)

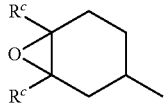

(p-4)

wherein $A^3$ and $A^4$ are each independently 1,4-cyclohexylene, 1,4-phenylene, naphthalene-2,6-diyl, fluorene-2,7-diyl, 1,3-dioxane-2,5-diyl, triptycene-1,4-diyl or phenylnorbornene-1,4-diyl, and in the 1,4-phenylene and fluorene-2,7-diyl, arbitrary hydrogen may be replaced by fluorine or chlorine, and arbitrary one or two hydrogens may be replaced by cyano, methyl, ethyl, methoxy, hydroxy, formyl, acetoxy, acetyl, trifluoroacetyl, difluoromethyl or trifluoromethyl;

$Z^2$ is independently a single bond, —O—, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—;

n is an integer from 1 to 5, and when n is 2 or more, arbitrary two of $Z^2$ may be the same bonding groups or different bonding groups and arbitrary two of $A^4$ may be the same rings or different rings;

$Q^3$ is independently alkylene having 2 to 20 carbons, and in the alkylene, arbitrary hydrogen may be replaced by fluorine or chlorine, and arbitrary —CH$_2$— may be replaced by —O—, —COO—, —OCO—, —CH=CH— or —C≡C—;

$R^2$ is hydrogen, fluorine, chlorine, cyano, trifluoromethyl, trifluoromethoxy, alkyl having 1 to 20 carbons or alkoxy having 1 to 20 carbons; and $P^2$ is independently any one of polymerizable groups represented by formula (p-1) to formula (p-4), and $R^c$ is independently hydrogen, halogen or alkyl having 1 to 5 carbons.

[12] The polymerizable liquid crystal composition according to [11], wherein in formula (1-1) and formula (1-2), $A^1$ and $A^2$ are each independently 1,4-cyclohexylene, 1,4-phenylene, naphthalene-2,6-diyl or fluorene-2,7-diyl, and in the 1,4-phenylene and fluorene-2,7-diyl, arbitrary hydrogen may be replaced by fluorine, methyl or trifluoromethyl; $Z^1$ is independently a single bond, —COO—, —OCO—, —CH=CH—COO—, —CH$_2$CH$_2$—COO—, —OCO—CH=CH—, —OCO—CH$_2$CH$_2$—, —CH$_2$CH$_2$— or —C≡C—; and m is an integer from 1 to 3, in formula (M1) and formula (M2), $A^3$ and $A^4$ are each independently 1,4-cyclohexylene or 1,4-phenylene, and in the 1,4-phenylene, arbitrary one or two hydrogens may be replaced by fluorine, methyl or trifluoromethyl; $Z^2$ is independently —O—, —COO— or —OCO—; n is an integer from 1 to 3; $Q^3$ is independently alkylene having 2 to 20 carbons, and in the alkylene, arbitrary hydrogen may be replaced by fluorine or chlorine, and arbitrary —CH$_2$— may be replaced by —O—, —COO— or —OCO—; $R^2$ is hydrogen, fluorine, cyano, trifluoromethyl, trifluoromethoxy, alkyl having 1 to 8 carbons or alkoxy having 1 to 8 carbons; and $P^2$ is independently any one of polymerizable groups represented by formula (p-1) to formula (p-4), and $R^c$ is independently hydrogen, methyl or ethyl.

[13] The polymerizable liquid crystal composition according to [11], wherein in formula (1-1) and formula (1-2), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ and $Q^2$ are each independently alkylene having 2 to 15 carbons, and in the alkylene, arbitrary —CH$_2$— may be replaced by —O—, —COO— or —OCO—; $R^1$ is hydrogen, fluorine, cyano, trifluoromethyl, trifluoromethoxy, alkyl having 1 to 8 carbons or alkoxy having 1 to 8 carbons; $R^a$ is hydrogen or methyl; and $R^b$ is independently hydrogen, methyl or ethyl, in formula (M1) and formula (M2), $A^3$ and $A^4$ are each independently 1,4-cyclohexylene or 1,4-phenylene, and in the 1,4-phenylene, arbitrary one or two hydrogens may be replaced by fluorine, methyl or trifluoromethyl; $Z^2$ is independently —O—, —COO— or —OCO—; n is 1 or 2; $Q^3$ is independently alkylene having 2 to 15 carbons, and in the alkylene, arbitrary hydrogen may be replaced by fluorine or chlorine, and arbitrary —CH$_2$— may be replaced by —O—, —COO— or —OCO—; $R^2$ is hydrogen, fluorine, cyano, trifluoromethyl, trifluoromethoxy, alkyl having 1 to 8 carbons or alkoxy having 1 to 8 carbons; and $P^2$ is independently any one of polymerizable groups represented by formula (p-1) to formula (p-4), and $R^c$ is independently hydrogen, methyl or ethyl.

[14] The polymerizable liquid crystal composition according to anyone of [11] to [13], wherein the ratio of a polymerizable liquid crystal compound selected from the group of compounds represented by formula (1-1) and formula (1-2) is in the range of approximately 5% to approximately 95% by weight, and the ratio of a compound selected from the group of compounds represented by formula (M1) and formula (M2) is in the range of approximately 5% to approximately 95% by weight, based on the total weight of compounds represented by formula (1-1), formula (1-2), formula (M1) and formula (M2).

[15] The polymerizable liquid crystal composition according to [14], wherein the ratio of a polymerizable liquid crystal compound selected from the group of compounds represented by formula (1-1) and formula (1-2) is in the range of approximately 30% to approximately 90% by weight, and the ratio of a compound selected from the group of compounds represented by formula (M1) and formula (M2) is in the range of approximately 10% to approximately 70% by weight, based on the total weight of compounds represented by formula (1-1), formula (1-2), formula (M1) and formula (M2).

[16] The polymerizable liquid crystal composition according to [14], wherein the ratio of a polymerizable liquid crystal compound selected from the group of compounds represented by formula (1-1) and formula (1-2) is in the range of approximately 40% to approximately 85% by weight, and the ratio of a compound selected from the group of compounds represented by formula (M1) and formula (M2) is in the range of approximately 15% to approximately 60% by weight, based on the total weight of compounds represented by formula (1-1), formula (1-2), formula (M1) and formula (M2).

[17] The polymerizable liquid crystal composition according to any one of [11] to [16], further including another polymerizable compound that is different from compounds represented by formula (1-1), formula (1-2), formula (M1) and formula (M2).

[18] The polymerizable liquid crystal composition according to any one of [11] to [17], further including a polymerizable and optically active compound.

[19] The polymerizable liquid crystal composition according to any one of [11] to [18], further including a non-polymerizable liquid crystal compound.

[20] The polymerizable liquid crystal composition according to any one of [11] to [19], further including a non-polymerizable and optically active compound.

[21] A polymer formed by the polymerization of at least one liquid crystal compound according to any one of [1] to [9].

[22] A polymer formed by the polymerization of the liquid crystal composition according to any one of [10] to [20].

[23] An optically anisotropic film formed by the polymerization of the polymerizable liquid crystal compound according to any one of [1] to [9].

[24] An optically anisotropic film formed by the polymerization of the polymerizable liquid crystal composition according to any one of [10] to [20].

[25] The optically anisotropic film according to [23] or [24], wherein it has optical properties of an A-plate.

[26] The optically anisotropic film according to [23] or [24], wherein it has optical properties of a C-plate.

[27] The optically anisotropic film according to [23] or [24], wherein it has optical properties of a negative C-plate.

[28] An optically anisotropic film according to [23] or [24], wherein it has optical properties of an O-plate.

[29] A liquid crystal display device containing the optically anisotropic film according to [23] or [24].

It is a characteristic of the polymerizable liquid crystal compound of the invention that the compound is highly stable chemically and physically under the conditions usually used and the solubility in a polar solvent is high. The rise and fall of optical anisotropy (Δn), viscosity and so forth can be adjusted by a suitable selection of the ring, the bonding group and the side chain constituting the compound of the invention. Even when atoms constituting the compound of the invention are isotopes, the compound can be used desirably because its characteristics are equivalent to those of the original compound.

The polymerizable liquid crystal compound is easily cured in air since its polymerizing mode belongs to cationic polymerization, and the compound is excellent in adhesion, since it has an oxiranyl group. In the compound having one oxiranyl group, optical properties of the composition and solubility in a solvent can easily be adjusted because of a high degree of freedom for selecting the substituent ($R^1$). A polymer formed from the compound having two oxiranyl groups has a more rigid cross-link structure in comparison with that formed from the compound having one oxiranyl group, and thus it has a higher heat resistance, a lower water absorptivity, a lower water permeability, a lower gas-permeability and a higher mechanical strength (especially in hardness). Furthermore, the polymerizable liquid crystal compound has a faster rate of polymerization and a higher solubility in a safety solvent in comparison with a compound having an oxiranyl group that has no methyl groups, since the compound has a methyl group at α position of the oxiranyl group. The safety solvent includes, but not limited to PGMEA (polyethylene glycol monomethyl ether acetate).

The polymerizable liquid crystal compound of the invention is represented by formula (1-1) or formula (1-2).

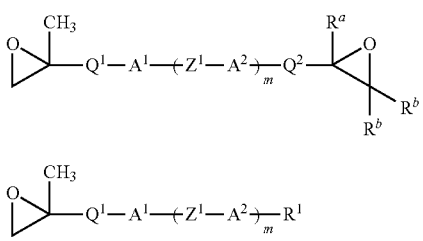

(1-1)

(1-2)

$A^1$ and $A^2$ are each independently 1,4-cyclohexylene, 1,4-phenylene, pyridine-2,5-diyl, pyrimidine-2,5-diyl, naphthalene-2,6-diyl, tetrahydronaphthalene-2,6-diyl, fluorene-2,7-diyl, 1,3-dioxane-2,5-diyl, triptycene-1,4-diyl or phenylnorbornene-1,4-diyl. In the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl. Incidentally, triptycene-1,4-diyl (a) and phenylnorbornene-1,4-diyl (b) are the following divalent groups.

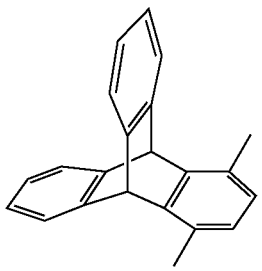

(a)

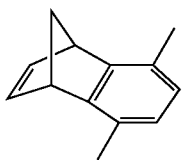

(b)

Desirable $A^1$ or $A^2$ is 1,4-cyclohexylene, 1,4-phenylene, naphthalene-2,6-diyl or fluorene-2,7-diyl, and in the 1,4-phenylene and fluorene-2,7-diyl, arbitrary one or two hydrogens may be replaced by fluorine or methyl. More desirable $A^1$ or $A^2$ is 1,4-cyclohexylene or 1,4-phenylene, and in the 1,4-phenylene, arbitrary one or two hydrogens may be replaced by fluorine or methyl. A more desirable example of $A^1$ or $A^2$ is 1,4-cyclohexylene, 1,4-phenylene, 2-fluoro-1,4-phenylene, 3-fluoro-1,4-phenylene, 2,3-difluoro-1,4-phenylene, 2,5-difluoro-1,4-phenylene, 2,6-difluoro-1,4-phenylene, 2-methyl-1,4-phenylene, 3-methyl-1,4-phenylene and 2,3-dimethyl-1,4-phenylene. The compound shows a tendency to increase the melting point, increase the clearing point and increase the temperature range of a liquid crystal phase when both of $A^1$ and $A^2$ are 1,4-phenylene. The compound shows a tendency to decrease the temperature range of a liquid crystal phase and decrease the optical anisotropy when at least one of $A^1$ and $A^2$ is 1,4-cyclohexylene.

The bonding group $Z^1$ is independently a single bond, —O—, —COO—, —OCO—, —CH=CH—COO—, —OCO—CH=CH—, —OCO—$CH_2CH_2$—, —$CH_2CH_2$—COO—, —C≡C—COO—, —OCO—C≡C—, —$CH_2$O—, —$OCH_2$—$CF_2$O—, —$OCF_2$—, —CONH—, —NHCO—, —$(CH_2)_4$—, —$CH_2CH_2$—, —$CF_2CF_2$—, —CH=CH—, —CF=CF— or —C≡C—. Desirable $Z^1$ is a single bond, —COO—, —OCO—, —CH=CH—COO—, —$CH_2CH_2$—COO—, —OCO—CH=CH—, —OCO—$CH_2CH_2$—, —$CH_2CH_2$— or —C≡C—. More desirable $Z^1$ is a single bond, —COO— or —OCO—. When $Z^1$ is a single bond, —$(CH_2)_2$—, —$CH_2$O—, —$OCH_2$—, —$CF_2$O—, —$OCF_2$—, —CH=CH—, —CF=CF— or —$(CH_2)_4$—, viscosity is small. When $Z^1$ is —CH=CH— or —CF=CF—, the temperature range of a liquid crystal phase is wide, and the ratio of the elastic constants is large. When $Z^1$ is —C≡C—, the optical anisotropy is large.

m is an integer from 1 to 5. Desirable m is an integer from 1 to 3, and more desirable m is an integer from 1 or 2. Arbitrary two of $Z^1$ may be the same bonding groups or different groups when m is 2 or more. Arbitrary two of $A^2$ may also be the same rings or different rings.

$Q^1$ and $Q^2$ are each independently alkylene having 1 to 20 carbons, and in the alkylene, arbitrary hydrogen may be replaced by fluorine or chlorine, and arbitrary —$CH_2$— may be replaced by —O—, —COO—, —OCO—, —CH=CH— or —C≡C—. In the alkylene, when the number of carbons in the alkylene is 2 or more, arbitrary —$CH_2$— in the alkylene may be replaced by —O—, —COO—, —OCO—, —CH=CH— or —C≡C—. Desirable $Q^1$ or $Q^2$ is alkylene having 2 to 15 carbons, and in the alkylene, arbitrary hydrogen may be replaced by fluorine, and arbitrary one or two —$CH_2$— may be replaced by —O—, —COO— or —OCO—. More desirable $Q^1$ or $Q^2$ is alkylene having 2 to 15 carbons, and in the alkylene, arbitrary hydrogen may be replaced by fluorine, and arbitrary one —$CH_2$— may be replaced by —O—. The alkylene may be a straight chain or a branched chain, and the straight-chain alkylene is preferable. The compound shows a tendency to increase the temperature range of a liquid crystal phase when the chain of the alkylene is long. The compound shows a tendency to increase the solubility in a polar solvent when the alkylene has oxygen incorporated.

$R^1$ is hydrogen, fluorine, chlorine, cyano, trifluoromethyl, trifluoromethoxy, alkyl having 1 to 20 carbons or alkoxy having 1 to 20 carbons. Desirable $R^1$ is hydrogen, fluorine, cyano, trifluoromethyl, trifluoromethoxy, alkyl having 1 to 8 carbons or alkoxy having 1 to 8 carbons.

$R^a$ is hydrogen, halogen or alkyl having 1 to 5 carbons. Desirable $R^a$ is hydrogen or methyl. The compound has a tendency to increase the curability when $R^a$ is hydrogen. The compound has a tendency to increase the solubility in an organic solvent and decrease the melting point or the clearing point when $R^a$ is methyl. $R^b$ is independently hydrogen, halogen or alkyl having 1 to 5 carbons. Desirable $R^b$ is hydrogen, methyl or ethyl. Especially desirable $R^b$ is hydrogen.

As described above, the compound having objective physical properties can be obtained by the suitable selection of the kinds of substituents, rings and bonding groups, and of the number of the rings. The compound (1-1) and the compound (1-2) can be prepared by means of a combination of techniques in synthetic organic chemistry. Methods for an introduction of objective substituents, rings and bonding groups to starting materials are described in books such as Houben-Wyle, Methods of Organic Chemistry, Georg Thieme Verlag, Stuttgart; Organic syntheses, John Wily & Sons, Inc.; Organic Reactions, John Wily & Sons Inc.; Comprehensive Organic Synthesis, Pergamon Press; and New Experimental Chemistry Course (Shin Jikken Kagaku Kouza, in Japanese title), Maruzen Co., LTD. In the following scheme, the meanings of symbols that are not explained are the same with those described above.

Formation of the bonding group $Z^1$ will be explained in Schemes 1 to 11. In these schemes, $MSG^1$ and $MSG^2$ are an organic monovalent group having at least one ring. A plurality of $MSG^1$ (or $MSG^2$) may be the same or different monovalent groups. The compounds (1A) to (1K) correspond to the compound (1-1) or the compound (1-2) of the invention.

Scheme 1: Compounds where $Z^1$ is Single Bond

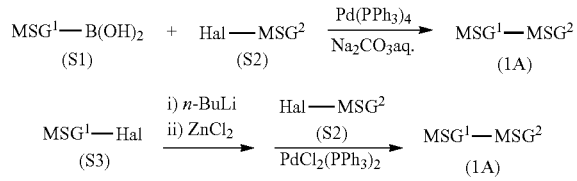

The compound (1A) is prepared by the reaction of the arylboronic acid (S1) with the compound (S2) that is prepared by a known method, in an aqueous solution of a carbonate in the presence of catalyst such as tetrakis(triphenylphosphine)palladium. The compound (1A) can also be prepared by the reaction of the compound (S3) that is prepared by a known method, with n-butyllithium, and then with zinc chloride, and by the reaction of the resulting intermediate with the compound (S2) in the presence of a catalyst such as dichlorobis(triphenylphosphine)palladium.

Scheme 2: Compounds where $Z^1$ is —CH═CH—

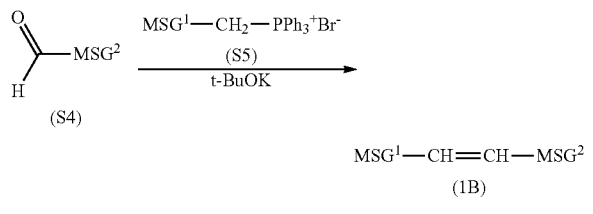

The compound (1B) is prepared by the reaction of the aldehyde (S4) with a phosphine ylide generated by adding a base such as potassium t-butoxide to the phosphonium salt (S5) that is prepared by a known method. Since a cis-isomer may be formed depending on the reaction conditions and the kinds of a substrate, the cis-isomer is isomerized to the corresponding trans-isomer by a known method as requested.

Scheme 3: Compounds where $Z^1$ is —(CH$_2$)$_2$—

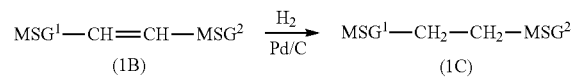

The compound (1C) is prepared by hydrogenation of the compound (1B) in the presence of a catalyst such as palladium on carbon.

Scheme 4: Compounds where Group $Z^1$ is —CF$_2$CF$_2$—

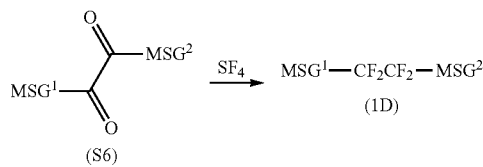

The compound (1D) having —(CF$_2$)$_2$— is prepared by fluorination of the diketone (S6) with sulfur tetrafluoride in the presence of a hydrogen fluoride catalyst, according to the method described in J. Am. Chem. Soc., 2001, 123, 5414.

Scheme 5: Compounds where $Z^1$ is —(CH$_2$)$_4$—

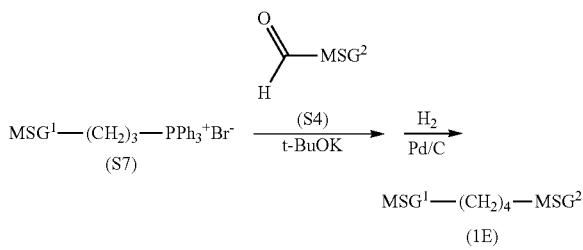

The compound (1E) is prepared by catalytic hydrogenation of the compound having —(CH$_2$)$_2$—CH═CH—, which is prepared using the phosphonium salt (S7) instead of the phosphonium salt (S5) according to the method in Scheme 2.

Scheme 6: Compounds where $Z^1$ is —CH$_2$O— or —OCH$_2$—

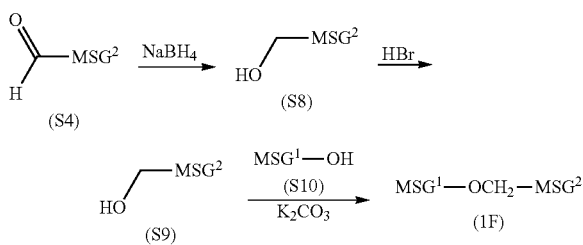

The compound (S4) is reduced with a reducing agent such as sodium borohydride, giving the compound (S8). Then, the compound (S8) is halogenated with hydrobromic acid or the like, giving the compound (S9). The compound (1F) is prepared by the reaction of the compound (S9) with the compound (S10) in the presence of potassium carbonate or the like. The compound having —CH$_2$O— can also be prepared in the same manner.

Scheme 7: Compounds where $Z^1$ is —COO— or —OCO—

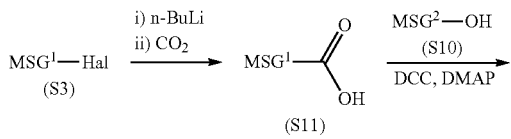

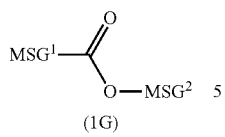

(1G)

The compound (S3) is allowed to react with n-butyllithium and then with carbon dioxide, giving the carboxylic acid (S11). The compound (1G) having —COO— is prepared by the dehydration of the compound (S11) and phenol (S10) in the presence of DCC (1,3-dicyclohexylcarbodiimide) and DMAP (4-dimethylaminopyridine). The compound having —OCO— can also be prepared in the same manner. The compound (1G) can also be prepared by the reaction of thionyl chloride or oxalyl chloride with the compound (S11), giving the corresponding acid chloride, and then by the reaction of the compound (S10) with the acid chloride in the presence of a base such as pyridine or triethylamine.

Scheme 8: Compounds where $Z^1$ is —CF=CF—

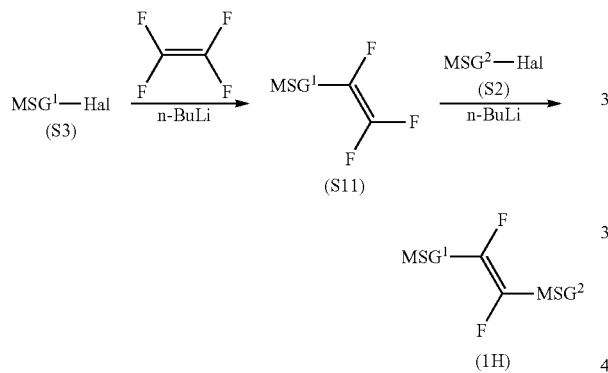

The compound (S3) is treated with n-butyllithium, and then allowed to react with tetrafluoroethylene, giving the compound (S12). The compound (1H) is prepared by the treatment of the compound (S2) with n-butyllithium, and then by the reaction with the compound (S12). A cis-isomer of the compound (1H) can also be produced by selecting the reaction conditions.

Scheme 9: Compounds where $Z^1$ is —C≡C—

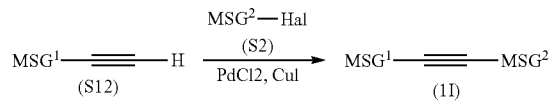

The compound (1I) is prepared by the reaction of the compound (S12) with the compound (S2) in the presence of a catalyst of dichloropalladium and a copper halide.

Scheme 10: Compound where $Z^1$ is —C≡C—COO—

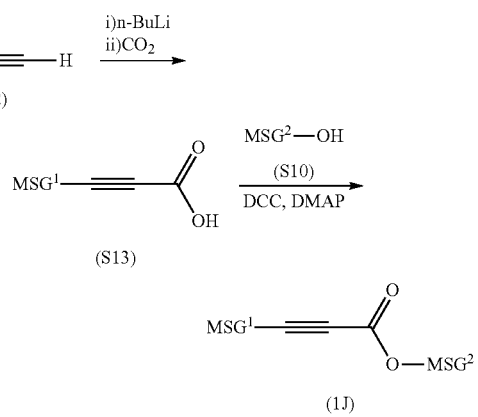

The compound (S12) is lithiated with n-butyllithium, and then allowed to react with carbon dioxide, giving the carboxylic acid (S13). The compound (1J) having —C≡C—COO— is prepared by the dehydration of the carboxylic acid (S13) and the phenol (S10) in the presence of DCC and DMAP. The compound having —OCO—C≡C— can also be prepared in the same manner. The compound (1J) can also be prepared via an acid chloride in the same way as described in the derivation of the compound (1G) from the compound (S11) in Scheme 7.

Scheme 11: Compounds where $Z^1$ is —CF$_2$O— or —OCF$_2$—

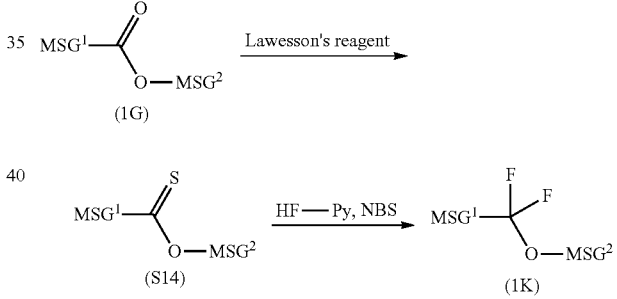

The compound (1G) is treated with a thionating agent such as Lawesson's reagent, giving the compound (S14). The compound (1K) having —CF$_2$O— is prepared by fluorination of the compound (S14) with a hydrogen fluoride-pyridine complex and NBS (N-bromosuccinimide). The compound (1K) can also be prepared by fluorination of the compound (S14) with (diethylamino) sulfur trifluoride (DAST). The compound having —OCF$_2$— can also be prepared in the same manner. These bonding groups can also be formed by the method described in P. Kirsch et al., Angew. Chem. Int. Ed. 2001, 40, 1480.

The compound of the invention can be derived by way of a combination of the methods described above. However, synthetic methods are not limited to the methods described above. Examples of the compounds prepared by the method described above are as follows. Incidentally, the structures of compounds prepared in the manner described above can be confirmed by means of, for example, proton NMR spectra.

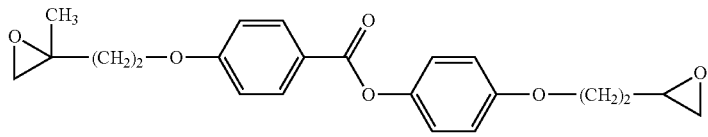
(1-1-1)
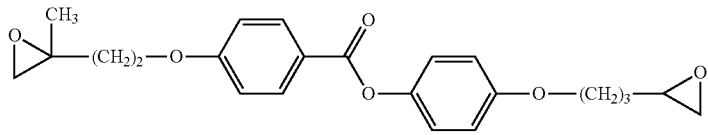
(1-1-2)
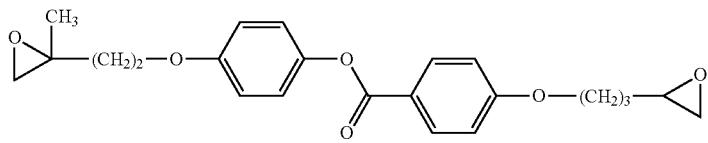
(1-1-3)
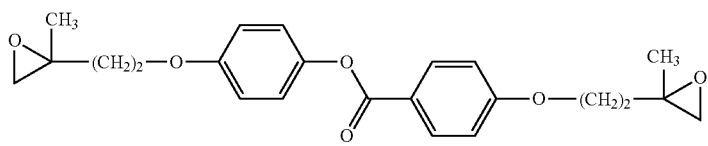
(1-1-4)
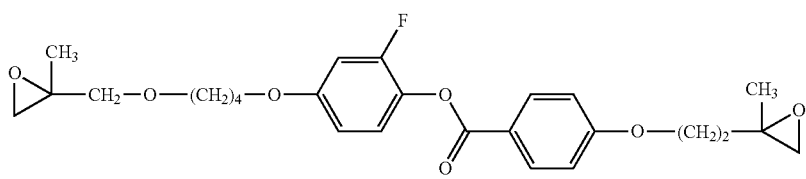
(1-1-5)
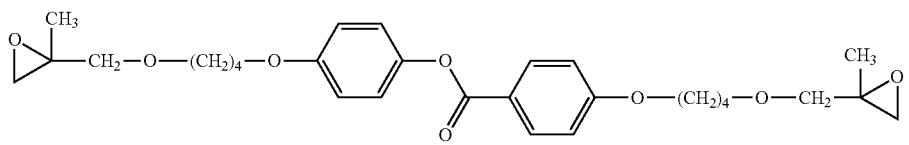
(1-1-6)
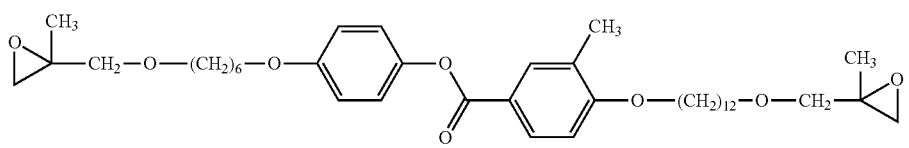
(1-1-7)
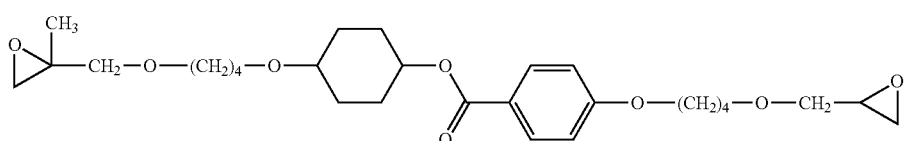
(1-1-8)
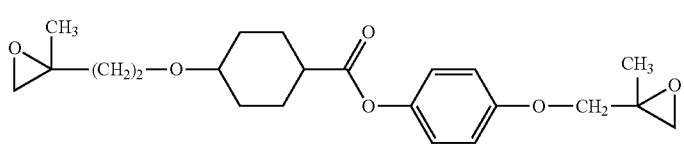
(1-1-9)
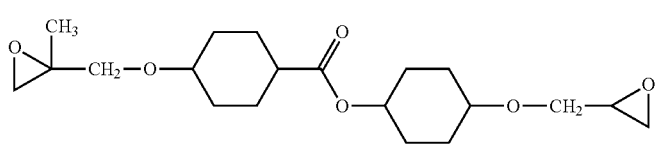
(1-1-10)

-continued
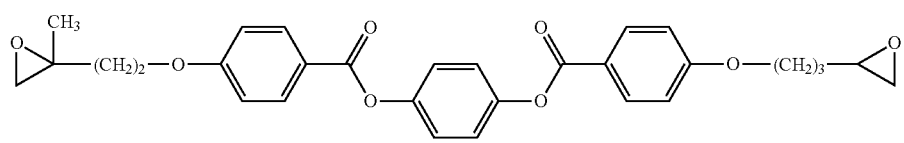
(1-1-11)
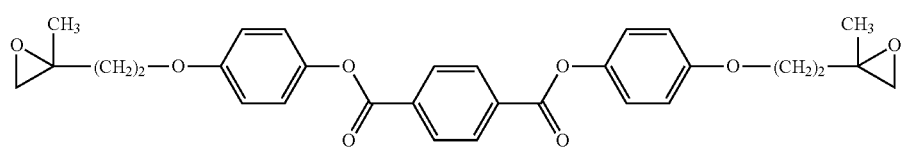
(1-1-12)
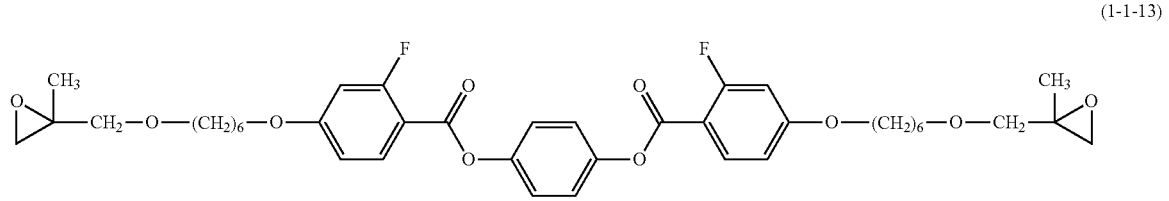
(1-1-13)
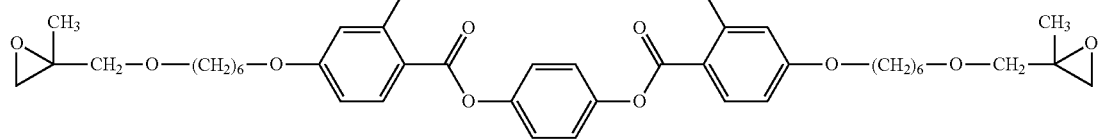
(1-1-14)
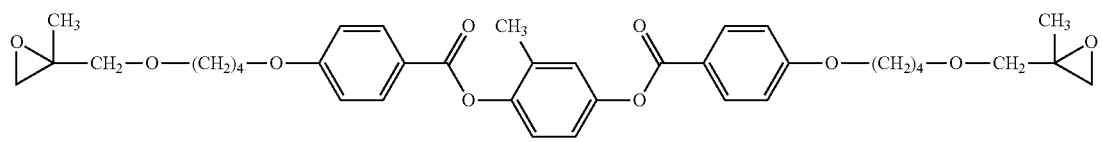
(1-1-15)
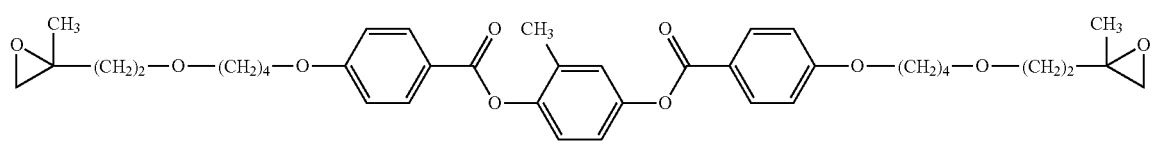
(1-1-16)
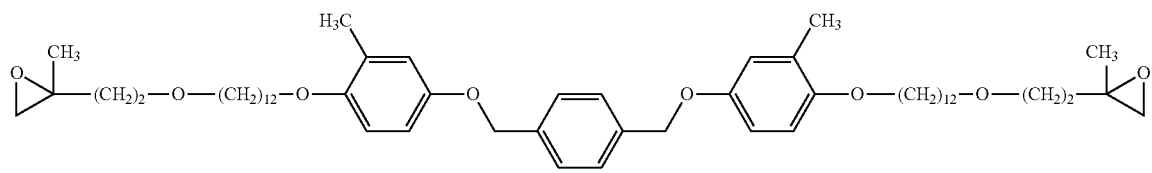
(1-1-17)
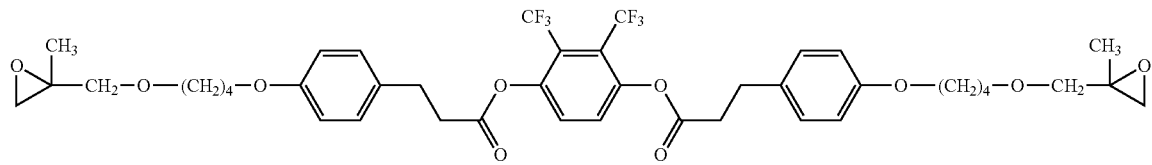
(1-1-18)
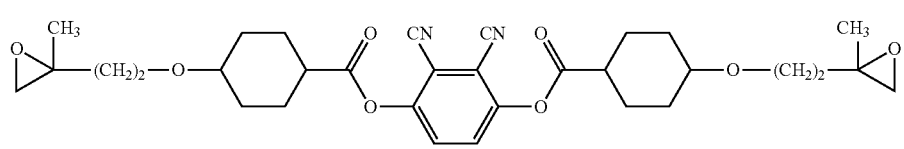
(1-1-19)
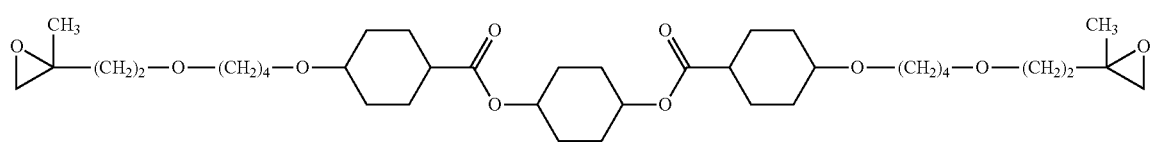

-continued
(1-1-20)
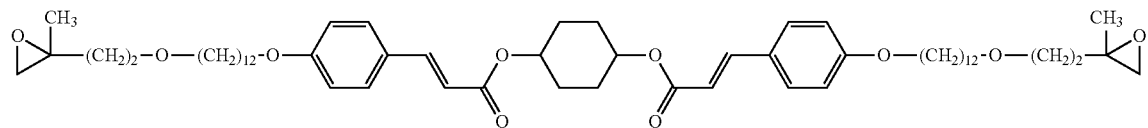
(1-1-21)
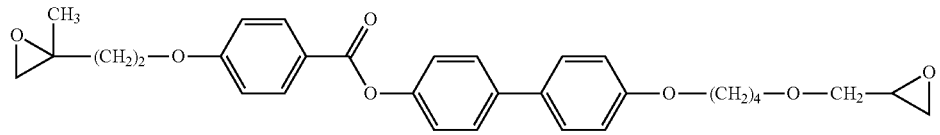
(1-1-22)
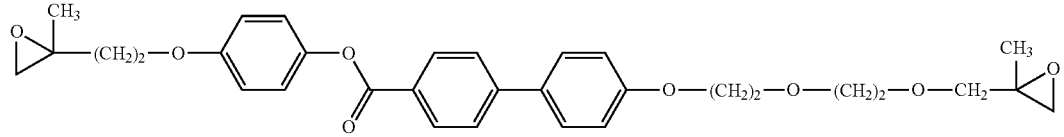
(1-1-23)
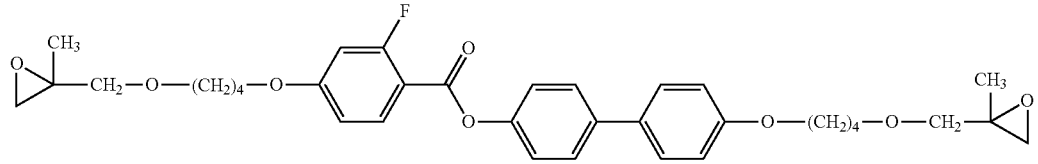
(1-1-24)
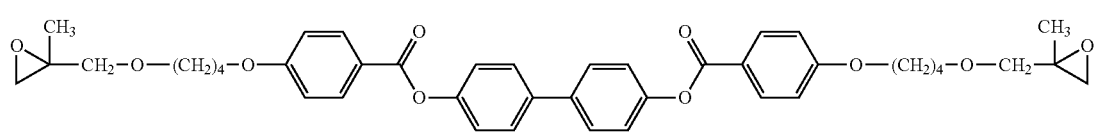
(1-1-25)
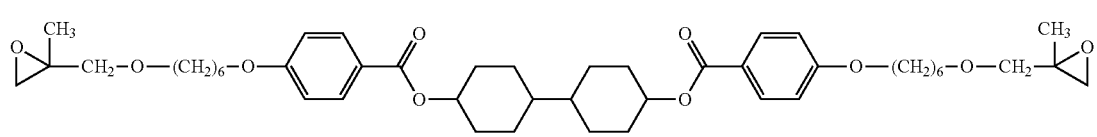
(1-1-26)
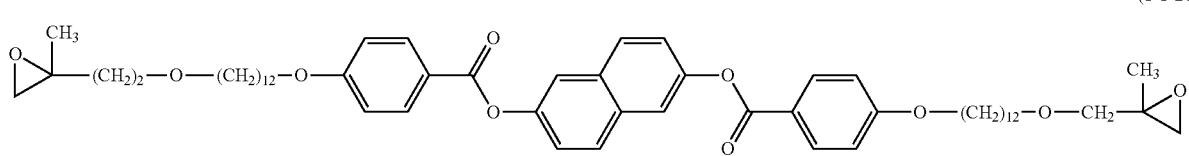
(1-1-27)
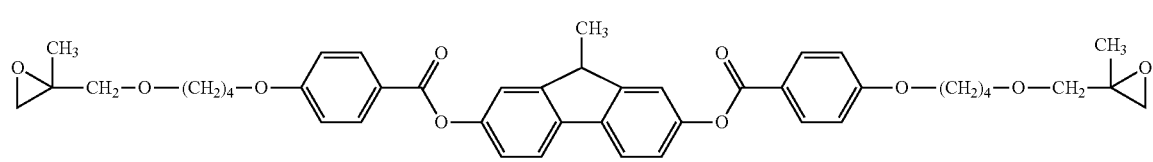
(1-1-28)
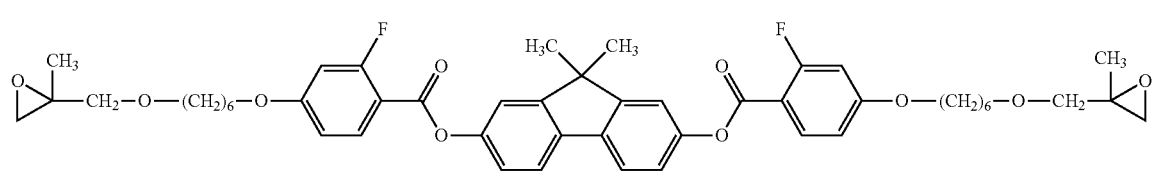

(1-1-29)
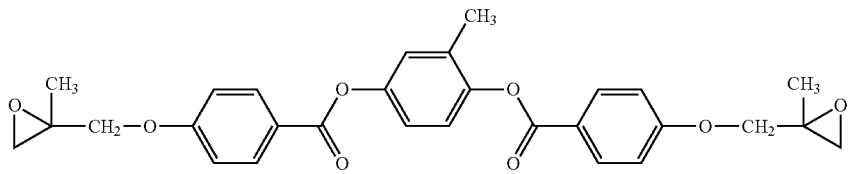
(1-1-30)
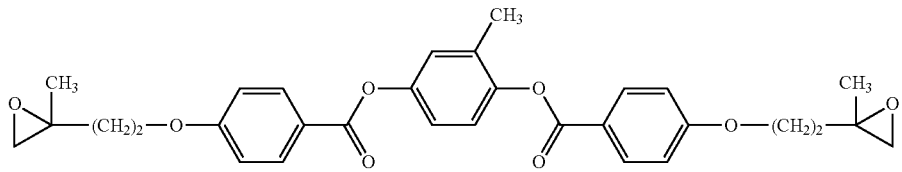
(1-1-31)
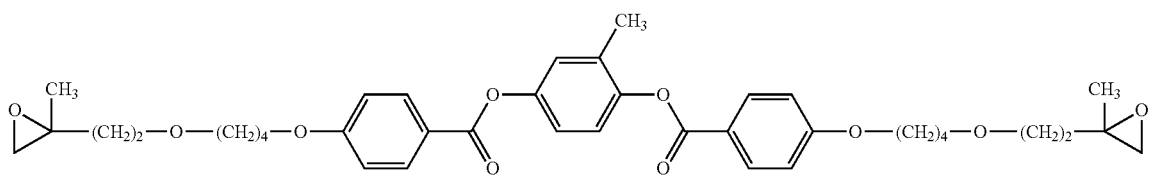
(1-2-1)
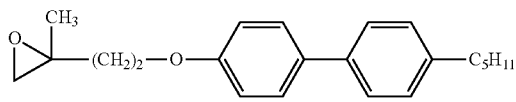
(1-2-2)
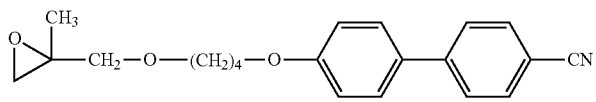
(1-2-3)
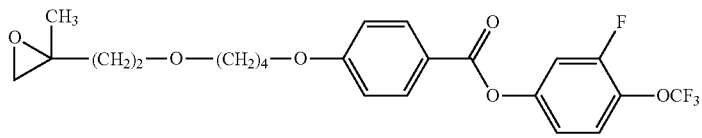
(1-2-4)
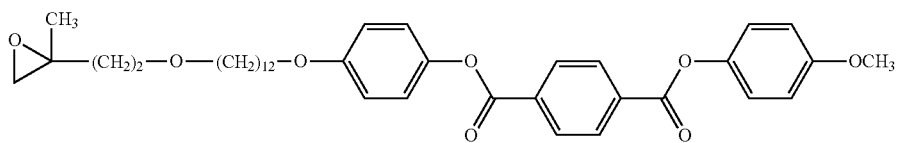
(1-2-5)
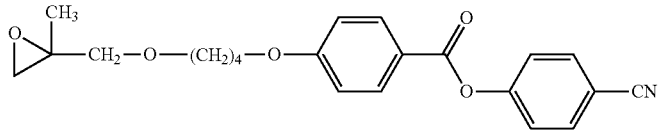
(1-2-6)
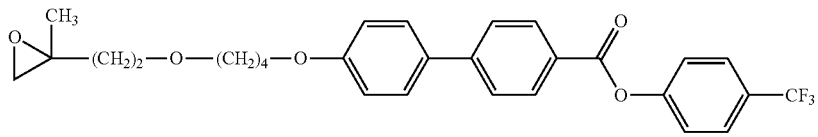
(1-2-7)
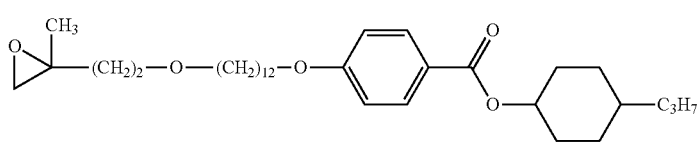

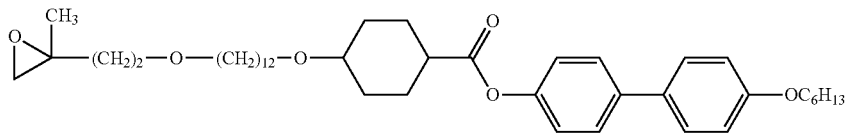
(1-2-8)

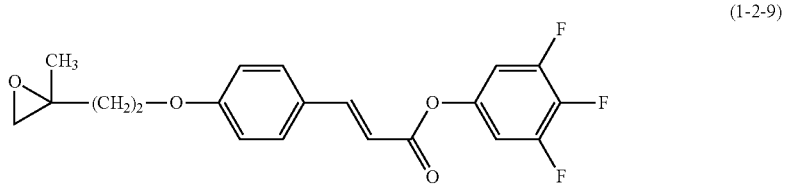
(1-2-9)

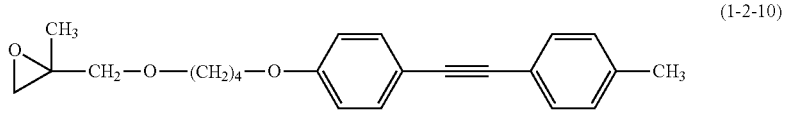
(1-2-10)

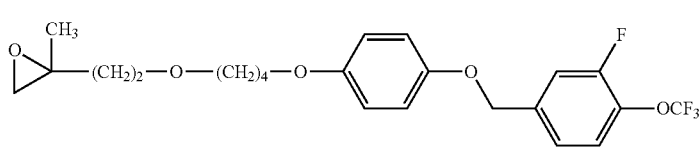
(1-2-11)

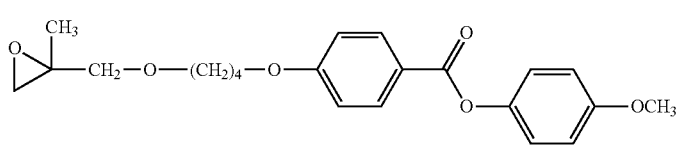
(1-2-12)

Next, the polymerizable liquid crystal composition of the invention will be explained. The composition includes at least one compound selected from the group of the compound (1-1) and the compound (1-2). The composition may include at least one compound selected from the group of the compound (1-1) and the compound (1-2) and at least one compound selected from the group of the compound (M1) and the compound (M2).

$$P^2\text{-}Q^3\text{-}A^3\text{-}(Z^2\text{-}A^4)_n\text{-}Q^3\text{-}P^2 \quad (M1)$$

$$P^2\text{-}Q^3\text{-}A^3\text{-}(Z^2\text{-}A^4)_n\text{-}R^2 \quad (M2)$$

The meanings of the symbols in formula (M1) and formula (M2) are as follows. $A^3$ and $A^4$ are each independently 1,4-cyclohexylene, 1,4-phenylene, naphthalene-2,6-diyl, fluorene-2,7-diyl, 1,3-dioxane-2,5-diyl, triptycene-1,4-diyl or phenylnorbornene-1,4-diyl, and in the 1,4-phenylene and fluorene-2,7-diyl, arbitrary hydrogen may be replaced by fluorine or chlorine and arbitrary one or two hydrogens may be replaced by cyano, methyl, ethyl, methoxy, hydroxy, formyl, acetoxy, acetyl, trifluoroacetyl, difluoromethyl or trifluoromethyl. Desirable $A^3$ or $A^4$ is 1,4-cyclohexylene or 1,4-phenylene, and in the 1,4-phenylene, arbitrary one or two hydrogens may be replaced by fluorine, methyl or trifluoromethyl.

$Z^2$ is independently a single bond, —O—, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—. Desirable $Z^2$ is —O—, —COO— or —OCO—.

n is an integer from 1 to 5. Desirable n is an integer from 1 to 3, and more desirable n is an integer from 1 or 2. Incidentally, arbitrary two of $Z^2$ may be the same bonding groups or different bonding groups when n is 2 or more. The same applies to the ring $A^4$, and arbitrary two of $A^4$ may be the same rings or different rings when n is 2 or more.

$Q^3$ is independently alkylene having 2 to 20 carbons. In the alkylene, arbitrary hydrogen may be replaced by fluorine or chlorine and arbitrary —CH$_2$— may be replaced by —O—, —COO—, —OCO—, —CH=CH— or —C≡C—. Arbitrary —CH$_2$— may desirably be replaced by —O—, —COO— or —OCO—. More desirable $Q^3$ is alkylene having 2 to 15 carbons. In the alkylene, arbitrary hydrogen may be replaced by fluorine or chlorine, and arbitrary —CH$_2$— may be replaced by —O—, —COO— or —OCO—.

$R^2$ is hydrogen, fluorine, chlorine, cyano, trifluoromethyl, trifluoromethoxy, alkyl having 1 to 20 carbons or alkoxy having 1 to 20 carbons. Desirable $R^2$ is fluorine, cyano, trifluoromethyl, trifluoromethoxy, alkyl having 1 to 8 carbons or alkoxy having 1 to 8 carbons.

$P^2$ is independently a polymerizable group represented by any one of formula (p-1) to formula (p-4).

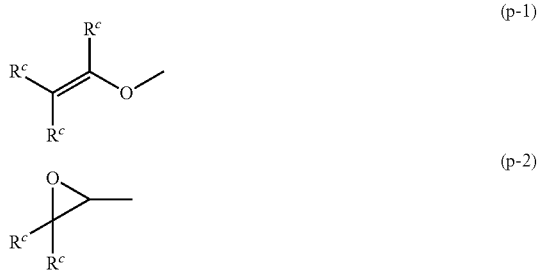

(p-1)

(p-2)

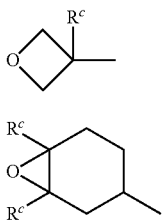

(p-3)

(p-4)

In these formulas, $R^c$ is independently hydrogen, halogen or alkyl having 1 to 5 carbons. Desirable $R^c$ is hydrogen, methyl or ethyl.

The compound (M1) exhibits a wide temperature range of a liquid crystal phase and also can form a polymer having a high mechanical strength, since two polymerizable groups form a three-dimensional network. Since the compound (M2) has one polymerizable group and a substituent such as a polar group at the opposite side of the polymerizable group, an adjustment of orientation in a liquid crystal state can easily be attained. In any one of the compound (M1) and the compound (M2), a compound in which the ring $A^3$ and the ring $A^4$ are 1,4-phenylene gives a composition having a large optical anisotropy (Δn), and a compound in which the ring $A^3$ and the ring $A^4$ are naphthalene-2,6-diyl or fluorene-2,7-diyl gives a composition having an even larger optical anisotropy, and a compound in which the ring $A^3$ and the ring $A^4$ are 1,4-cyclohexylene gives a composition having a small optical anisotropy.

A desirable example of the compound (M1) and the compound (M2) includes the following.

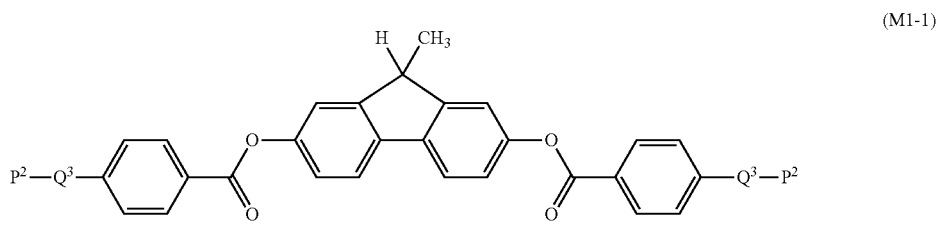

(M1-1)

(M1-2)

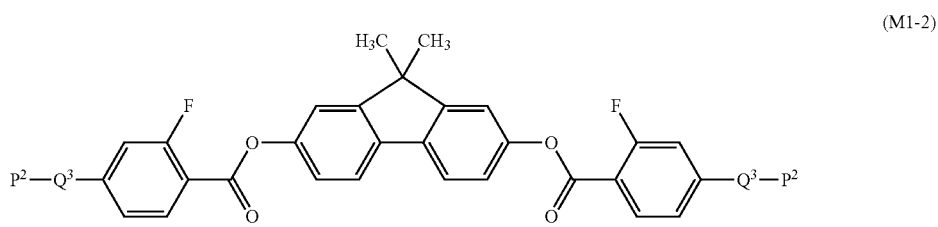

(M1-3)

(M1-4)

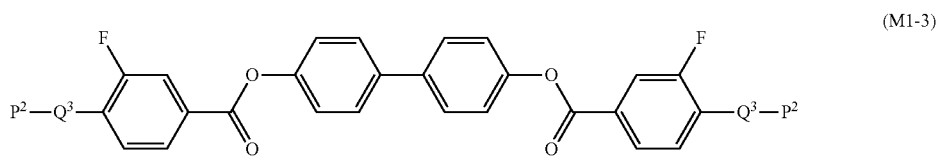

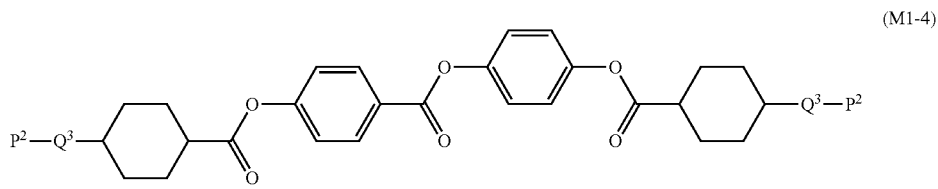

(M1-5)

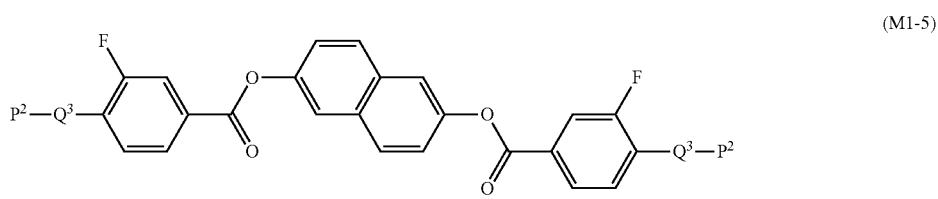

(M1-6)

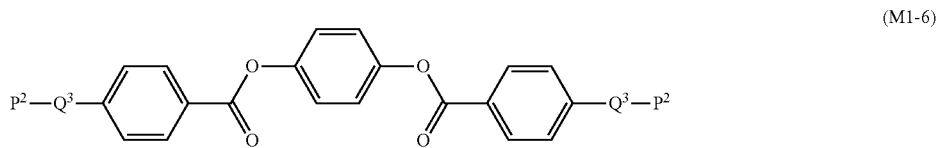

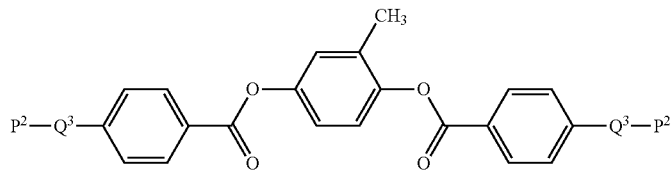
(M1-7)
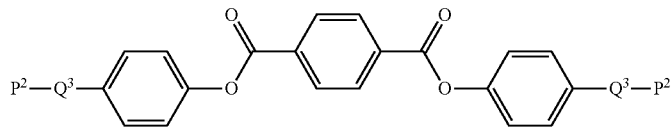
(M1-8)
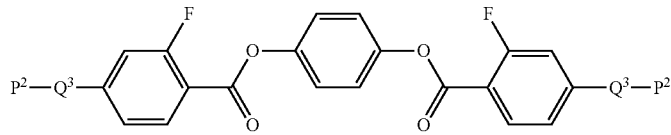
(M1-9)
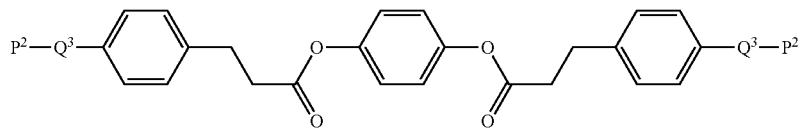
(M1-10)
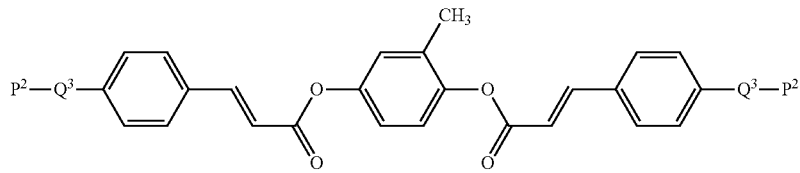
(M1-11)
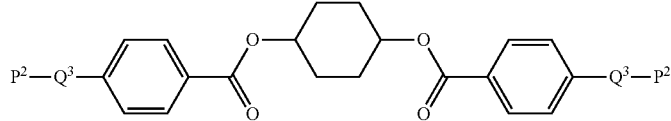
(M1-12)
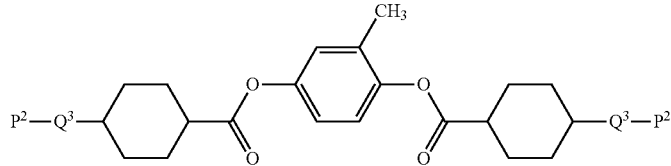
(M1-13)
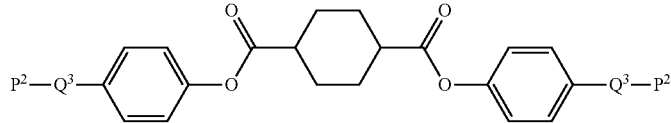
(M1-14)
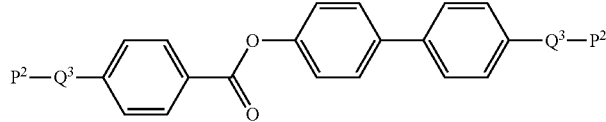
(M-15)
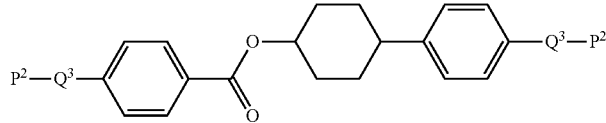
(M1-16)

(M1-17)
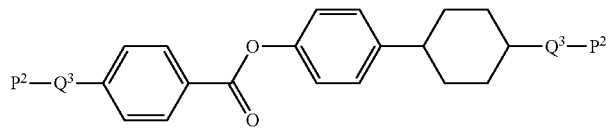
(M1-18)
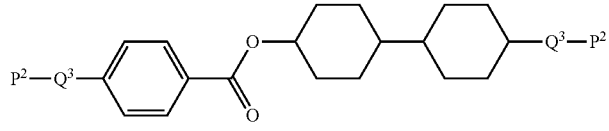
(M1-19)
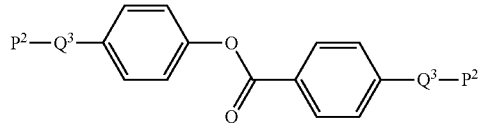
(M1-20)
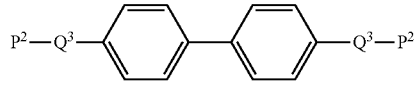
(M1-21)
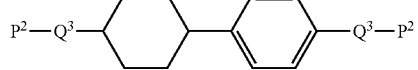
(M1-22)
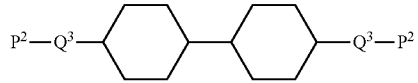
(M2-1)
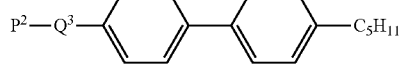
(M2-2)
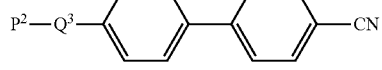
(M2-3)
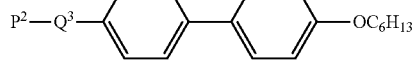
(M2-4)
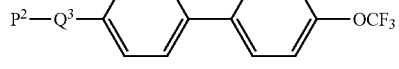
(M2-5)
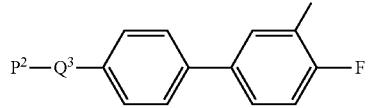
(M2-6)
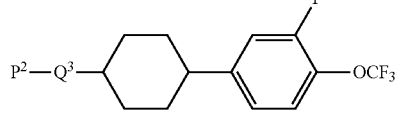
(M2-7)
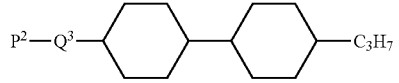
(M2-8)
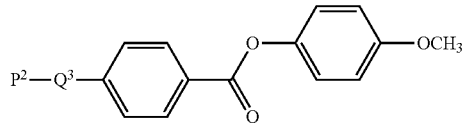

-continued

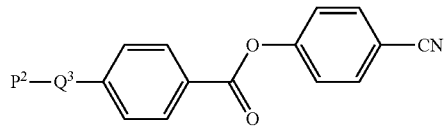
(M2-9)

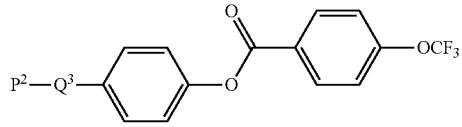
(M2-10)

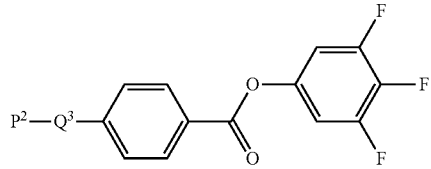
(M2-11)

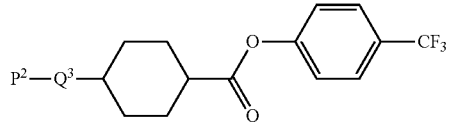
(M2-12)

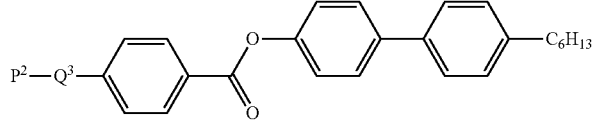
(M2-13)

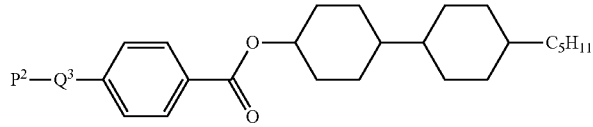
(M2-14)

(M2-15)

The meanings of the symbols in these compounds are the same with these described in formula (M1) and formula (M2).

In the following explanation, the compound (1-1) and the compound (1-2) may generically be expressed as the compound (1), and the compound (M1) and the compound (M2) may generically be expressed as the compound (M). The composition of the invention may include at least one of the compound (1) and at least one of the compound (M), which is described above. The composition may be expressed as the composition (1). A desirable ratio of the compound (1) in the composition (1) is in the range of approximately 5 to approximately 95% by weight, based on the total weight of the compound (1) and the compound (M). A more desirable ratio is in the range of approximately 30 to approximately 90% by weight, and still more desirable ratio is in the range of approximately 40 to approximately 85% by weight. A desirable ratio of the compound (M) is in the range of approximately 5 to approximately 95% by weight, based on the total weight of the compound (1) and the compound (M), a more desirable ratio is in the range of approximately 10 to approximately 70% by weight, and still more desirable ratio is in the range of approximately 15 to approximately 60% by weight. The composition (1) may be composed of the compound (1) and the compound (M). The composition (1) may include another component. Another component includes a non-polymerizable liquid crystal compound, a non-liquid crystal polymerizable compound, an additive and solvent. Examples of the additive are nonionic surfactant, a photopolymerization initiator, a hardener, a photosensitizer, an ultraviolet absorber, a light stabilizer and an antioxidant.

The composition (1) may include a liquid crystal compound having no polymerizable groups. Examples of the non-polymerizable liquid crystal compound are compounds listed in LiqCryst (LCI Publisher GmbH, Hamburg, Germany) that is a database of liquid crystal compounds. The composition (1) may further include an additive such as a dichroic dye. The ratio of the non-polymerizable liquid crystal compound in the composition (1) is preferably 50% by weight or less, and more preferably 30% by weight or less, based on the total weight of the compound (1) and the compound (M), for the purpose of an easy adjustment of optical anisotropy in the composition, an excellent applicability to a substrate, and a remarkable attainment of the effect of the invention on the polymer.

The non-polymerizable liquid crystal compound includes compounds represented by the following formula (A).

  (A)

In formula (A), the meanings of $A^3$, $A^4$ and n are the same with those of $A^3$, $A^4$ and n in formula (M1) described above; $Z^4$ is independently a single bond or alkylene having 1 to 10 carbons, and in the alkylene, arbitrary —CH$_2$— may be replaced by —O—, —CO—, —COO—, —OCO—, —CH=CH—, —CF=CF— or —C≡C—, and arbitrary hydrogen may be replaced by halogen; $R^A$ is alkyl having 1 to 10 carbons, alkenyl having 2 to 10 carbons, alkoxy having 1 to 10 carbons, hydrogen, chlorine, fluorine, —CN, —CF$_3$ or —OCF$_3$. A specific example is as follows.

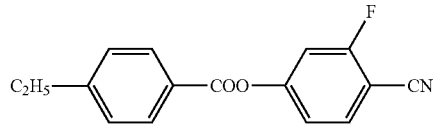 (LC-1)

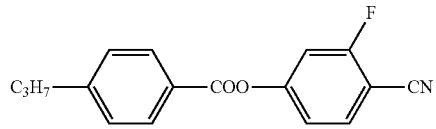 (LC-2)

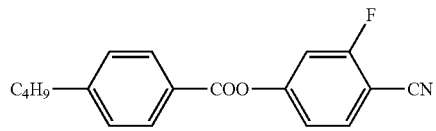 (LC-3)

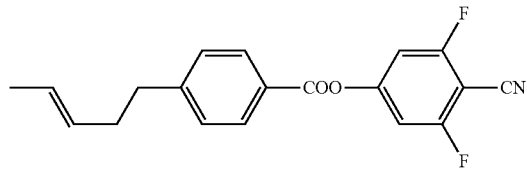 (LC-4)

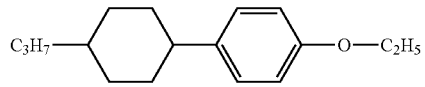 (LC-5)

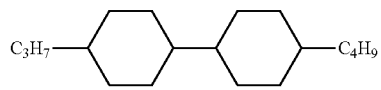 (LC-6)

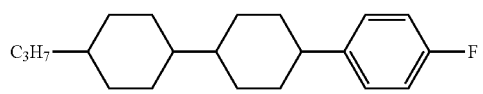 (LC-7)

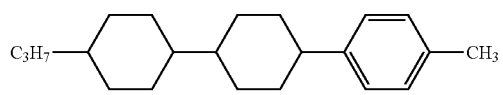 (LC-8)

 (LC-9)

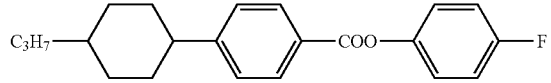 (LC-10)

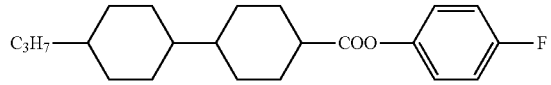 (LC-11)

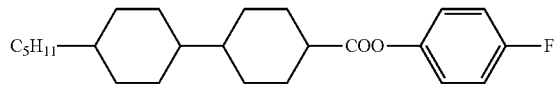 (LC-12)

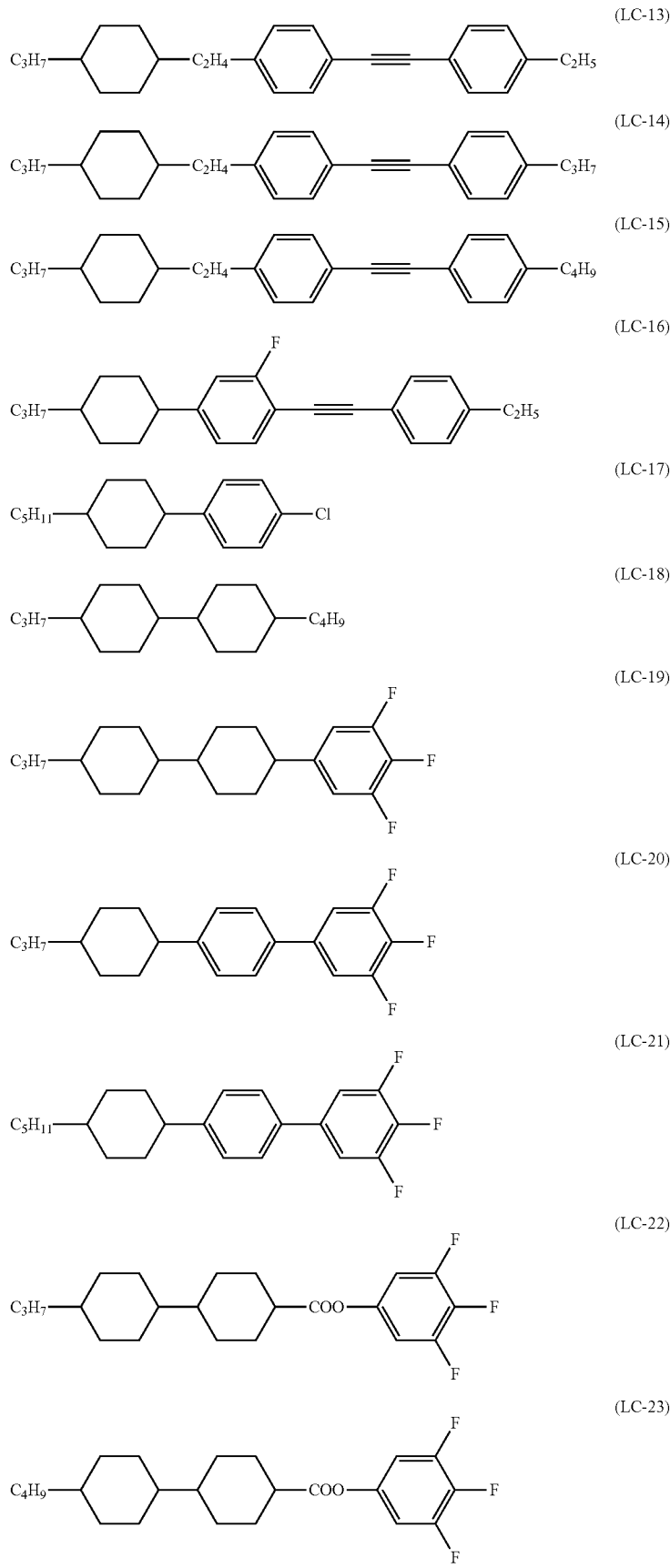

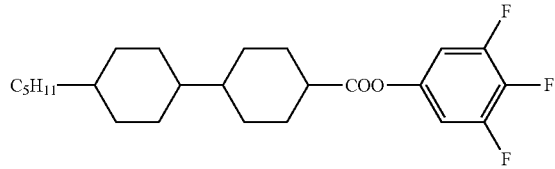
(LC-24)
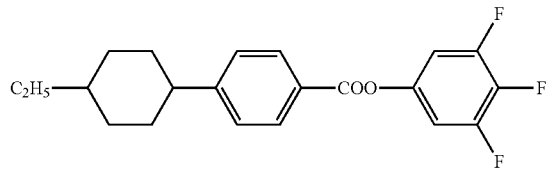
(LC-25)
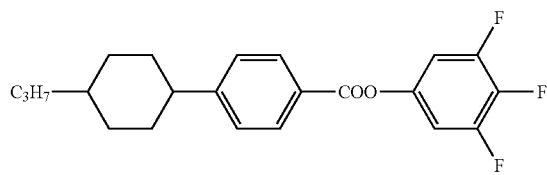
(LC-26)
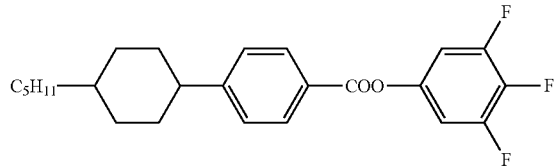
(LC-27)
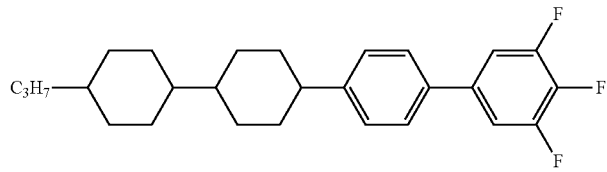
(LC-28)
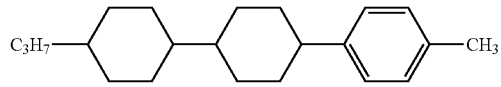
(LC-29)
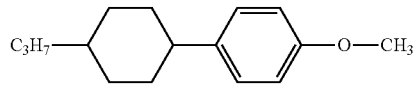
(LC-30)
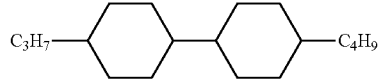
(LC-31)
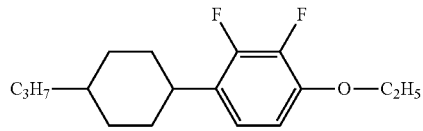
(LC-32)
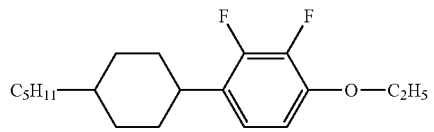
(LC-33)
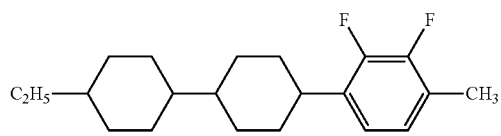
(LC-34)

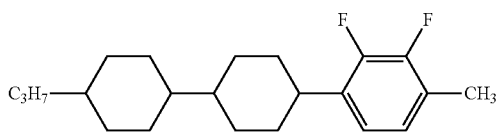
(LC-35)

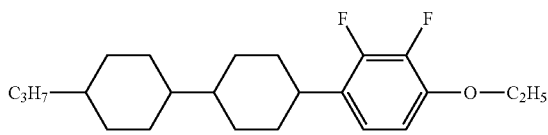
(LC-36)

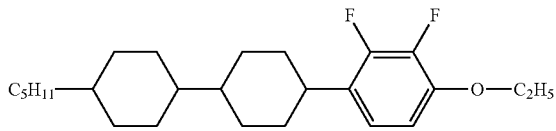
(LC-37)

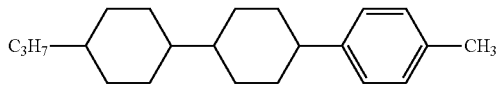
(LC-38)

Non-liquid crystal polymerizable compound can be added to the compound (1) for the purpose of adjusting the ability to form a coat, mechanical strength or the like. A desirable example of the non-liquid crystal polymerizable compound includes (meth)acrylate compounds, vinyl compounds, styrene compounds, vinyl ether compounds, allyl ether compounds, epoxy compounds and oxetane compounds.

A desirable example of the non-liquid crystal polymerizable compound includes methyl (meth)acrylate, ethyl (meth) acrylate, butyl (meth)acrylate, 2-ethylhexyl (meth)acrylate, phenyl (meth)acrylate, vinyl chloride, vinyl fluoride, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetoamide, vinyl p-t-butylbenzoate, vinyl N,N-dimethylaminobenzoate, vinyl benzoate, stylene, o-, m- or p-chloromethylstylene, α-methylstylene, tetrafluoroethylene and hexafluoropropene, ethyl vinyl ether, hydroxybutyl monovinyl ether, t-amyl vinyl ether, cyclohexanedimethanol methyl vinyl ether, hydroxybutyl allyl ether, glycerol monoallyl ether and allyl glycidyl ether. 3-Ethyl-3-hydroxymethyloxetane, 3-methyl-3-hydroxymethyloxetane, bis[(1-ethyl-3-oxetanyl)methyl]ether or 3-ethyl-3-(2-ethyl-hexyloxymethyl)oxetane may also be added for the purpose of adjusting the viscosity of the composition or avoiding shrinkage caused by curing.

A polyfunctional acrylate can be added to the composition for further increasing the ability to form a coat. A desirable polyfunctional acrylate includes 1,4-butanedioldiacrylate, 1,6-hexanedioldiacrylate, 1,9-nonanedioldiacrylate, neopentyl glycol diacrylate, triethylene glycol diacrylate, dipropylene glycol diacrylate, tripropylene glycol diacrylate, tetraethylene glycol diacrylate, trimethylolpropane triacrylate, ethylene oxide modified trimethylolpropane triacrylate, pentaerythritol triacrylate, tris(acryloyloxyethy)phosphate, ethylene oxide modified bisphenol A diacrylate, bisphenol A glycidyl diacrylate (trade name: Viscoat #700 available from Osaka Organic Chemical Industry Ltd.,) and polyethylene glycol diacrylate.

A compound having two cationic polymerizable groups can also be added to the composition for increasing the ability to form a coat. A desirable example of the compound includes the following compounds (4-1) to (4-9). The compound may be added to the composition (1) for adjusting the viscosity, adjusting the alignment, or increasing the hardness of the polymer.

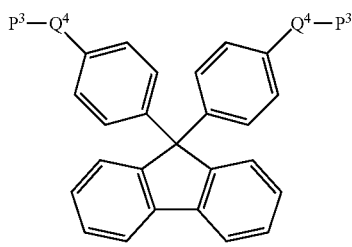
(4-1)

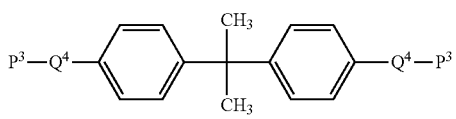
(4-2)

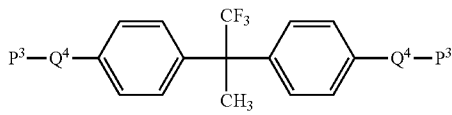
(4-3)

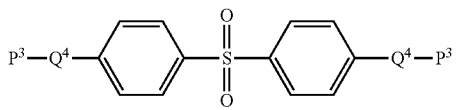
(4-4)

-continued

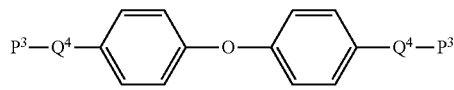
(4-5)

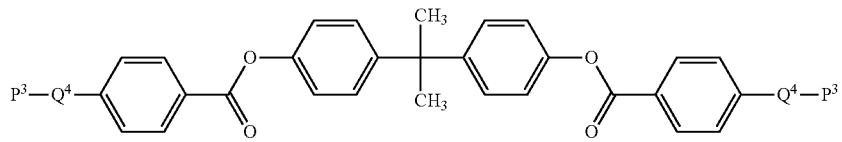
(4-6)

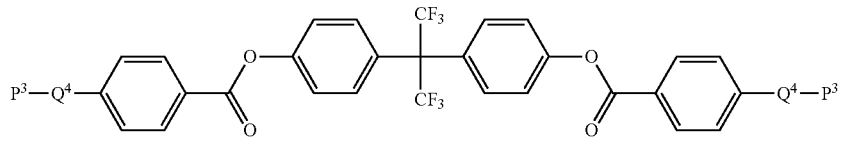
(4-7)

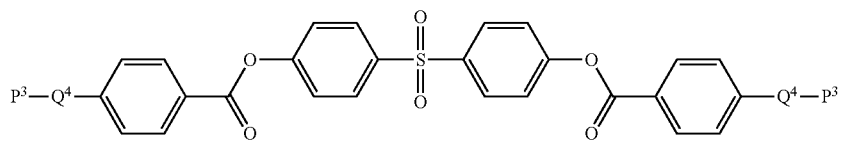
(4-8)

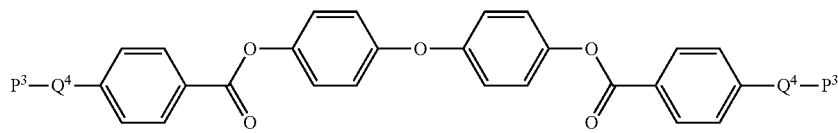
(4-9)

In these compound, $Q^4$ is each independently alkylene having 2 to 20 carbons, and in the alkylene, arbitrary hydrogen may be replaced by fluorine or chlorine and arbitrary —$CH_2$— may be replaced by —O—, —COO—, —OCO—, —CH=CH— or —C≡C—; and $P^3$ is independently a group represented by any one of formula (p-1) to formula (p-3).

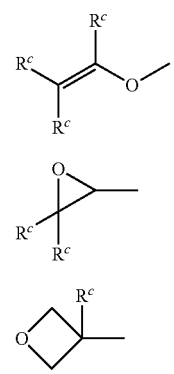

In these formulas, $R^c$ is independently hydrogen, halogen or alkyl having 1 to 5 carbons. Desirable $R^c$ is independently hydrogen, fluorine, methyl or ethyl.

Another example of the polymerizable compound includes an epoxy-type compound having one polymerizable group and an epoxy-type compound having two or more polymerizable groups. Examples of epoxy resins include epoxy resins that can be derived from dihydric phenols, such as bisphenol A-type epoxy resins, bisphenol F-type epoxy resins, bisphenol S-type epoxy resins, bisphenol AD-type epoxy resins, resorcinol-type epoxy resins, hydroquinone-type epoxy resins, catechol-type epoxy resins, dihydroxynaphthalene-type epoxy resins, biphenyl-type epoxy resins and tetramethylbiphenyl-type epoxy resins. Examples of the epoxy resins include epoxy resins that can be derived from trihydric or polyhydric phenols, such as phenol novolac-type epoxy resins, cresol novolac-type epoxy resins, triphenylmethane-type epoxy resins, tetraphenylethane-type epoxy resins, dicyclopentadiene-phenol modified epoxy resins, phenol aralkyl-type epoxy resins, biphenyl aralkyl-type epoxy resins, naphthol novolac-type epoxy resins, naphthol aralkyl-type epoxy resins, naphthol-phenol cocondensated novolac-type epoxy resins, naphthol-cresol cocondensated novolac-type epoxy resins, aromatic hydrocarbon formaldehyde resin-modified phenol resin-type epoxy resins and biphenyl-modified novolac-type epoxy resins. An additional example of the epoxy resins includes tetrabromobisphenol A-type epoxy resins, brominated phenol novolac-type epoxy resins, polycarboxylic acid polyglycidyl ester, polyol polyglycidyl ether, aliphatic acid-type epoxy resins, alicyclic epoxy resins, glycidylamine-type epoxy resins, triphenolmethane-type epoxy resins and dihydroxybenzene-type epoxy resins. These epoxy resins may be solely used or two or more epoxy resins may be mixed.

A specific example of epoxy-type compounds includes alkyl monoglycidyl ether having 2 to 25 carbons (for example, butyl glycidyl ether, 2-ethylhexyl glycidyl ether, decyl glycidyl ether, stearyl glycidyl ether), butanediol diglycidyl ether, 1,6-hexanediol diglycidyl ether, neopentylglycol diglycidyl ether, dodecanediol diglycidyl ether, pentaerythritol polyglycidyl ether, trimethylolpropane polyglycidyl ether, glycerol polyglycidyl ether, phenyl glycidyl ether, p-sec-butylphenyl glycidyl ether, p-tert-butylphenyl glycidyl ether, resorcinol glycidyl ether, allyl glycidyl ether, tetrafluoropropyl glycidyl ether, octafluoropropyl glycidyl ether, dodecafluoropentyl glycidyl ether, stylene oxide, 1,7-octadiene diepoxide, limonene diepoxide, limonene monoxide, α-pinene epoxide, β-pinene epoxide, cyclohexene epoxide, cyclooctene epoxide, vinylcyclohexene oxide, butoxy polyethylene glycol glycidyl ether, polyethylene glycol diglycidyl ether, 3,4-epoxycyclohexenylmethyl-3',4'-epoxycyclohexene carboxylate, 3,4-epoxycyclohexenylethyl-3',4'-epoxycyclohexene carboxylate, 1,2-epoxy-4-vinylcyclohexane, vinylcyclohexene dioxide, allylcyclohexene dioxide, 1-epoxyethyl-3,4-epoxycyclohexane, 3,4-epoxy-4-methylcyclohexyl-2-propylene oxide, bis(3,4-epoxycyclohexyl)ether, bis(3,4-epoxycyclohexylmethyl)adipate, diglycidyl phthalate, diglycidyl terephthalate, diglycidyl hexahydrophthalate, diglycidyl tetrahydrophthalate, tris(2,3-epoxypropyl)isocyanurate, 3-ethyl-3-hydroxymethyloxetane, 3-ethyl-3-(phenoxymethyl)oxetane, bis[(1-ethyl-3-oxetanyl)methyl]ether, 3-ethyl-3-hydroxymethyloxetane, 3-methyl-3-hydroxymethyloxetane, and 3-ethyl-3-(2-ethylhexyloxymethyl)oxetane.

A specific example further includes vinyl-type compounds such as ethyl vinyl ether, hydroxybutyl monovinyl ether, t-amyl vinyl ether and cyclohexanedimethanol methyl vinyl ether in addition to the epoxy-type compounds described above.

A non-ionic surfactant may be added to the composition (1) for the purpose of facilitating an application of the composition (1) to a substrate and so forth. A desirable example of the nonionic surfactant includes a fluorine-based nonionic surfactant, a silicone-based nonionic surfactant and a hydrocarbon-based nonionic surfactant. Examples of the fluorine-based nonionic surfactant include BYK-340, Futargent 251, Futargent 221 MH, Futargent 250, FTX-215M, FTX-218M, FTX-233M, FTX-245M, FTX-290M, FTX-209F, FTX-213F, Futargent 222F, FTX-233F, FTX-245F, FTX-208G, FTX-218G, FTX-240G, FTX-206D, Futargent 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M and KB-FaM.

Examples of the silicone-based nonionic surfactant include Polyflow ATF-2, Granol 100, Granol 115, Granol 400, Granol 410, Granol 435, Granol 440, Granol 450, Granol B-1484, Polyflow KL-250, PolyflowKL-260, PolyflowKL-270, PolyflowKL-280, BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-345, BYK-346, BYK-347, BYK-348, BYK-370, BYK-375, BYK-377, BYK-378, BYK-3500, BYK-3510 and BYK-3570. Examples of the hydrocarbon-based nonionic surfactant include Polyflow No. 3, Polyflow No. 50EHF, Polyflow No. 54N, Polyflow No. 75, Polyflow No. 77, Polyflow No. 85HF, Polyflow No. 90, Polyflow No. 95, BYK-350, BYK-352, BYK-354, BYK-355, BYK-358N, BYK-361N, BYK-380N, BYK-381, BYK-392 and BYK-Silclean3700, where the main component is an acryl-type polymer.

Incidentally, both Polyflow and Granol described above are trade names of the products available from Kyoeisha Chemical Co., Ltd. BYK is a trade name of the product available from BYK Additives & Instruments. Futargent, FTX and KB are trade names of the products available from Neos Company Limited.

A surfactant other than the types described above may be added as required. A specific example includes a variety of compounds such as polyether-type compounds, acrylic acid copolymer-type compounds, titanate-type compounds, imidazoline, tertiary ammonium salts, alkylamine oxides, polyamine derivatives, polyoxyethylene-polyoxypropylene condensates, polyethylene glycol and its esters, sodium lauryl sulfate, ammonium lauryl sulfate, amine lauryl sulfates, alkyl-substituted aromatic sulfonates, alkyl phosphates, aliphatic or aromatic sulfonate formaldehyde condensates, lauryl amidopropyl betaine, lauryl aminoacetic acid betaine, polyethylene glycol aliphatic acid esters, polyoxyethylene alkylamines, perfluoroalkylsulfonic acid salts and perfluoroalkylcarboxylic acid salts.

A cationic photopolymerization initiator may be added to the composition (1). The photopolymerization initiator includes diaryliodonium salts (hereinafter referred to as DAS) and triarylsulfonium salts (hereinafter referred to as TAS). Examples of DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, 4-methoxyphenylphenyliodonium p-toluenesulfonate, 4-methoxyphenylphenyliodonium diphenyliodonium tetra(pentafluorophenyl)borate, bis(4-tert-butylphenyl)iodonium diphenyliodonium tetrafluoroborate, bis(4-tert-butylphenyl)iodonium diphenyliodonium hexafluoroarsenate, bis(4-tert-butylphenyl)iodonium diphenyliodonium trifluoromethanesulfonate, bis(4-tert-butylphenyl)iodonium trifluoroacetate, bis(4-tert-butylphenyl)iodonium p-toluenesulfonate and bis(4-tert-butylphenyl)iodonium diphenyliodonium tetra(pentafluorophenyl)borate.

DAS can be sensitized by the addition of a photosensitizer such as thioxanthone, phenothiazine, chlorothioxanthone, xanthone, anthracene, diphenylanthracene and rubrene.

Examples of TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate, 4-methoxyphenyldiphenylsulfonium p-toluenesulfonate, 4-methoxyphenyldiphenylsulfonium triphenylsulfonium tetra(pentafluorophenyl)borate, 4-phenylthiophenyldiphenylsulfonium tetrafluoroborate, 4-phenylthiophenyldiphenylsulfonium hexafluorophosphonate, 4-phenylthiophenyldiphenylsulfonium hexafluoroarsenate, 4-phenylthiophenyldiphenylsulfonium trifluoromethanesulfonate, 4-phenylthiophenyldiphenylsulfonium p-toluenesulfonate and 4-phenylthiophenyldiphenylsulfonium tetra(pentafluorophenyl)borate.

A specific trade name of the cationic photopolymerization initiator includes Cyracure UVI-6990, Cyracure UVI-6974 and Cyracure UVI-6992 available from UCC; Adeka Optomer SP-150, SP-152, SP-170 and SP-172 available from Asahi Denka Kogyo K. K.; Photoinitiator 2074 available from Rhodia Japan Ltd.; Irgacure 250 available from Ciba Japan K. K.; UV-9380C available from GE silicones Inc.; and HS series and CPI series available from San-Apro Ltd, and also includes TPS-series, TAZ-series, DPI-series, BPI-series, MDS-series, DTS-series, SI-series, PI-series, NDI-series, PAI-series, NAI-series, NI-series, DAM-series, MBZ-series, PYR-series, DNB-series and NB-series available from Midori Kagaku Co., Ltd.

A hybrid curing system in which a cationic photopolymerization initiator is added to a radical photopolymerization initiator can be used for the composition (1). Examples of the radical photopolymerization initiator include Darocure 1173 (2-hydroxy-2-methyl-1-phenylpropan-1-one), Irgacure 184 (1-hydroxycyclohexyl phenyl ketone), Irgacure 651 (2,2-dimethoxy-1,2-diphenylethan-1-one), Irgacure 500, Irgacure 2959, Irgacure 907, Irgacure 369, Irgacure 1300, Irgacure 819, Irgacure 1700, Irgacure 1800, Irgacure 1850, Darocure 4265 and Irgacure 784 available from Ciba Japan K. K.

Another example of the radical photopolymerization initiator includes p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a mixture of benzophenone/Michler's ketone, a mixture of hexaarylbiimidazole/mercaptobenzimidazole, 1-(4-isopropylphenyl)-2-hydroxy-2-methylpropan-1-one, benzyldimethylketal, 2-methyl-1-[4-(methylthio)phenyl]-2-morphorinopropan-1-one, a mixture of 2,4-diethylxanthone/methyl p-dimethylaminobenzoate and a mixture of benzophenone/methyltriethanolamine.

A thermal polymerization initiator may be added to the composition (1). Examples of a specific trade name include San-Aid SI-60, SI-80, SI-100, SI-110, SI-145, SI-150, SI-160 and SI-180 (these are main agents), and San-Aid SI (an auxiliary agent) available from Sanshin Chemical Industry Co., Ltd. The initiator may be used together with a radical photopolymerization-initiator and a cationic photopolymerization initiator, or together with a radical photopolymerization initiator.

A hardener may be added to the composition (1). Examples of the hardener include an acidic or basic compound having a group such as amino, carboxyl or mercapto, and a compound having a phenol moiety or an acid anhydride moiety. A more desirable hardener is a basic compound having an amino group, a compound having a phenol moiety and a compound having an acid anhydride moiety. These compounds may be used with a cationic photopolymerization initiator or a photoradical polymerization initiator.

Examples of the hardener having an amino group include diethylenetriamine, triethylenetetramine, tetraethylenepentamine, m-xylenediamine, trimethylhexamethylenediamine, 2-methylpentamethylenediamine, diethylaminopropylamine, isophoronediamine, 1,3-bisaminomethylcyclohexane, bis(4-aminocyclohexyl)methane, norbornenediamine, 1,2-diaminocyclohexane, laromin, diaminodiphenylmethane, methaphenylenediamine, diaminodiphenylsulfone, polyoxypropylenediamine, polyoxypropylenetriamine, polycyclohexylpolyamine mixture and N-aminoethylpyperadine.

Examples of the hardener of a phenol moiety include phenol novolac, xylylene novolac, bisphenol A novolac, triphenylmethane novolac, biphenyl novolac, dicyclopentadiene phenol novolac and terpene phenol novolac.

Examples of the hardener of an acid anhydride moiety include tetrahydrophthalic anhydride, hexahydrophthalic anhydride, methyltetrahydrophthalic anhydride, methylhexahydrophthalic anhydride, nadic methyl anhydride, hydrogenated nadic methyl anhydride, trialkyltetrahydrophthalic anhydride, methylcyclohexene tetracarboxylic dianhydride, phthalic anhydride, trimellitic anhydride, pyromellitic anhydride, benzophenonetetracarboxylic dianhydride, ethylene glycol bis(anhydro-trimellitate), glycerin bis(anhydro-trimellitate)monoacetate, dodecenyl succinic anhydride, polyanhydrides of aliphatic dibasic acid and chlorendic anhydride.

The composition (1) may include a photosensitizer. Examples of the photosensitizer include thioxanetone derivatives, anthraquinone derivatives and naphthoquinone derivatives. A desirable example of the photosensitizer includes the following compounds (Z-1) to (Z-6). An especially desirable example of the photosensitizer includes the compound (Z-1) and the compound (Z-2). The photosensitizer can be used solely or in combination of two or more of them.

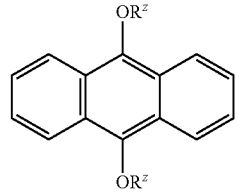
(Z-1)

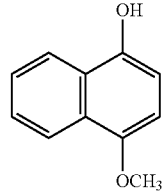
(Z-2)

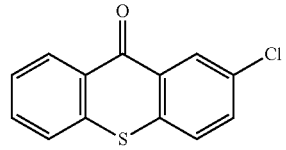
(Z-3)

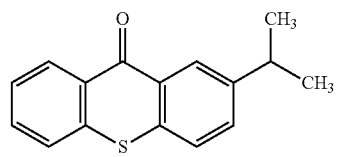
(Z-4)

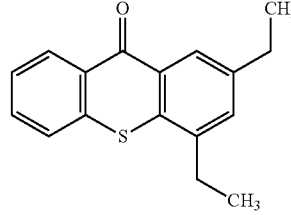
(Z-5)

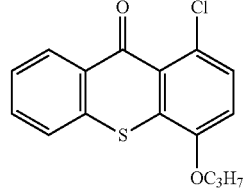
(Z-6)

In these compounds, $R^Z$ is independently straight-chain alkyl having 1 to 10 carbons.

The compound (Z-1) where $R^Z$ is n-butyl is available from Kawasaki Kasei Chemicals Ltd. in the trade name of Anthracure UVS-1331. The compound (Z-2) is available from Kawasaki Kasei Chemicals Ltd. in the trade name of Anthracure ET-2111. The compound (Z-3) is available from Lambson Ltd. in the trade name of Speedcure CTX. The compound (Z-4) is available from Shell Chemical Co. in the trade name of Quantacure ITX. The compound (Z-5) is available from Nippon Kayaku Co., Ltd. in the trade name of Kayacure DETX-S. The compound (Z-6) is available from Lambson Ltd. in the name of Speedcure CPTX.

A combination of DAS and a photosensitizer increases sensitivity to light. A desirable ratio of the photosensitizer is in the range of approximately 10 to approximately 200 weight parts based on 100 weight parts of DAS. A more desirable ratio is in the range of approximately 20 to approximately 100 weight parts based on 100 weight parts of DAS.

An ultraviolet absorber, a light stabilizer (a radical scavenger), an antioxidant or the like may be added to the composition (1) for further increasing weather resistance of the polymer. Examples of the ultraviolet absorber include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, Adeka Stab LA-32, Adeka Stab LA-34, Adeka Stab LA-36, Adeka Stab LA-31, Adeka Stab 1413 and Adeka Stab LA-51. "Tinuvin" is a trade name of Ciba Japan K. K. and "Adeka Stab" is a trade name of Adeka Corporation.

Examples of the light stabilizer include Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, 5060, Tinuvin 5151, Chimassorb 119FL, Chimassorb 944FL, Chimassorb 944LD, Adeka Stab LA-52, Adeka Stab LA-57, Adeka Stab LA-62, Adeka Stab LA-67, Adeka Stab LA-63P, Adeka Stab LA-68LD, Adeka Stab LA-77, Adeka Stab LA-82 and Adeka Stab LA-87; Cyasorb UV-3346 available from Cytec Industries Inc.; and Goodlight UV-3034 available from Goodrich Corporation. "Chimassorb" is a trade name of Ciba Japan K. K.

Examples of the antioxidant include Adeka Stab AO-20, AO-30, AO-40, AG-50, AO-60 and AO-80 available from Adeka Corporation; Sumilizer BHT, Sumilizer BBM-S and Sumilizer GA-80 available from Sumitomo Chemical Co., Ltd.; and Irganox 1076, Irganox 1010, Irganox 3114 and Irganox 245 available from Ciba Japan K.K. These commercial products may be used.

The composition (1) may be cured by use of the base-amplifying reaction under irradiation with light (K. Arimitsu, M. Miyamoto, K. Ichimura, Angew. Chem. Int. Ed, 2000, 39, 3425).

The composition (1) may include a solvent. Usually, the composition (1) is prepared by dissolving each component described above in a solvent. The composition (1) may be further diluted with a solvent to adjust the viscosity for an easy application. The solvent can be used solely or in combination of two or more of them. Examples of the solvent include ester-type solvents, amide-type solvents, alcohol-type solvents, ether-type solvents, glycol monoalkyl ether-type solvents, aromatic hydrocarbon-type solvents, halogenated aromatic hydrocarbon-type solvents, aliphatic hydrocarbon-type solvents, halogenated aliphatic hydrocarbon-type solvents, alicyclic hydrocarbon-type solvents, ketone-type solvents and glycol monoalkyl ether acetate-type solvents.

A desirable example of the ester-type solvents includes alkyl acetates (for example, methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (for example, methyl propionate, methyl 3-methoxypropionate, ethyl propionate, propyl propionate and butyl propionate), alkyl butanoates (for example, methyl butanoate, ethyl butanoate, butyl butanoate, isobutyl butanoate and propyl butanoate), dialkyl malonates (for example, diethyl malonates), alkyl glycolates (for example, methyl glycolate and ethyl glycolate), alkyl lactates (for example, methyl lactate, ethyl lactate, isopropyl lactate, n-propyl lactate, butyl lactate and ethylhexyl lactate), monoacetin, γ-butyrolactone, γ-valerolactone, methyl acetoacetate and 1-methoxy-2-propylacetate.

A desirable example of the amide-type solvents includes N-methyl-2-pyroridone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam and dimethylimidazolidinone.

A desirable example of the alcohol-type solvents includes methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

A desirable example of the ether-type solvents includes ethylene glycol dimethyl ether, diethylene glycol dimethyl ether, bis(2-propyl)ether, 1,4-dioxane and tetrahydrofuran (THF).

A desirable example of the glycol monoalkyl ether-type solvents includes ethylene glycol monoalkyl ethers (for example, ethylene glycol monomethyl ether and ethylene glycol monobutyl ether), diethylene glycol monoalkyl ethers (for example, diethylene glycol monoethyl ether), triethylene glycol monoalkyl ethers, propylene glycol monoalkyl ethers (for example, propylene glycol monobutyl ether), dipropylene glycol monoalkyl ethers (for example, dipropylene glycol monomethyl ether), ethylene glycol monoalkyl ether acetates (for example, ethylene glycol monobutyl ether acetate), diethylene glycol monoalkyl ether acetates (for example, diethylene glycol monoethyl ether acetate), triethylene glycol monoalkyl ether acetates, propylene glycol monoalkyl ether acetates (for example, propylene glycol monomethyl ether acetate, propylene glycol monoethyl ether acetate and propylene glycol monobutyl ether acetate), dipropylene glycol monoalkyl ether acetates (for example, dipropylene glycol monomethyl ether acetate) and diethylene glycol methyl ethyl ether.

A desirable example of the aromatic hydrocarbon-type solvents includes benzene, toluene, xylene, mesitylene, ethylbenzene, diethylbenzene, i-propylbenzene, n-propylbenzene, t-butylbenzene, s-butylbenzene, n-butylbenzene and tetraline. A desirable example of the halogenated aromatic hydrocarbon-type solvents includes chlorobenzene. A desirable example of the aliphatic hydrocarbon-type solvents includes hexane and heptane. A desirable example of the halogenated aliphatic hydrocarbon-type solvents includes chloroform, dichloromethane, carbon tetrachloride, dichloroethane, trichloroethylene and tetrachloroethylene. A desirable example of the alicyclic hydrocarbon-type solvents includes cyclohexane and decaline.

A desirable example of the ketone-type solvents includes acetone, methyl ethyl ketone, methyl isobutyl ketone, cyclohexanone, cyclopentanone and methyl propyl ketone.

A desirable example of the glycol monoalkyl ether acetate-type solvents includes ethylene glycol monomethyl ether acetate, propylene glycol monomethyl ether acetate and propylene glycol monoethyl ether acetate.

The amide-type solvents, the aromatic hydrocarbon-type solvents and the ketone-type solvents are desirable in view of the solubility of the polymerizable liquid crystal compound.

The ester-type solvents, the alcohol-type solvents, the ether-type solvents and the glycol monoalkyl ether-type solvents are also desirable in consideration of the boiling points of the solvents. Although selection of the solvent is not especially limited, it is necessary to decrease drying temperature in order to avoid deformation of a supporting substrate and to prevent erosion of the supporting substrate caused by the solvent when a plastic substrate is used as the supporting substrate. A desirable example of the solvent used in such cases includes the aromatic hydrocarbon-type solvents, the ketone-type solvents, the ester-type solvents, the ether-type solvents, the alcohol-type solvents, the acetate-type solvents and the glycol monoalkyl ether-type solvents. In such solvents, it is very important that solubility in a highly safe organic solvent is high. Examples of the highly safe organic solvent are ethyl lactate, ethyl pyruvate, 2-heptanone, butyl acetate, methyl 3-methoxypropionate, methyl 3-ethoxypropionate and propylene glycol monoethyl ether acetate.

The amount of the solvent may be adjusted according to the use of the composition (1). When a thin film is prepared on a substrate, the ratio of the solvent is in the range of 0% to approximately 95% by weight based on the total weight of the composition (1) and the solvent. A desirable ratio is in the range of approximately 40% to approximately 95% by weight in view of the solubility of the polymerizable liquid crystal compound and an optimum viscosity for applying the solution, and also in an economic view of the solvent cost, and the period of time and the amount of heat consumed during evaporation of the solvent. A more desirable ratio is in the range of approximately 45% to approximately 90% by weight and an even more desirable ratio is in the range of approximately 50% to approximately 85% by weight.

Next, polymerization conditions of the composition (1) will be explained. A polymer is formed by the polymerization of the composition (1). Polymerization in the presence of a photopolymerization catalyst is preferable to thermal polymerization when a polymer with an excellent orientation is desired. This is because the polymerization can be carried out readily under the conditions that the composition exhibits a liquid crystal state.

Desirable kinds of light used for photopolymerization include ultraviolet light, visible light and infrared light. Electron beams or electromagnetic waves such as X-rays may be used. Ultraviolet light and visible light are usually desirable. Desirable wavelengths are in the range of approximately 150 nm to approximately 500 nm. More desirable wavelengths are in the range of approximately 250 nm to approximately 450 nm and most desirable wavelengths are in the range of approximately 300 nm to approximately 400 nm. Examples of a light source include a low-pressure mercury lamp (a germicidal lamp, a chemical fluorescent lamp and a black light), a high-pressure discharge lamp (a high-pressure mercury lamp and a metal halide lamp) and a short-arc lamp (an ultra high-pressure mercury lamp, a xenon lamp and a mercury-xenon lamp). A desirable light source is a high-pressure mercury lamp. The composition (1) may be irradiated directly with light from the light source. The composition (1) may be irradiated with light of a specific wavelength (or specific range of wavelengths) selected by a filter. Desirable irradiation energy density is in the range of approximately 2 to approximately 5,000 mJ/cm$^2$. More desirable irradiation energy density is in the range of approximately 10 to approximately 3,000 mJ/cm$^2$. Most desirable irradiation energy density is in the range of approximately 100 to approximately 2,000 mJ/cm$^2$. Desirable illuminance is in the range of approximately 0.1 to approximately 5,000 mW/cm$^2$. More desirable illuminance is in the range of approximately 1 to approximately 2,000 mW/cm$^2$. Temperature on irradiation with light is setup in order that the composition (1) exhibits a liquid crystal phase. A desirable irradiation temperature is approximately 100° C. or lower. An excellent orientation may not be attained, in certain cases, at approximately 100° C. or higher because of possible thermal polymerization.

The form of the polymer may be filmy, platy, granular, powdery and so forth. The polymer may be molded. A supporting substrate is generally employed to form a filmed polymer. The polymer film is obtained by application of the composition (1) to the supporting substrate and then by the polymerization of the paint film exhibiting a liquid crystal phase. A desirable thickness of the polymer depends on the value of optical anisotropy and usage of the polymer. In general, a desirable thickness is in the range of approximately 0.05 to approximately 50 µm. A more desirable thickness is in the range of approximately 0.1 to approximately 20 µm. An especially desirable thickness is in the range of approximately 0.5 to approximately 10 µm. A haze value (cloudiness) of the polymer is generally approximately 1.5% or less. Transmittance of the polymer is generally approximately 80% or more in the visible light range. Such a polymer is suitable for a thin film with optical anisotropy used for a liquid crystal display device.

Examples of materials used for a supporting substrate include triacetyl cellulose (may be referred to as TAC), polyvinyl alcohol, polyimide, polyester, polyarylate, polyetherimide, polyethylene terephthalate and polyethylene naphthalate. Examples of the trade name include "Arton" of JSR Corporation, "Zeonex" and "Zeonor" of Zeon Corporation and "Apel" of Mitsui Chemicals, Inc. The supporting substrate includes a uniaxially stretched film and a biaxially stretched film. A desirable supporting substrate is a triacetyl cellulose film. The film may be used without pre-treatment. The film may be processed by means of a surface treatment as required, such as saponification treatment, corona treatment, UV-ozone treatment and plasma treatment. An additional example includes a supporting substrate made of metal such as aluminum, iron and copper, and a supporting substrate made of glass such as alkali glass, borosilicate glass and flint glass.

A paint film on a supporting substrate is prepared by application of the composition (1) as a neat liquid. The paint film is also prepared by dissolution of the composition in a suitable solvent and then by evaporation of the solvent. An application method includes spin coating, roll coating, curtain coating, flow coating, printing, micro-gravure coating, gravure coating, wire-bar coating, dip coating, spray coating, meniscus coating and casting film-forming.

In the composition (1), factors determining orientation of liquid crystal molecules includes (i) the kinds of compounds included in the composition, (ii) the kinds of a supporting substrate, and (iii) the kinds of methods of alignment treatment. A desirable method of the alignment treatment includes oblique-deposition of silicon oxide and slit etching. An especially desirable method for alignment treatment includes rubbing treatment in which the surface is rubbed with a rayon cloth in one direction. In the rubbing treatment, a supporting substrate itself may be rubbed. A supporting substrate that is coated with a thin film of polyimide, polyvinyl alcohol or the like may be rubbed. A specific thin film on which an excellent alignment is possible without rubbing treatment is also known. A supporting substrate coated with a liquid crystal polymer having a side chain is also effective.

A classification of orientation in liquid crystal molecules includes homogeneous orientation (parallel orientation), homeotropic orientation (perpendicular orientation) and hybrid orientation. The homogeneous orientation means a state in which the directors are parallel to a supporting substrate and are arranged in one direction. The homeotropic orientation means a state in which the directors are perpendicular to a supporting substrate. The hybrid orientation means a state in which the director are going to stand up, from a parallel direction to a perpendicular direction to the substrate as the distance from a substrate is increased. These orientations are observed in the composition having a nematic phase and so forth.

The composition (1) may include an optically active compound. The composition in which a suitable amount of an optically active compound has been added is applied to a substrate with surface alignment and then is polymerized, giving an optical retardation plate having a helical structure (a twist structure). The helical structure is fixed by the polymerization of the compound (1). Characteristics of the resulting polymer having optical anisotropy depend on a helical pitch in the helical structure. The length of the helical pitch can be adjusted by the kinds and the amount of the optically active compound. Only one optically active compound may be added, or a plurality of optically active compounds may be added for the purpose of compensating the temperature dependence of the helical pitch.

The selective reflection of visible light, which is the characteristics of the polymer having optical anisotropy described above, arises from the action of a helical structure on incident light, which leads to the reflection of circularly polarized light or elliptically polarized light. Characteristics of the selective reflection are expressed as a function of $\lambda = n \cdot \text{Pitch}$; where $\lambda$ stands for the central wavelength of selective reflection, n stands for an average refractive index and Pitch stands for a helical pitch. Hence, the wavelength ($\lambda$) or the wavelength width ($\Delta\lambda$) can be suitably adjusted by varying the value of n or Pitch. When a helical pitch is 1/n (n stands for an average refractive index) of a wavelength of light, right- or left-circularly polarized light can be reflected according to Bragg's law, depending on the direction of the helix. The polymer can be utilized to, for example, a polarization separation element. The direction of the helix depends on configuration of an optically active compound. A desired helical direction can be induced by a suitable selection of the configuration of the optically active compound. For example, a polymer having optical anisotropy can be obtained in which a helical pitch changes consecutively in the thickness-direction of the polymer, according to the method disclosed in JP H06-281814 A (1994), and then it can reflect light with a wavelength range that depends on the pitch. The wavelength width ($\Delta\lambda$) should be decreased for an improvement of color purity, and the wavelength width ($\Delta\lambda$) should be increased for reflection in a broad range. Furthermore, the selective reflection is greatly affected by cell thickness. The cell thickness should not be made too small for maintaining color purity. The cell thickness should not be made too large for maintaining orientational uniformity. Thus, a suitable adjustment of the cell thickness is necessary, and a desirable cell thickness is in the range of approximately 0.5 μm to approximately 25 μm, and a more desirable cell thickness is in the range of approximately 0.5 μm to approximately 5 μm.

The negative-type C-plate (negative C-plate) described in W. H. de Jeu, Physical Properties of Liquid Crystalline Materials, Gordon and Breach, New York (1980) can be prepared by making the helical pitch shorter than the wavelengths of visible light. A shorter helical pitch can be achieved by use of an optically active compound having a large twisting power (HTP: helical twisting power) and by increasing the amount of the compound. The negative-type C-plate can be formed specifically when $\lambda$ is approximately 350 nm or less, and preferably approximately 200 nm or less. This negative-type C-plate serves as an optical compensation film suitable for a liquid crystal display device of a VAN-type, a VAC-type, an OCB-type or the like.

Any optically active compound may be used if the optically active compound can induce a helical structure and can be mixed appropriately with the polymerizable liquid crystal composition. The optically active compound may be polymerizable or non-polymerizable, and an optimum compound can be added in accordance with a purpose. The polymerizable compound is more suitable when heat resistance and solvent resistance are taken into consideration. Examples of a skeleton which exhibits optical activity include alkylene and alkenylene having one or more asymmetric carbons, or compounds having the following partial structures.

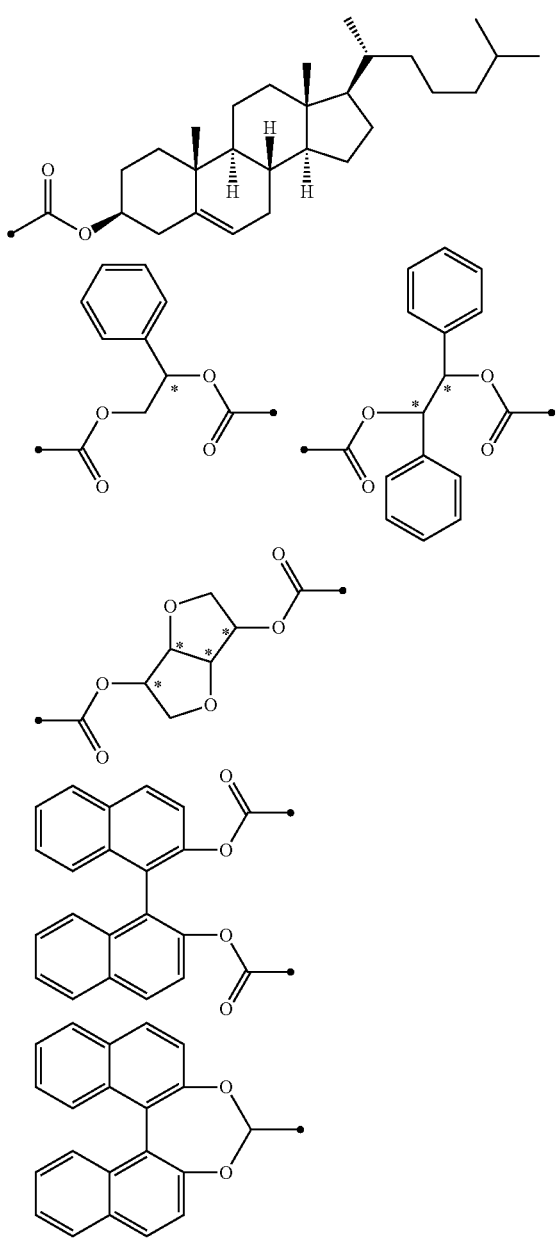

An optically active compound having a large twisting power (HTP: helical twisting power) among the compounds described above is suitable for decreasing the helical pitch. A representative example of a compound having a large twisting power is described in GB 2,298,202.

A more desirable example of a polymerizable compound having optical activity includes the following compounds.
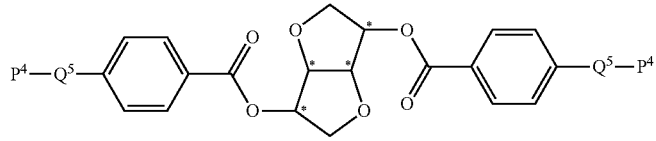
(6-1)
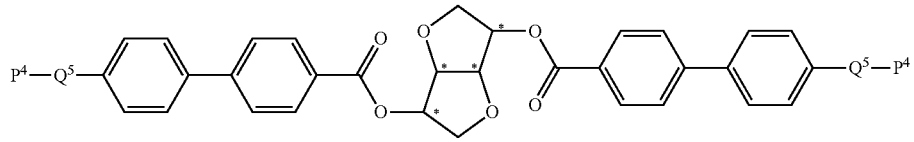
(6-2)
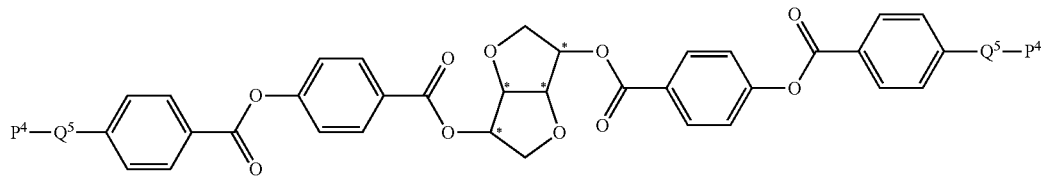
(6-3)
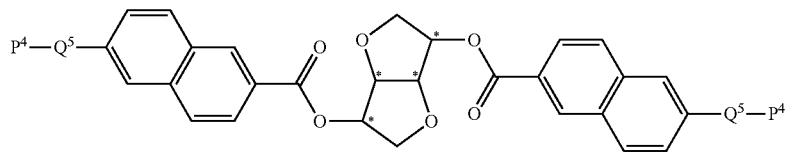
(6-4)
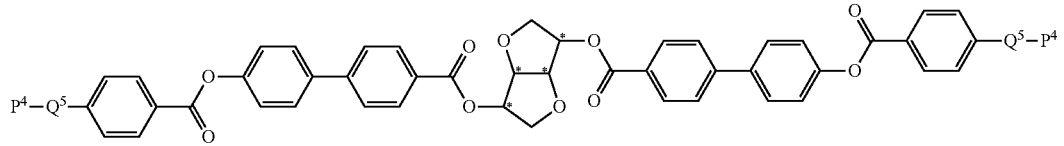
(6-5)
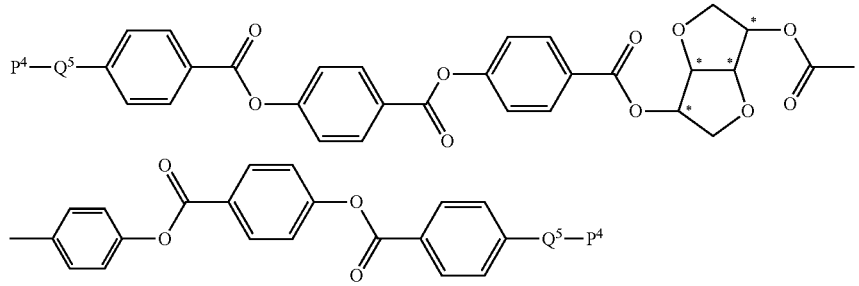
(6-6)
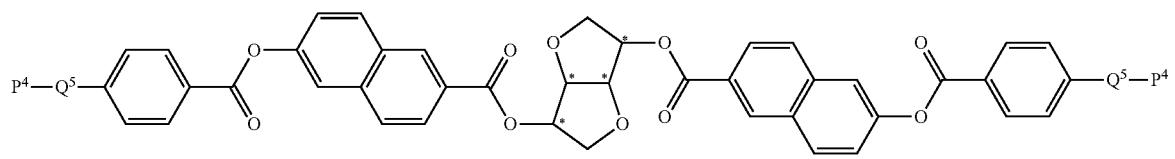
(6-7)
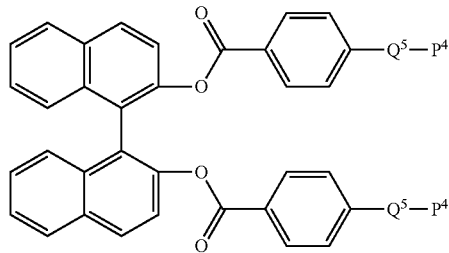
(6-8)

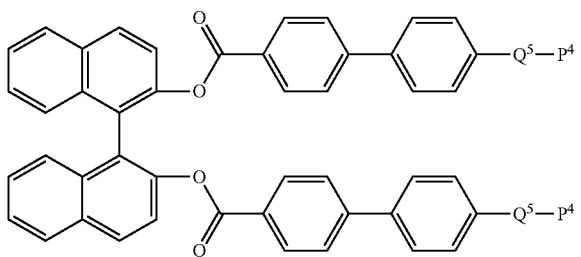
(6-9)
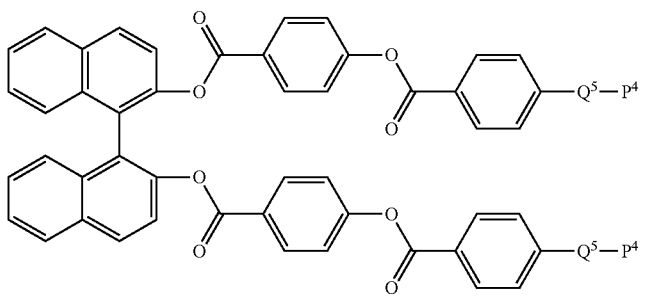
(6-10)
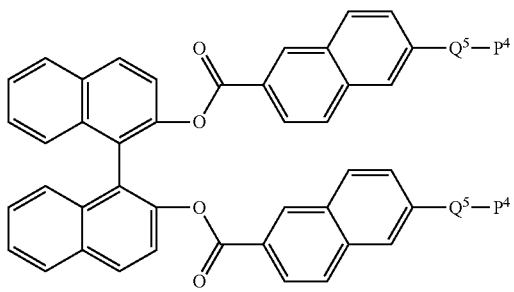
(6-11)
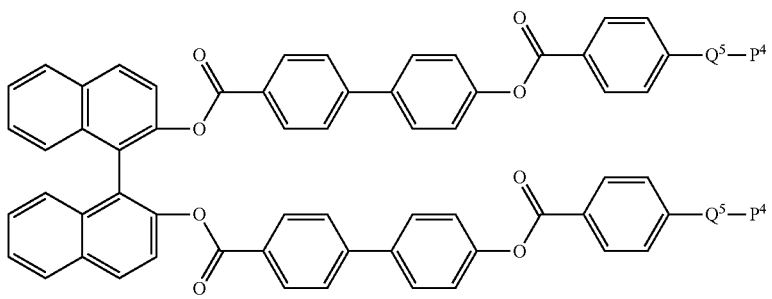
(6-12)
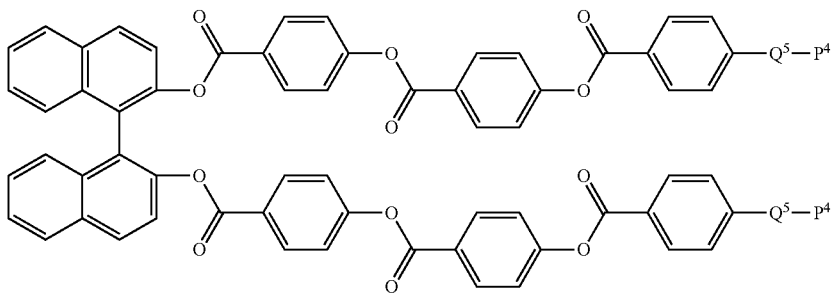
(6-13)

(6-14)

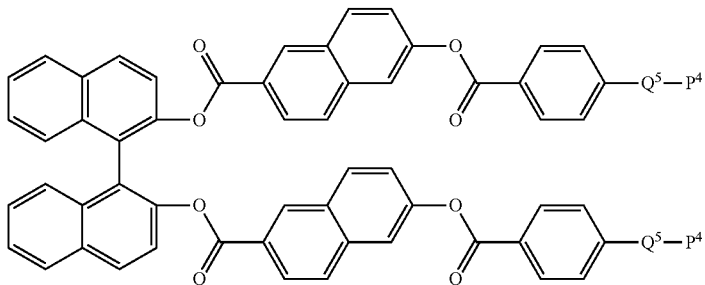

Next, the polymer of the invention will be explained. The polymer is formed by the polymerization of the compound (1). The polymer that is formed by the polymerization of the compound (1) satisfies a plurality of such characteristics that it is colorless and transparent, the photoelasticity is small, it is hard to be peeled, it has a sufficient hardness, the heat resistance is large, and the weather resistance is large.

Usage of the polymer is as follows. The polymer can be used as a formed body having optical anisotropy. Examples of the use of the polymer include an optical film such as an optical retardation plate (a half-wave plate, a quarter-wave plate and so forth), an antireflection film, a selective reflection film and a viewing angle-compensation film. The polymer having an orientation such as homogeneous, hybrid, homeotropic or twist can be utilized for an optical retardation plate, a polarizer, a liquid crystal alignment film, an antireflection film, a selective reflection film, a viewing angle-compensation film, and so forth. Such a polymer is utilized for an optical retardation plate and a viewing angle-compensation film of a liquid crystal display device, for the purpose of optical compensation. An important use example in industry includes viewing angle-compensation in the liquid crystal display device with a mode of VA, IPS, TN or MVA. The polymer can be utilized for epoxy resins having a high thermal conductivity, adhesives, synthetic polymers having mechanical anisotropy, cosmetics, an ornament, non-linear optical materials, information storage materials and so forth.

An optical retardation plate, which is one of examples of usage of the polymer, has a function that converts the state of polarized light. A half-wave plate has a function in which the direction of oscillation in linearly polarized light is rotated 90 degrees. The composition is applied to a supporting substrate so as to satisfy the equation of $d=\lambda/2\times\Delta n$, wherein d is the polymer film thickness, $\lambda$ is a wavelength and $\Delta n$ is optical anisotropy. After the orientation of the composition, the photopolymerization gives a half-wave plate. On the other hand, a quarter-wave plate has a function in which linearly polarized light is converted to circularly polarized light or circularly polarized light is converted to linearly polarized light. In this case, the paint film of the composition may be prepared so as to satisfy the equation of $d=\lambda/4\times\Delta n$. The polymer film thickness (d) is adjusted as follows. A paint film having an objective thickness can be obtained by a suitable selection of the concentration of the composition, the method of application, the conditions of application and so forth, when the composition is diluted with a solvent and then applied to a supporting substrate. A method that utilizes a liquid crystal cell is also desirable. The liquid crystal cell is convenient because it contains an alignment film of polyimide or the like. The thickness of a paint film can be adjusted by regulating the interval of a liquid crystal cell, when the composition is injected to the liquid crystal cell.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention is explained by way of the following Examples, but not limited to Examples. The structures of compounds were characterized by means of their nuclear magnetic resonance spectra, infrared spectra, mass spectra and so forth. The transition temperature was expressed in the degree Celsius (° C.), and the symbols C and I stand for crystals and an isotropic liquid phase, respectively. A parenthesized value shows that the phase transition is monotropic. In Example, the symbol L represents the liter that is a unit of volume. Methods of measurement are as follows.
<Structural Determination of Compounds>

The structures of synthesized compounds were determined by means of a 500 MHz-proton NMR spectroscopy Bruker Model DRX-500. A unit of described values is ppm and the symbols s, d, t and m stand for a singlet, a doublet, a triplet and a multiplet, respectively.
<Phase Transition Temperature>

A sample was placed on a hot plate of a melting point apparatus equipped with a polarizing microscope and heated at a rate of 3° C./minute. Temperature was measured when a liquid crystal phase was transformed to another liquid crystal phase. The symbols C, N and I stand for crystals, a nematic phase and isotropic liquid, respectively. A clearing point (NI-point) means the maximum temperature of a nematic phase or transition temperature from a nematic phase to isotropic liquid. "C 50 N 63 I" shows that crystals were transformed to a nematic phase at 50° C. and the nematic phase was transformed to isotropic liquid at 63° C.
<Orientation of Liquid Crystal Molecules>

A polymer film (a liquid crystal alignment film) was formed on a glass substrate having a rubbed polyimide alignment film. Orientation of the polymer was determined by visual observation in the following way based on the angle dependence of transmitted light intensity.
(1) Visual Observation:

A polymer film was placed between two polarizers that were arranged in the crossed Nicols and the film surface was irradiated with light vertically (the tilt angle was zero degrees). The change of transmitted light intensity was observed while the tilt angle of irradiation increased, for example, from zero degrees to 50 degrees. The tilt direction of irradiation was the same with that of the rubbing (a major axis direction of liquid crystal molecules). Orientation was determined to be homogeneous when transmitted light in the vertical direction was maximized. The polymer film functions as an A-plate, because the director of liquid crystal molecules is parallel to the glass substrate in the homogeneous orientation. On the other hand, orientation was determined to be homeotropic when transmitted light in the vertical direction was minimized, and transmitted light increased as a tilt angle was increased. The polymer film functions as a C-plate, because the director of liquid crystal molecules is perpendicular to the glass substrate in the homeotropic orientation.

(2) Measurement with a Polarimeter:

An Optipro polarimeter made by Shintech, Inc. was used. A polymer film was irradiated with light of wavelength at 550 nm. Retardation (Δn×d) was measured while the incident angle of light to the film surface was decreased from 90 degrees.

Example 1

Preparation of the Compound (1-1-2)

The First Step:

p-Toluenesulfonyl chloride (243.5 g) was added to a cooled mixture of 3-methyl-3-buten-1-ol (100.0 g), pyridine (180 mL) and toluene (400 mL) under an atmosphere of nitrogen and the stirring was continued at room temperature for another 16 hours. Precipitated salts were filtered off under reduced pressure. Water (400 mL) and pyridine (100 mL) were added to the filtrate and the stirring was continued at 40° C. for another 2 hours. The organic phase was separated and washed sequentially with 2N-hydrochloric acid, a saturated aqueous solution of sodium hydrogencarbonate and water, and then dried over anhydrous magnesium sulfate. Distillation of the solvent gave crude colorless oil [H1] (244.5 g).

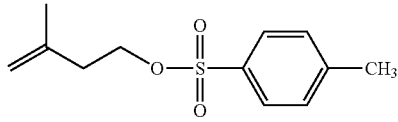

[H1]

Second Step:

A mixture of the compound [H1] (120.0 g), methyl 4-hydroxybenzoate (83.6 g), potassium hydroxide (30.8 g) and Solmix A-11 (400 mL; available from Japan Alcohol Trading Co., Ltd; hereinafter abbreviated expressed as Solmix) were heated to reflux with stirring under an atmosphere of nitrogen for 6 hours. The solvent was distilled off under reduced pressure, and water (300 mL) and toluene (300 mL) was added to the residue, separating an organic phase. The organic phase was washed sequentially with a saturated aqueous solution of sodium hydrogencarbonate and water, and the solvent was distilled off under reduced pressure.

Next, methanol (300 mL), water (300 mL) and potassium hydroxide (33.6 g) were added to the residue and the mixture was heated to reflux with stirring for 3 hours. The solvent was distilled off under reduced pressure, and 3N-hydrochloric acid (200 mL) and ethyl acetate (200 mL) were added to the residue, separating an organic phase. The organic phase was washed with water, and the solvent was distilled off under reduced pressure. Recrystallization from toluene gave colorless crystals of the compound [H2] (86.5 g).

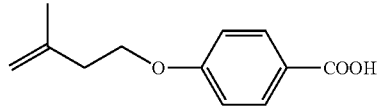

[H2]

NMR analysis data of the compound [H2] are as follows; $^1$H-NMR (CDCl$_3$; δ ppm): 8.06 (d, 2H), 6.95 (d, 2H), 4.83 (d, 2H), 4.15 (t, 2H), 2.53 (t, 2H) and 1.82 (m, 3H).

Third Step:

p-Toluenesulfonyl chloride (243.5 g) was added to a cooled mixture of 4-penten-1-ol (100 g), pyridine (100 mL) and toluene (300 mL) under an atmosphere of nitrogen and the stirring was continued at room temperature for another 16 hours. Precipitated salts were filtered off under reduced pressure. Water (300 mL) and pyridine (100 mL) were added to the filtrate and the mixture was stirred at 40° C. for 2 hours. The organic phase was separated and washed sequentially with 2N-hydrochloric acid, a saturated aqueous solution of sodium hydrogencarbonate and water, and then dried over anhydrous magnesium sulfate. Distillation of the solvent gave colorless oil (243.9 g).

Next, a mixture of the resulting oil (50.0 g), hydroquinone (45.8 g), potassium hydroxide (46.7 g) and methanol (250 mL) was heated to reflux with stirring for 4 hours. The solvent was distilled off under reduced pressure, and 2N-hydrochloric acid was added to the residue for neutralization. The mixture was extracted with toluene. The organic phase was washed sequentially with a saturated aqueous solution of sodium hydrogencarbonate and water, and then dried over anhydrous magnesium sulfate. The solvent was distilled off under reduced pressure and the residue was purified by means of column chromatography (silica gel; eluent: a mixed solvent of toluene/ethyl acetate=4/1 by volume) and recrystallization from heptane, giving colorless crystals of the compound [H3] (22.6 g).

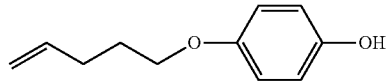

[H3]

NMR analysis data of the compound [H3] are as follows; $^1$H-NMR (CDCl$_3$; δ ppm): 6.79 (d, 2H), 6.74 (d, 2H), 5.89-5.80 (m, 1H), 5.06 (d, 1H), 5.03 (d, 1H), 3.91 (t, 2H), 2.26-2.20 (m, 2H) and 1.89-1.83 (m, 2H).

Fourth Step:

DCC (18.4 g) was added to a cooled mixture of the compound [H2] (17.4 g), the compound [H3] (15.0 g), DMAP (2.1 g) and dichloromethane (150 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=12/1 by volume), giving colorless crystals (26.4 g).

Next, m-chloroperoxybenzoic acid (38.3 g) was added to a cooled dichloromethane (240 mL) solution of the resulting crystals (24.0 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: a mixed solvent of toluene/ethyl acetate=4/1 by volume) and recrystallization from a mixed solvent (toluene/methanol=1/10 by volume), giving colorless crystals of the compound (1-1-2) (21.7 g).

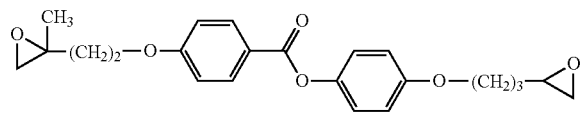

(1-1-2)

Phase transition temperature and NMR analysis data of the compound (1-1-2) are as follows: C, 61; (N, 25); I. $^1$H-NMR (CDCl$_3$; δ ppm): 8.13 (d, 2H), 7.10 (d, 2H), 6.96 (d, 2H), 6.91 (d, 2H), 4.20-4.11 (m, 1H), 4.07-3.98 (m, 1H), 3.02-2.97 (m, 1H), 2.78 (t, 1H), 2.74 (d, 1H), 2.65 (d, 1H), 2.18-2.05 (m, 2H), 2.03-1.89 (m, 2H), 1.87-1.78 (m, 1H), 1.72-1.63 (m, 1H) and 1.42 (s, 3H).

Example 2

Preparation of the Compound (1-1-4)

First Step:

A mixture of the compound [H1] (120.0 g), hydroquinone (110.0 g), potassium hydroxide (112.1 g) and methanol (600 mL) was heated to reflux with stirring under an atmosphere of nitrogen for 4 hours. The solvent was distilled off under reduced pressure, and 2N-hydrochloric acid was added to the residue for neutralization. The mixture was extracted with toluene. The organic phase was washed sequentially with a saturated aqueous solution of sodium hydrogencarbonate and water, and then dried over anhydrous magnesium sulfate. Distillation of the solvent under reduced pressure gave crude colorless oil [H4] (61.7 g).

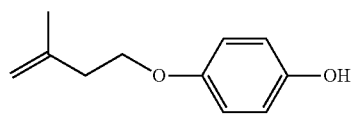

[H4]

Second Step:

DCC (18.4 g) was added to a cooled mixture of the compound [H2] (17.4 g), the compound [H4] (15.0 g), DMAP (2.1 g) and dichloromethane (150 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=12/1 by volume), giving colorless crystals (24.8 g).

Next, m-chloroperoxybenzoic acid (35.1 g) was added to a cooled dichloromethane (220 mL) solution of the resulting crystals (22.0 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: a mixed solvent of toluene/ethyl acetate=4/1 by volume) and recrystallization from a mixed solvent (toluene/methanol=1/10 by volume), giving colorless crystals of the compound (1-1-4) (12.2 g).

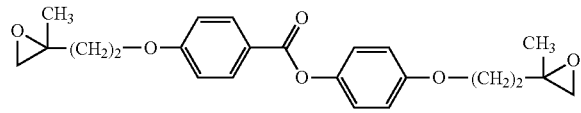

(1-1-4)

Phase transition temperature and NMR analysis data of the compound (1-1-4) are as follows: C, 68; I. $^1$H-NMR (CDCl$_3$; δ ppm): 8.14 (d, 2H), 7.11 (d, 2H), 6.97 (d, 2H), 6.92 (d, 2H), 4.20-4.02 (m, 2H), 2.76-2.74 (m, 2H), 2.68-2.64 (m, 2H), 2.18-2.01 (m, 4H), 1.42 (s, 3H) and 1.41 (s, 3H).

Example 3

Preparation of the Compound (1-1-14)

First Step:

A mixture of 3-chloro-2-methyl-1-propene (50.0 g), butanediol (74.6 g), sodium hydroxide (165.6 g), tetrabutylammonium bromide (26.7 g), toluene (100 mL) and water (200 mL) was heated to reflux with stirring for 5 hours under an atmosphere of nitrogen. The organic phase was separated and washed sequentially with a saturated aqueous solution of sodium hydrogencarbonate and water, and then dried over anhydrous magnesium sulfate. The solvent was distilled off under reduced pressure and the residue was purified by means of column chromatography (silica gel; eluent: a mixed solvent of toluene/ethyl acetate=2/1 by volume), giving colorless oil (43.0 g).

Next, p-toluenesulfonyl chloride (62.5 g) was added to a cooled mixture of the resultant oil (43.0 g), pyridine (50 mL) and toluene (170 mL) under an atmosphere of nitrogen and the stirring was continued at room temperature for another 16 hours. Precipitated salts were filtered off under reduced pressure. Water (100 mL) and pyridine (50 mL) were added to the filtrate and the stirring was continued at 40° C. for 2 hours. The organic phase was separated and washed sequentially with 2N-hydrochloric acid, a saturated aqueous solution of sodium hydrogencarbonate and water, and then dried over anhydrous magnesium sulfate. Distillation of the solvent under reduced pressure gave crude colorless oil [H5] (65.8 g).

[H5]

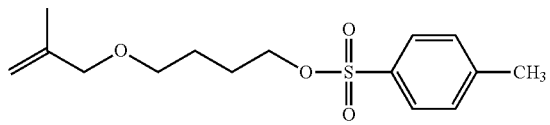

Second Step:

A mixture of the compound [H5] (65.8 g), methyl 4-hydroxybenzoate (40.3 g), potassium hydroxide (14.9 g) and Solmix (150 mL) was heated under reflux with stirring for 3 hours under an atmosphere of nitrogen. The solvent was distilled off under reduced pressure, and water (200 mL) and toluene (200 mL) were added to the residue, separating an organic phase. The organic phase was washed sequentially with a saturated aqueous solution of sodium hydrogencarbonate and water, and then the solvent was distilled off under reduced pressure. The residue was purified by means of column chromatography (silica gel; eluent: a mixed solvent of toluene/ethyl acetate=8/1 by volume), and the solvent was distilled off under reduced pressure from the eluent.

Next, methanol (150 mL), water (150 mL) and potassium hydroxide (14.9 g) were added to the residue, and the mixture was heated under reflux with stirring for 3 hours. The solvent was distilled off under reduced pressure, and 3N-hydrochloric acid (100 mL) and toluene (100 mL) were added to the residue, separating an organic phase. The organic phase was washed with water, and the solvent was distilled off under reduced pressure. Recrystallization from heptane gave colorless crystals of the compound [H6] (37.7 g).

[H6]

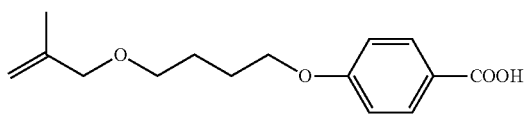

NMR analysis data of the compound [H6] are as follows: $^1$H-NMR (CDCl$_3$; δ ppm): 7.79 (d, 2H), 7.34 (d, 2H), 4.87 (d, 2H), 4.06 (t, 2H), 3.81 (s, 2H), 3.35 (t, 2H), 2.45 (s, 3H), 1.80-1.73 (m, 2H) and 1.64-1.57 (m, 2H).

Third Step:

DCC (24.5 g) was added to a cooled mixture of the compound [H6] (30.0 g), methylhydroquinone (6.9 g), DMAP (2.8 g) and dichloromethane (300 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=16/1 by volume), giving colorless crystals (19.7 g).

Next, m-chloroperoxybenzoic acid (18.3 g) was added to a cooled dichloromethane (190 mL) solution of the resultant crystals (19.3 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: a mixed solvent of toluene/ethyl acetate=4/1 by volume) and recrystallization from a mixed solvent (toluene/methanol=1/10 by volume), giving colorless crystals of the compound (1-1-14) (14.7 g).

(1-1-14)

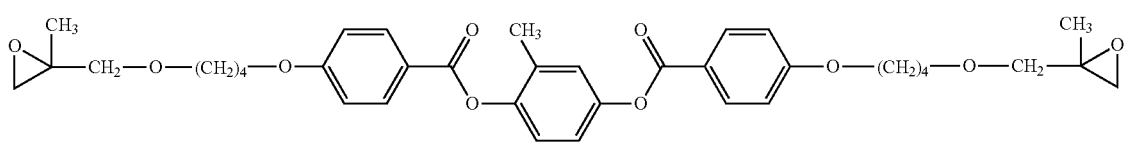

Phase transition temperature and NMR analysis data of the compound (1-1-14) are as follows: C, 70; N, 102; I. $^1$H-NMR (CDCl$_3$; δ ppm): 8.17 (d, 2H), 8.13 (d, 2H), 7.17 (d, 1H), 7.13 (d, 1H), 7.10-7.07 (m, 1H), 6.99 (d, 2H), 6.97 (d, 2H), 4.02-3.97 (m, 4H), 3.63-3.52 (m, 6H), 3.41 (d, 2H), 2.76 (d, 2H), 2.64 (d, 2H), 2.24 (s, 3H), 1.97-1.89 (m, 4H), 1.83-1.76 (m, 4H) and 1.39 (s, 6H).

Example 4

Preparation of the Compound (1-2-12)

First Step:

The compound [H6] was prepared according to the procedure described in the first and second steps of Example 3.

Second Step:

DCC (14.2 g) was added to a cooled mixture of the compound [H6] (20.0 g), 4-methoxyphenol (8.2 g), DMAP (1.6 g) and dichloromethane (200 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=16/1 by volume), giving colorless crystals (13.2 g).

Next, m-chloroperoxybenzoic acid (10.4 g) was added to a cooled dichloromethane (140 mL) solution of the resultant crystals (13.2 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: a mixed solvent of toluene/ethyl acetate=4/1 by volume) and recrystallization from a mixed solvent (toluene/methanol=1/10 by volume), giving colorless crystals of the compound (1-2-12) (11.4 g).

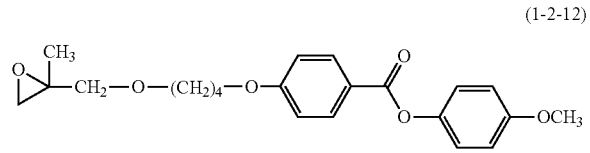
(1-2-12)

Phase transition temperature and NMR analysis data of the compound (1-2-12) are as follows: C, 70; I. $^1$H-NMR (CDCl$_3$; δ ppm): 8.13 (d, 2H), 7.11 (d, 2H), 6.96 (d, 2H), 6.93 (d, 2H), 4.08 (t, 2H), 3.82 (s, 3H), 3.61-3.52 (m, 3H), 3.40 (d, 1H), 2.75 (d, 2H), 2.64 (d, 2H), 1.96-1.87 (m, 2H), 1.82-1.74 (m, 2H) and 1.38 (s, 3H).

Example 5

Preparation of the Compound (1-1-29)

First Step:

A mixture of 3-chloro-2-methyl-1-propene (50.0 g), methyl 4-hydroxybenzoate (92.4 g), sodium hydroxide (24.3 g) and methanol (300 mL) was heated to reflux with stirring for 6 hours under an atmosphere of nitrogen. The solvent was distilled off under reduced pressure, and water (300 mL) and toluene (300 mL) were added to the residue, separating an organic phase. The organic phase was washed sequentially with a saturated aqueous solution of sodium hydrogencarbonate and water, and the solvent was distilled off under reduced pressure.

Next, methanol (200 mL), water (200 mL) and sodium hydroxide (24.3 g) were added to the residue, and the mixture was heated to reflux with stirring for 3 hours. The solvent was distilled off under reduced pressure, and 3N-hydrochloric acid (200 mL) and ethyl acetate (400 mL) were added to the residue, separating an organic phase. The organic phase was washed with water and the solvent was distilled off under reduced pressure. Recrystallization from ethanol gave colorless crystals of the compound [H7] (57.6 g).

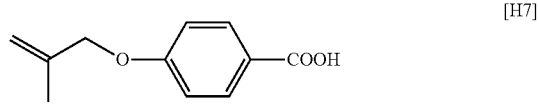
[H7]

NMR analysis data of the compound [H7] are as follows;
$^1$H-NMR (CDCl$_3$; δ ppm): 8.06 (d, 2H), 6.96 (d, 2H), 5.06 (d, 2H), 4.51 (s, 2H) and 1.84 (s, 3H).

Second Step:

DCC (33.8 g) was added to a cooled mixture of the compound [H7] (30.0 g), methylhydroquinone (9.5 g), DMAP (3.8 g) and dichloromethane (300 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=16/1 by volume), giving colorless crystals (33.4 g).

Next, m-chloroperoxybenzoic acid (41.3 g) was added to a cooled dichloromethane (330 mL) solution of the resultant crystals (33.4 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: dichloromethane) and recrystallization from a mixed solvent (dichloromethane/methanol=1/10 by volume), giving colorless crystals of the compound (1-1-29) (21.1 g).

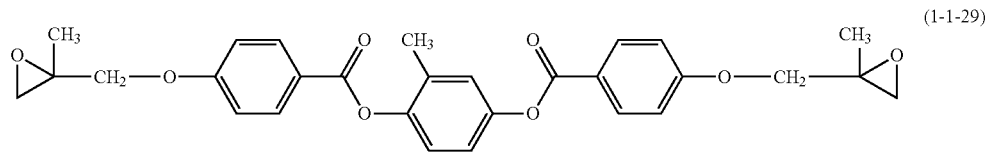 [SMILES: Cc1cc(OC(=O)c2ccc(OCC3(C)CO3)cc2)ccc1OC(=O)c1ccc(OCC2(C)CO2)cc1]
(1-1-29)

Phase transition temperature and NMR analysis data of the compound (1-1-29) are as follows: C, 153; (N, 136); I. $^1$H-NMR (CDCl$_3$; δ ppm): 8.18 (d, 2H), 8.15 (d, 2H), 7.17 (d, 1H), 7.13 (d, 1H), 7.10-7.06 (m, 1H), 7.03 (d, 2H), 7.01 (d, 2H), 4.17 (d, 2H), 4.15 (d, 2H), 4.03 (d, 2H), 4.01 (d, 2H), 2.91 (d, 2H), 2.78 (d, 2H), 2.24 (s, 3H) and 1.52 (s, 6H).

Example 6

Preparation of the Compound (1-1-30)

DCC (31.5 g) was added to a cooled mixture of the compound [H2] (30.0 g), methylhydroquinone (8.8 g), DMAP (3.6 g) and dichloromethane (300 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=16/1 by volume), giving colorless crystals (25.8 g).

Next, m-chloroperoxybenzoic acid (19.5 g) was added to a dichloromethane (260 mL) solution of the resultant crystals (25.8 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: a mixed solvent of toluene/ethyl acetate=4/1 by volume) and recrystallization from a mixed solvent (toluene/methanol=1/10 by volume), giving colorless crystals of the compound (1-1-30) (11.4 g).

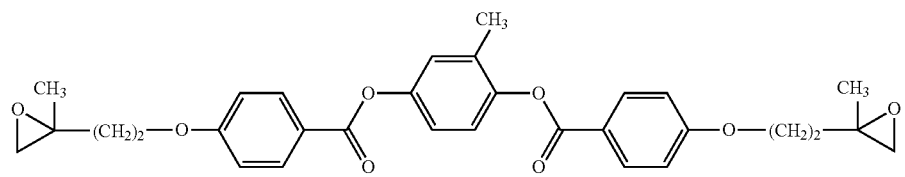

(1-1-30)

Phase transition temperature and NMR analysis data of the compound (1-1-30) are as follows: C, 69; N, 105; I. $^1$H-NMR (CDCl$_3$; δ ppm): 8.18 (d, 2H), 8.15 (d, 2H), 7.18 (d, 1H), 7.13 (d, 1H), 7.10-7.06 (m, 1H), 7.02 (d, 2H), 6.98 (d, 2H), 4.21-4.11 (m, 4H), 2.76 (d, 2H), 2.67 (d, 2H), 2.25 (s, 3H), 2.91-2.06 (m, 4H) and 1.43 (s, 6H).

Example 7

Preparation of the Compound (1-1-31)

First Step:

A mixture of 3-methyl-3-buten-1-ol (100.0 g), 1,4-dibromobutane (501.4 g), sodium hydroxide (232.2 g), tetrabutylammonium bromide (37.4 g), toluene (500 mL) and water (500 mL) was heated to reflux with stirring for 5 hours under an atmosphere of nitrogen. The organic phase was separated and washed sequentially with a saturated aqueous solution of sodium hydrogencarbonate and water, and then dried over anhydrous magnesium sulfate. The solvent was distilled off under reduced pressure and the residue was purified by means of column chromatography (silica gel; eluent: a mixed solvent of toluene/ethyl acetate=2/1 by volume), giving colorless oil (140.6 g).

Next, a mixture of the resultant oil (140.6 g), methyl 4-hydroxybenzoate (116.09 g), sodium hydroxide (25.4 g) and DMF (700 mL) was heated with stirring at 80° C. for 5 hours under an atmosphere of nitrogen. Toluene (500 mL) was added the mixture, separating an organic phase. The organic phase was washed sequentially with a saturated aqueous solution of sodium hydrogencarbonate and water, and the solvent was distilled off under reduced pressure. The residue was purified by means of column chromatography (silica gel; eluent: a mixed solvent of toluene/ethyl acetate=8/1 by volume), and the solvent was distilled off under reduced pressure from the effluent.

Next, methanol (350 mL), water (350 mL) and sodium hydroxide (25.4 g) were added to the residue, and the mixture was heated to reflux with stirring for 3 hours. The solvent was distilled off under reduced pressure, and 3N-hydrochloric acid (200 mL) and toluene (200 mL) were added to the residue, separating an organic phase. The organic phase was washed with water and the solvent was distilled off under reduced pressure. Recrystallization from heptane gave colorless crystals of the compound [H8] (33.7 g).

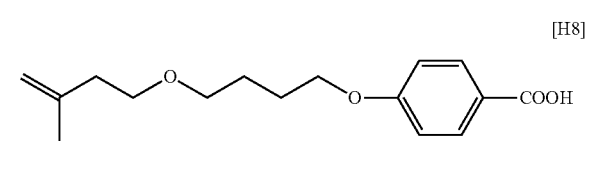 [SMILES: C=C(C)CCOCCCCOc1ccc(C(=O)O)cc1]

[H8]

NMR analysis data of the compound [H8] are as follows: $^1$H-NMR (CDCl$_3$; δ ppm): 8.06 (d, 2H), 6.93 (d, 2H), 4.76 (d, 2H), 4.06 (t, 2H), 3.55 (t, 2H), 3.51 (t, 2H), 2.31 (t, 2H), 1.94-1.86 (m, 2H) and 1.82-1.75 (m, 5H).

Second Step:

DCC (23.4 g) was added to a cooled mixture of the compound [H8] (30.0 g), methylhydroquinone (6.5 g), DMAP (2.6 g) and dichloromethane (300 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=16/1 by volume), giving colorless crystals (24.1 g).

Next, m-chloroperoxybenzoic acid (19.9 g) was added to a cooled dichloromethane (240 mL) solution of the resultant crystals (24.1 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: a mixed solvent of toluene/ethyl acetate=4/1 by volume) and recrystallization from a mixed solvent (toluene/methanol=1/10 by volume), giving colorless crystals of the compound (1-1-31) (14.5 g).

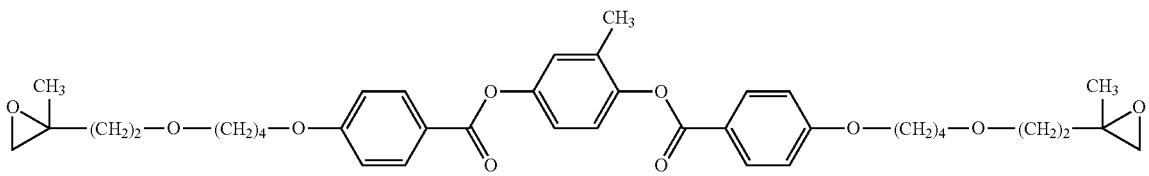

(1-1-31)

Phase transition temperature and NMR analysis data of the compound (1-1-31) are as follows: C, 63; N, 86; I. ¹H-NMR (CDCl₃; δ ppm): 8.18 (d, 2H), 8.15 (d, 2H), 7.17 (d, 1H), 7.13 (d, 1H), 7.10-7.07 (m, 1H), 6.99 (d, 2H), 6.97 (d, 2H), 4.12-4.06 (m, 4H), 3.59-3.48 (m, 8H), 2.69 (d, 2H), 2.61 (d, 2H), 2.24 (s, 3H), 1.94-1.75 (m, 12H) and 1.36 (s, 6H).

Example 8

Preparation of the Compound (1-1-6)

First Step:

A mixture of the compound [H5] (41.3 g), hydroquinone (30.5 g), potassium hydroxide (16.3 g) and methanol (120 mL) was heated to reflux with stirring for 4 hours under an atmosphere of nitrogen. The solvent was distilled off under reduced pressure, and 2N-hydrochloric acid was added to the residue for neutralization. Toluene was added to the mixture and an organic phase was separated. The organic phase was washed sequentially with a saturated aqueous solution of sodium hydrogencarbonate and water, and then dried over anhydrous magnesium sulfate. Distillation of the solvent under reduced pressure gave crude colorless oil [H9] (19.6 g).

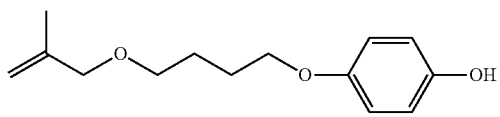

[H9]

Second Step:

DCC (18.2 g) was added to a cooled mixture of the compound [H9] (18.9 g), the compound [H6] (21.2 g), DMAP (0.98 g) and dichloromethane (200 mL) under an atmosphere of nitrogen and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=19/1 by volume), giving colorless crystals (21.5 g).

Next, m-chloroperoxybenzoic acid (26.0 g) was added to a cooled dichloromethane (220 mL) solution of the resultant crystals (21.5 g) under an atmosphere of nitrogen and the stirring was continued at room temperature for another 16 hours. Precipitated salts were filtered off under reduced pressure. The filtrate was washed sequentially with an aqueous 10% solution of sodium hydrogen sulfite, an aqueous 3% solution of sodium hydroxide and water and dried over anhydrous magnesium sulfate. The solvent was distilled off under reduced pressure and the residue was purified by means of column chromatography (silica gel; eluent: a mixed solvent of toluene/ethyl acetate=9/1 by volume) and recrystallization from a mixed solvent (ethyl acetate/ethanol=1/10 by volume), giving colorless crystals of the compound (1-1-6) (14.4 g).

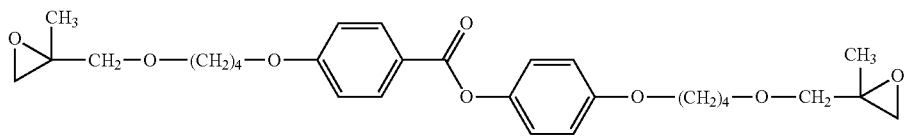

(1-1-6)

Phase transition temperature and NMR analysis data of the compound (1-1-6) are as follows; C, 20.3; (N, 20.1); I. ¹H-NMR (CDCl₃; δ ppm): 8.12 (d, 2H), 7.10 (d, 2H), 6.96 (d, 2H), 6.91 (d, 2H), 4.08-3.99 (m, 4H), 3.58-3.41 (m, 8H), 2.74 (d, 2H), 2.63 (d, 2H), 1.93-1.77 (m, 8H) and 1.38 (s, 6H).

Example 9

Preparation of the Compound (1-1-15)

First Step:

Sodium hydroxide (11.1 g) was added to a mixture of toluene (30 mL) and water (30 mL) under an atmosphere of nitrogen, and the stirring was continued at room temperature. To the mixture, β-methallyl alcohol (10.0 g), 1,6-dibromohexane (67.7 g) and tetrabutylammonium bromide (4.5 g) were added, and the mixture was heated to reflux with stirring for another 8 hours. After the reaction, an organic phase was separated, washed sequentially with a saturated aqueous solution of sodium hydrogencarbonate and 10% aqueous solution of sodium chloride, and then dried over anhydrous magnesium sulfate. After the organic phase had bee dried, the solvent was distilled off and the residue was purified by means of column chromatography (silica gel; eluent: toluene), giving colorless oil of the compound [H10] (14.1 g).

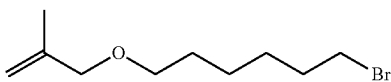

Second Step:

A mixture of the compound [H10] (14.1 g), methyl 4-hydroxybenzoate (10.0 g), potassium hydroxide (2.4 g) and DMF (N,N-dimethylformamide) (140 mL) was heated at 80° C. for 6 hours with stirring under an atmosphere of nitrogen. Precipitated salts were filtered off under reduced pressure. Toluene (150 mL) and water (150 mL) were added, separating an organic phase. The organic phase was washed sequentially with a saturated aqueous solution of sodium hydrogencarbonate and water, and the solvent was distilled off under reduced pressure. Next, methanol (100 mL), water (100 mL) and potassium hydroxide (2.4 g) were added to the residue, and the mixture was heated to reflux with stirring for another 3 hours. After the stirring, the solvent was distilled off under reduced pressure. 3N-hydrochloric acid (100 mL) and ethyl acetate (100 mL) was added to the residue, separating an organic phase. The organic phase was washed with water and the solvent was distilled off under reduced pressure. The residue was recrystallized from heptane, giving colorless crystals of the compound [H11] (10.5 g).

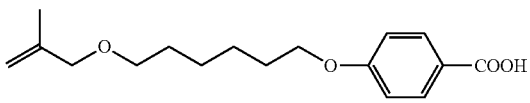

NMR analysis data of the compound [H11] are as follows: $^1$H-NMR (CDCl$_3$; δ ppm): 8.05 (d, 2H), 6.96 (d, 2H), 4.93 (d, 2H), 4.03 (t, 2H), 3.88 (s, 2H), 3.42 (t, 2H), 1.88-1.79 (m, 2H), 1.73 (s, 3H), 1.68-1.60 (m, 2H) and 1.56-1.42 (m, 4H).

Third Step:

DCC (7.4 g) was added to a cooled mixture of the compound [H11] (10.0 g), methoxyhydroquinone (2.4 g), DMAP (0.84 g) and dichloromethane (100 mL) under an atmosphere of nitrogen, and the stirring was continued at room temperature for another 16 hours. Precipitates were filtered off under reduced pressure and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=5/1 by volume) and recrystallization from a mixed solvent of toluene/methanol (1/10 by volume), giving colorless crystals of a compound (7.6 g).

Next, m-chloroperoxybenzoic acid (6.4 g) was added to a cooled mixture of the resultant compound (7.5 g) and dichloromethane (75 mL) under an atmosphere of nitrogen, and the stirring was continued at room temperature for another 16 hours. Precipitates were filtered off under reduced pressure. The filtrate was washed sequentially with an aqueous 10% solution of sodium hydrogen sulfite, an aqueous 3% solution of sodium hydroxide and water, and then dried over anhydrous magnesium sulfate. The solvent was distilled off under reduced pressure and the residue was purified by means of column chromatography (silica gel; eluent: a mixed solvent of toluene/ethyl acetate=2/1 by volume) and recrystallization from methanol, giving colorless crystals of the compound (1-1-15) (4.5 g).

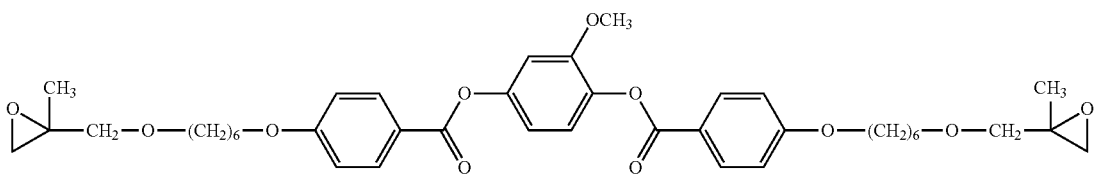

Phase transition temperature and NMR analysis data of the compound (1-1-15) are as follows; C, 52; I. $^1$H-NMR (CDCl$_3$; δ ppm): 8.16 (d, 2H), 8.13 (d, 2H), 7.17 (d, 1H), 6.98 (d, 2H), 6.96 (d, 2H), 6.90 (d, 1H), 6.84 (d, 1H), 6.83 (d, 1H), 4.06-4.03 (m, 4H), 3.81 (s, 3H), 3.59-3.47 (m, 6H), 3.41-3.37 (d, 2H), 2.74 (d, 2H), 2.63 (d, 2H), 1.85-1.81 (m, 4H), 1.66-1.60 (m, 6H), 1.53-1.45 (m, 8H) and 1.36 (s, 6H).

Example 10

Preparation of the Compound (1-1-25)

DCC (7.4 g) was added to a cooled mixture of the compound [H11] (10.0 g), 4,4'-biphenol (3.2 g), DMAP (0.83 g) and dichloromethane (100 mL) under an atmosphere of nitrogen, and the stirring was continued at room temperature for another 16 hours. Precipitates were filtered off under reduced pressure and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=5/1 by volume) and recrystallization from ethyl acetate, giving colorless crystals of a compound (2.8 g).

Next, m-chloroperoxybenzoic acid (1.4 g) was added to a cooled mixture of the resultant compound (2.8 g) and dichloromethane (30 mL) under an atmosphere of nitrogen, and the stirring was continued at room temperature for another 16 hours. Precipitates was filtered off under reduced pressure and the filtrate was washed sequentially with an aqueous 10% solution of sodium hydrogen sulfite, an aqueous 3% solution of sodium hydroxide and water, and then dried over anhydrous magnesium sulfate. The solvent was distilled off under reduced pressure and the residue was purified by means of column chromatography (silica gel; eluent: a mixed solvent of toluene/ethyl acetate=2/1 by volume) and recrystallization from toluene, giving colorless crystals of the compound (1-1-25) (4.5 g).

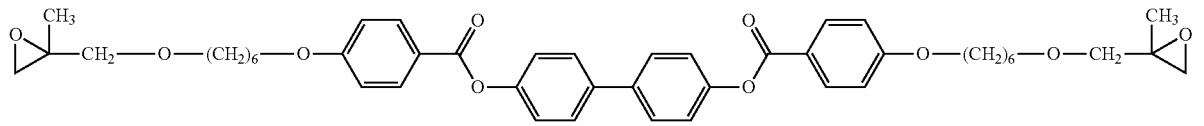

(1-1-25)

Phase transition temperature and NMR analysis data of the compound (1-1-25) are as follows; C, 128; Sm, 174; N, 242; I. $^1$H-NMR (CDCl$_3$; δ ppm): 8.16 (d, 4H), 7.63 (d, 4H), 7.28 (d, 4H), 6.98 (d, 4H), 4.05 (t, 4H), 3.55 (d, 2H), 3.53-3.45 (m, 4H), 3.39 (d, 2H), 2.74 (d, 2H), 2.63 (d, 2H), 1.88-1.81 (m, 4H), 1.67-1.61 (m, 4H), 1.56-1.42 (m, 8H), 1.38 (s, 6H).

Example 11

Preparation of the Compound (1-2-1)

First Step:

A mixture of the compound [H1] (19.5 g), 4-(4-pentylcyclohexyl)phenol (20.0 g), potassium hydroxide (5.0 g) and Solmix (100 mL) was heated to reflux with stirring for another 6 hours under an atmosphere of nitrogen. The solvent was distilled off under reduced pressure and water (100 mL) and toluene (100 mL) were added to the residue, separating an organic phase. The organic phase was washed sequentially with a saturated aqueous solution of sodium hydrogencarbonate and water, and then dried over anhydrous magnesium sulfate. The solvent was distilled off under reduced pressure and the residue was purified by means of column chromatography (silica gel; eluent: toluene), giving colorless oil of the compound [H12] (20.2 g).

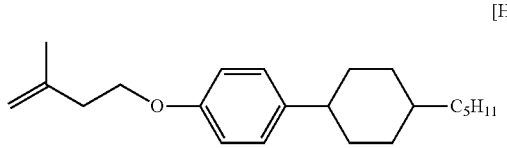

[H12]

NMR analysis data of the compound [H12] are as follows; $^1$H-NMR (CDCl$_3$; δ ppm): 7.12 (d, 2H), 6.83 (d, 2H), 4.83 (s, 1H), 4.79 (s, 1H), 4.05 (t, 2H), 2.47 (t, 2H), 2.42-2.37 (m, 1H), 1.87-1.83 (m, 4H), 1.79 (s, 1H), 1.44-1.33 (m, 1H), 1.31-1.18 (m, 10H), 1.06-1.01 (m, 2H) and 0.95 (t, 3H).

Second Step:

m-Chloroperoxybenzoic acid (18.5 g) was added to a cooled mixture of the resultant compound [H12] (20.0 g) and dichloromethane (200 mL) under an atmosphere of nitrogen, and the stirring was continued at room temperature for another 16 hours. Precipitates were filtered off under reduced pressure. The filtrate was washed sequentially with an aqueous 10% solution of sodium hydrogen sulfite, an aqueous 3% solution of sodium hydroxide and water, and then dried over anhydrous magnesium sulfate. The solvent was distilled off under reduced pressure and the residue was purified by means of column chromatography (silica gel; eluent: a mixed solvent of toluene/ethyl acetate=9/1 by volume) and recrystallization from a mixed solvent (ethyl acetate/methanol=1/20 by volume), giving colorless crystals of the compound (1-2-1) (10.8 g).

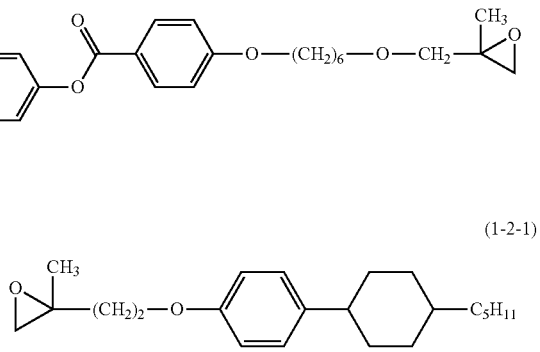

(1-2-1)

Phase transition temperature and NMR analysis data of the compound (1-2-1) are as follows; C, 25; I. $^1$H-NMR (CDCl$_3$; δ ppm): 7.14 (d, 2H), 6.84 (d, 2H), 4.06 (m, 2H), 2.77 (d, 1H), 2.65 (d, 1H), 2.45-2.40 (m, 1H), 2.14-2.10 (m, 1H), 2.05-2.00 (m, 1H), 1.87 (m, 4H), 1.44-1.39 (m, 4H), 1.35-1.21 (m, 10H), 1.08-1.03 (m, 2H) and 0.92 (t, 3H).

Example 12

Preparation of the Compound (1-2-3)

First Step:

DCC (7.4 g) was added to a cooled mixture of the compound [H11] (10.0 g), 3-fluoro-4-trifluoromethoxyphenol (6.7 g), DMAP (0.83 g) and dichloromethane (100 mL) under an atmosphere of nitrogen, and the stirring was continued at room temperature for another 16 hours. Precipitates were filtered off under reduced pressure, and water was added to the filtrate, separating an organic phase. The organic phase was washed sequentially with 2N-hydrochloric acid and water, and then dried over anhydrous magnesium sulfate. The solvent was distilled off under reduced pressure and the residue was purified by means of column chromatography (silica gel; eluent: a mixed solvent of toluene/ethyl acetate=8/1 by volume) and recrystallization from methanol, giving colorless crystals of a compound (12.7 g).

Next, m-chloroperoxybenzoic acid (7.8 g) was added to a cooled mixture of the resultant compound (12.6 g) and dichloromethane (125 mL) under an atmosphere of nitrogen, and the stirring was continued at room temperature for another 16 hours. Precipitates were filtered off under reduced pressure. The filtrate was washed sequentially with an aqueous 10% solution of sodium hydrogen sulfite, an aqueous 3% solution of sodium hydroxide and water, and then dried over anhydrous magnesium sulfate. The solvent was distilled off under reduced pressure and the residue was purified by means of column chromatography (silica gel; eluent: a mixed solvent of toluene/ethyl acetate=5/1 by volume) and recrystallization from methanol, giving colorless crystals of the compound (1-2-3) (10.2 g).

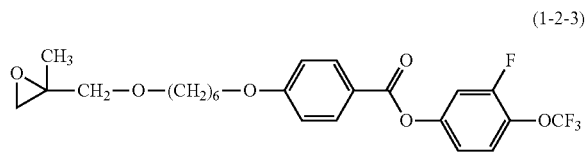

(1-2-3)

Phase transition temperature and NMR analysis data of the compound (1-2-3) are as follows; C, 26; I. $^1$H-NMR (CDCl$_3$; δ ppm): 8.10 (d, 2H), 7.38 (t, 1H), 7.15 (dd, 1H), 7.05 (m, 1H), 6.98 (d, 2H), 4.05 (t, 2H), 3.56-3.52 (d, 1H), 3.52-3.46 (m, 2H), 3.39-3.36 (d, 1H), 2.74 (d, 1H), 2.63 (d, 1H), 1.81 (m, 2H), 1.66-1.60 (m, 2H), 1.53-1.51 (m, 4H) and 1.38 (s, 3H).

Component compounds, excluding the compound (1), of the following polymerizable liquid crystal compositions used in Examples are shown below. These compounds can be synthesized by means of a combination of techniques in synthetic organic chemistry. Methods for an introduction of objective terminal groups, rings and bonding groups to starting materials are described in books such as Houben-Wyle, Methods of Organic Chemistry, Georg Thieme Verlag, Stuttgart; Organic syntheses, John Wily & Sons, Inc.; Organic Reactions, John Wily & Sons Inc.; Comprehensive Organic Synthesis, Pergamon Press; and New Experimental Chemistry Course (Shin Jikken Kagaku Kouza, in Japanese title), Maruzen Co., LTD.

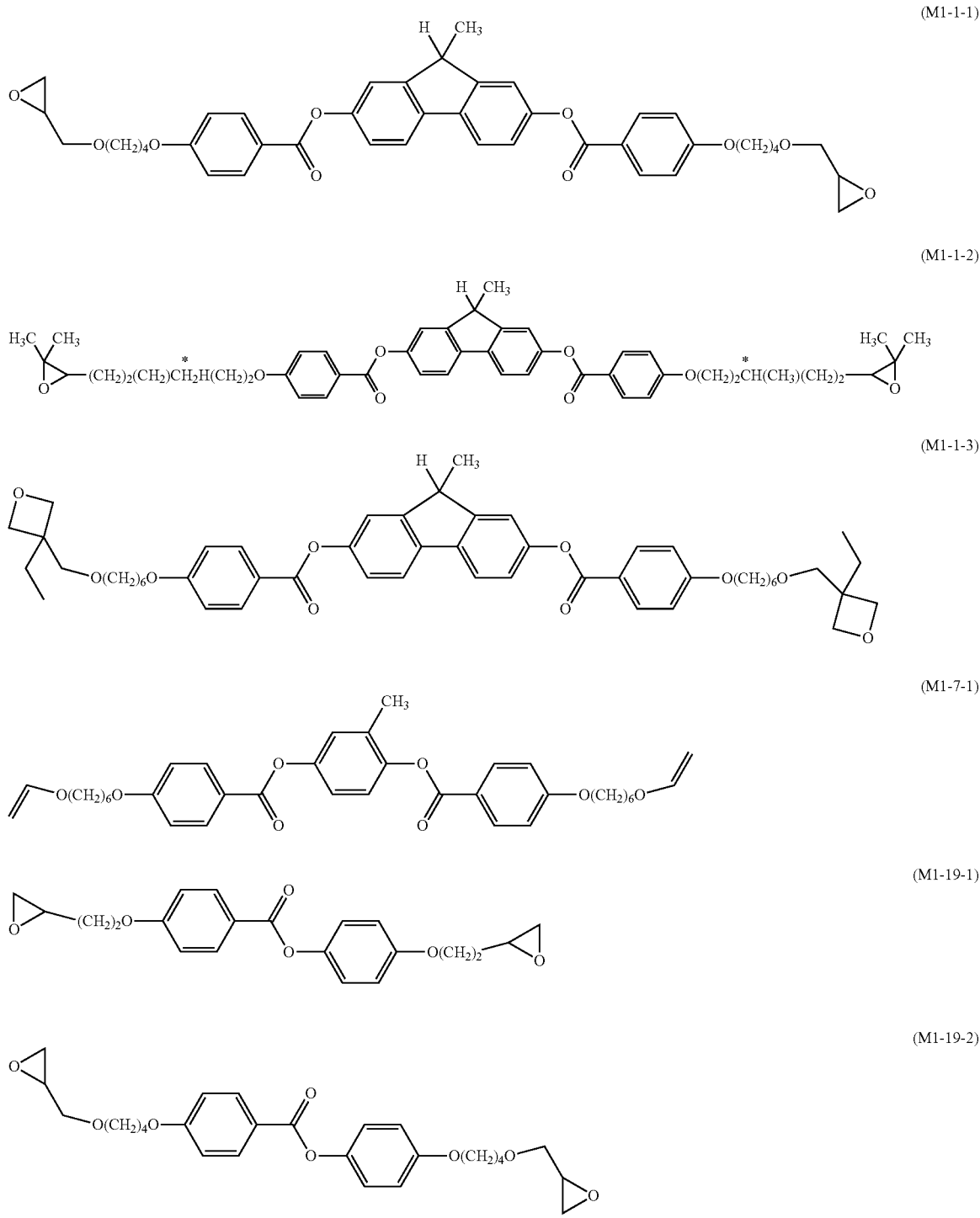

-continued

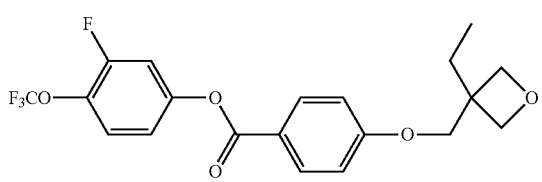
(M2-13-1)

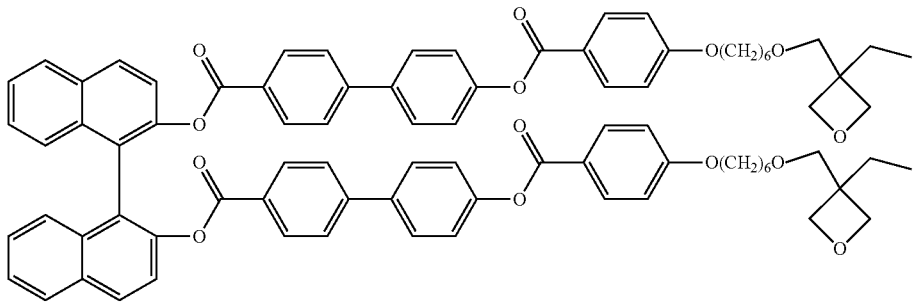
(6-8-1)

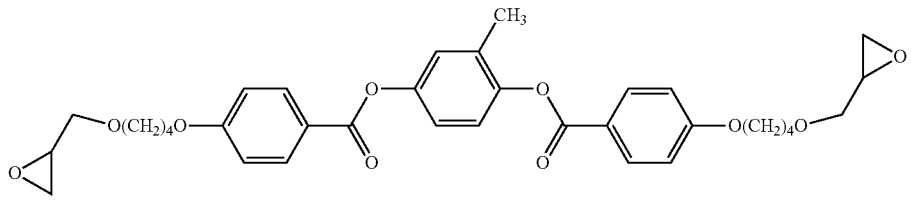
(M1-7-2)

Concrete methods for synthesizing the compounds described above are explained. The compound (M1-1-1) and the compound (M1-1-3) are prepared by the method described in JP 2005-60373 A. The compound (M1-1-2) is described in JP 2005-097281 A. The compound (M1-7-1) is described in Polymer, 34(8), 1736-1740 (1993). The compound (M1-19-1) and the compound (M1-19-2) are described in Macromolecules, 26, 1244-1247 (1993). The compound (M2-13-1) is described in JP 2005-320317 A. The compound (6-8-1) is described in JP 2005-263778 A. The compound (M1-7-2) can be prepared in a manner similar to that for the compound (M1-1-1) using methylhydroquinone instead of 9-methyl-2,7-dihydroxyfluorene.

Example 13

A mixture of the compound (1-1-14)/a polymerization initiator CPI-110P (San-Apro Ltd.) in a weight ratio of 100/0.02 was dissolved in cyclopentanone, and a solution in which the concentration of the compounds was 20% by weight was prepared. The solution was spread on an aluminum pan, which was placed on a hot plate heated at 80° C. for 30 minutes, and the solvent was evaporated. A large exothermic peak and a quick arrival to the top of the peak were observed when the sample on the aluminum pan was irradiated with ultraviolet light (365 nm, 15 mW/cm$^2$) under a flow of dried air by use of a photochemical reaction calorimeter Model PDC121 (Seiko Instruments Inc.).

Comparative Example 1

A sample was prepared in the same way as described in Example 13 except for replacement of the compound (1-1-14) with the compound (M1-7-2). A slow arrival to the top of the peak was observed when heat of reaction was measured by the method described in Example 13.

Example 14

A mixture of the compound (1-1-14) and the compound (M1-19-1) in a weight ratio of 70/30 was dissolved in a mixed solvent of PGMEA/MMP=9/1 by volume, and a solution in which the concentration of the compounds was 30% by weight was prepared. Deposition of crystals and so forth were not observed when the solution was allowed to stand for more than 3 days at room temperature. Incidentally, PGMEA and MMP stand for propylene glycol monoethyl ether acetate and methyl 3-methoxypropionate, respectively.

Comparative Example 2

A solution was prepared by the method described in Example 14 except for replacement of the compound (1-1-14) with the compound (M1-7-2). Crystals were deposited for 1 hour when the solution was allowed to stand at room temperature.

Example 15

A mixture of the compound (1-1-14)/the compound (1-2-12) in a weight ratio of 80/20 was dissolved in n-butyl acetate, and a solution in which the concentration of the compounds was 20% by weight was prepared. A silicone-based nonionic surfactant BYK-333 (BYK Additives & Instruments) in a weight ratio of 0.001 and a polymerization initiator CPI-110P in a weight ratio of 0.02 were added to the solution. The resultant solution was applied with a spin-coater to a glass substrate having a rubbed polyimide alignment film. The glass substrate was placed on a hot plate at 70° C. for 120 seconds, evaporating the solvent and forming a paint film. Then, the paint film was photopolymerized in air at room temperature for 30 seconds, with irradiance of 30 mW/cm$^2$ (a central wavelength at 365 nm) using a 250 W-ultra high-pressure mercury lamp. The formed thin film (optically anisotropic film) was fixed in a homogeneous orientation and exhibited optical properties of an A-plate.

Example 16

A mixture of the compound (1-1-14)/the compound (M1-19-1)/the compound (M1-1-3) in a weight ratio of 60/30/10 was dissolved in a mixed solvent of PGMEA/cyclopentanone=1/1 by volume, and a solution in which the concentration of the compounds was 20% by weight was prepared. A fluorine-based nonionic surfactant FTX-218 (Neos Company Limited) in a weight ratio of 0.002 and a polymerization initiator CPI-110P in a weight ratio of 0.02 were added to the solution. The thin film (optically anisotropic film) formed from the resultant solution according to the method described in Example 15 exhibited optical properties of an A-plate.

Example 17

A mixture of the compound (1-1-2)/the compound (1-1-30)/the compound (M1-19-2) in a weight ratio of 30/40/30 was dissolved in a mixed solvent of PGMEA/MMP=1/1 by volume, and a solution in which the concentration of the compounds was 20% by weight was prepared. A hydrocarbon-based nonionic surfactant Polyflow No. 75 (Kyoeisha Chemical Co., Ltd.) in a weight ratio of 0.002 and a polymerization initiator CPI-110P in a weight ratio of 0.02 were added. The thin film (optically anisotropic film) formed from the resultant solution according to the method described in Example 15 exhibited optical properties of an A-plate.

Example 18

A mixture of the compound (1-1-14)/the compound (M1-7-1)/the compound (M1-1-3) in a weight ratio of 80/10/10 was dissolved in cyclopentanone, and a solution in which the concentration of the compounds was 20% by weight was prepared. A fluorine-based nonionic surfactant FTX-218 in a weight ratio of 0.002 and a polymerization initiator DTS-102 (Midori Kagaku Co., Ltd.) in a weight ratio of 0.02 were added to the solution. The thin film (optically anisotropic film) formed from the resultant solution according to the method described in Example 15 exhibited optical properties of an A-plate.

Example 19

A mixture of the compound (1-1-2)/the compound (M1-19-1)/the compound (M1-1-3) in a weight ratio of 10/85/5 was dissolved in a mixed solvent of PGMEA/cyclopentanone=1/1 by volume, and a solution in which the concentration of the compounds was 20% by weight was prepared. A fluorine-based nonionic surfactant FTX-218 (Neos Company Limited) in a weight ratio of 0.002 and a polymerization initiator CPI-110P in a weight ratio of 0.02 were added to the solution. The thin film (optically anisotropic film) formed from the resultant solution according to the method described in Example 15 exhibited optical properties of an A-plate.

Example 20

A mixture of the compound (1-1-4)/the compound (M1-19-1)/the compound (M1-1-1) in a weight ratio of 30/65/5 was dissolved in a mixed solvent of PGMEA/cyclopentanone=1/1 by volume, and a solution in which the concentration of the compounds was 20% by weight was prepared. A fluorine-based nonionic surfactant FTX-218 (Neos Company Limited) in a weight ratio of 0.002 and a polymerization initiator CPI-110P in a weight ratio of 0.02 were added to the solution. The thin film (optically anisotropic film) formed from the resultant solution according to the method described in Example 15 exhibited optical properties of an A-plate.

Example 21

A mixture of the compound (1-1-2)/the compound (1-1-30)/the compound (M2-13-1) in a weight ratio of 35/30/35 was dissolved in a mixed solvent of PGMEA/MMP=9/1 by volume, and a solution in which the concentration of the compounds was 20% by weight was prepared. A polymerization initiator CPI-110P in a weight ratio of 0.02 was added to the solution. The resultant solution was applied to a glass substrate with a spin-coater, giving a thin film (optically anisotropic film). The glass substrate was placed on a hot plate at 70° C. for 120 seconds, evaporating the solvent and forming a paint film. Then, the paint film was polymerized in air at room temperature for 30 seconds, with irradiance of 30 mW/cm$^2$ (a central wavelength at 365 nm) using a 250 W-ultra high-pressure mercury lamp. The formed thin film (optically anisotropic film) was fixed in homeotropic orientation and exhibited optical properties of a C-plate.

Example 22

A mixture of the compound (1-1-4)/the compound (1-1-14)/the compound (M1-1-1)/the compound (6-8-1) in a weight ratio of 15/60/15/10 was dissolved in a mixed solvent of PGMEA/cyclopentanone=3/7 by volume, and a solution in which the concentration of the compounds was 20% by weight was prepared. A fluorine-based nonionic surfactant FTX-218 in a weight ratio of 0.002 and a polymerization initiator CPI-110P in a weight ratio of 0.02 were added to the solution. The thin film (optically anisotropic film) formed from the resultant solution according to the method described in Example 15 exhibited optical properties of a negative C-plate.

Example 23

A mixture of the compound (1-1-14)/the compound (1-1-6)/the compound (M1-1-2) in a weight ratio of 40/30/30 was dissolved in methyl ethyl ketone, and a solution in which the concentration of the compounds was 20% by weight was prepared. A fluorine-based nonionic surfactant FTX-218 in a weight ratio of 0.002 and a polymerization initiator CPI-110P in a weight ratio of 0.02 were added to the solution. The thin film (optically anisotropic film) formed from the resultant solution according to the method described in Example 15 exhibited optical properties of selective reflection of visible light.

Example 24

A mixture of the compound (1-1-30)/the compound (1-2-12)/the compound (M2-13-1) in a weight ratio of 65/20/15 was dissolved in toluene, and a solution in which the concentration of the compounds was 20% by weight was prepared. A polymerization initiator DTS-102 in a weight ratio of 0.02 was added to the solution. The thin film (optically anisotropic film) formed from the resultant solution according to the method described in Example 15 exhibited optical properties of an O-plate.

APPLICABILITY IN INDUSTRY

The compound of the invention can be used as a polymerizable liquid crystal compound and can be used for a component of the polymerizable liquid crystal composition. The polymer of the invention can be utilized, for example, for an element of a liquid crystal display device, such as an optical retardation plate, a polarizer, a selective reflection film, a brightness enhancement film and a viewing angle-compensation film.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A polymerizable liquid crystal compound represented by formula (1-1) or formula (1-2):

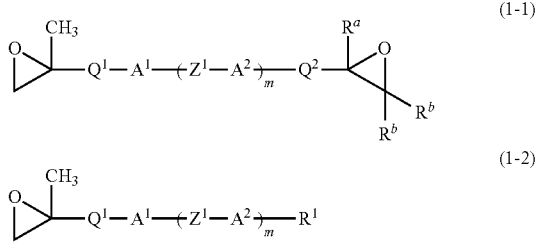

wherein $A^1$ and $A^2$ are each independently 1,4-cyclohexylene, 1,4-phenylene, pyridine-2,5-diyl, pyrimidine-2,5-diyl, naphthalene-2,6-diyl, tetrahydronaphthalene-2,6-diyl, fluorene-2,7-diyl, 1,3-dioxane-2,5-diyl, triptycene-1,4-diyl or phenylnorbornene-1,4-diyl, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl; $Z^1$ is independently a single bond, —O—, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—; m is an integer from 1 to 5, and when m is 2 or more, arbitrary two of $Z^1$ may be the same bonding groups or different groups and arbitrary two of $A^2$ may be the same rings or different rings; $Q^1$ and $Q^2$ are each independently alkylene having 1 to 20 carbons, and in the alkylene, arbitrary hydrogen may be replaced by fluorine or chlorine, and arbitrary —CH$_2$— may be replaced by —O—, —COO—, —OCO—, —CH=CH— or —C≡C—; $R^1$ is hydrogen, fluorine, chlorine, cyano, trifluoromethyl, trifluoromethoxy, alkyl having 1 to 20 carbons or alkoxy having 1 to 20 carbons; $R^a$ is hydrogen, halogen or alkyl having 1 to 5 carbons; and $R^b$ is independently hydrogen, halogen or alkyl having 1 to 5 carbons.

2. The polymerizable liquid crystal compound according to claim 1, wherein $A^1$ and $A^2$ are each independently 1,4-cyclohexylene, 1,4-phenylene, naphthalene-2,6-diyl or fluorene-2,7-diyl, and in the 1,4-phenylene and fluorene-2,7-diyl, arbitrary one or two hydrogens may be replaced by fluorine, methyl or trifluoromethyl.

3. The polymerizable liquid crystal compound according to claim 1, wherein in formula (1-1), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ and $Q^2$ are each independently alkylene having 2 to 15 carbons, and in the alkylene, arbitrary —CH$_2$— may be replaced by —O—, —COO— or —OCO—; and $R^a$ and $R^b$ are hydrogen.

4. The polymerizable liquid crystal compound according to claim 1, wherein in formula (1-1), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ and $Q^2$ are each independently alkylene having 2 to 15 carbons, and in the alkylene, arbitrary —CH$_2$— may be replaced by —O—, —COO— or —OCO—; $R^a$ is methyl; and $R^b$ is hydrogen.

5. The polymerizable liquid crystal compound according to claim 1, wherein in formula (1-2), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ is alkylene having 2 to 15 carbons, and in the alkylene, arbitrary —CH$_2$— may be replaced by —O—, —COO— or —OCO—; and $R^1$ is hydrogen, fluorine, cyano, trifluoromethyl, trifluoromethoxy, alkyl having 1 to 8 carbons or alkoxy having 1 to 8 carbons.

6. A polymerizable liquid crystal composition comprising at least one of compounds according to claim 1.

7. A polymerizable liquid crystal composition comprising at least one polymerizable liquid crystal compound selected from the group of compounds represented by formula (1-1) and formula (1-2), and at least one compound selected from the group of compounds represented by formula (M1) and formula (M2):

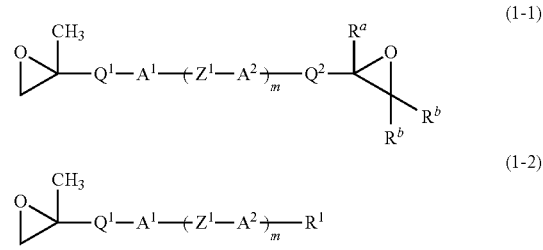

wherein $A^1$ and $A^2$ are each independently 1,4-cyclohexylene, 1,4-phenylene, pyridine-2,5-diyl, pyrimidine-2,5-diyl, naphthalene-2,6-diyl, tetrahydronaphthalene-2,6-diyl, fluorene-2,7-diyl, 1,3-dioxane-2,5-diyl, triptycene-1,4-diyl or phenylnorbornene-1,4-diyl, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl;

$Z^1$ is independently a single bond, —O—, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—;

m is an integer from 1 to 5, and when m is 2 or more, arbitrary two of $Z^1$ may be the same bonding groups or different bonding groups and arbitrary two of $A^2$ may be the same rings or different rings;

$Q^1$ and $Q^2$ are each independently alkylene having 1 to 20 carbons, and in the alkylene, arbitrary hydrogen may be replaced by fluorine or chlorine, and arbitrary —$CH_2$— may be replaced by —O—, —COO—, —OCO—, —CH=CH— or —C≡C—;

$R^1$ is hydrogen, fluorine, chlorine, cyano, trifluoromethyl, trifluoromethoxy, alkyl having 1 to 20 carbons or alkoxy having 1 to 20 carbons;

$R^a$ is hydrogen, halogen or alkyl having 1 to 5 carbons; and $R^b$ is independently hydrogen, halogen or alkyl having 1 to 5 carbons; and

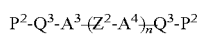 (M1)

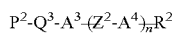 (M2)

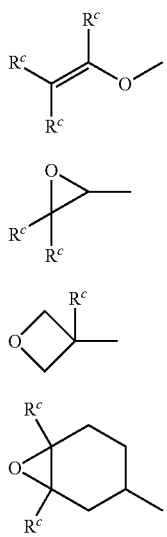

(p-1)

(p-2)

(p-3)

(p-4)

wherein $A^3$ and $A^4$ are each independently 1,4-cyclohexylene, 1,4-phenylene, naphthalene-2,6-diyl, fluorene-2,7-diyl, 1,3-dioxane-2,5-diyl, triptycene-1,4-diyl or phenylnorbornene-1,4-diyl, and in the 1,4-phenylene and fluorene-2,7-diyl, arbitrary hydrogen may be replaced by fluorine or chlorine, and arbitrary one or two hydrogens may be replaced by cyano, methyl, ethyl, methoxy, hydroxy, formyl, acetoxy, acetyl, trifluoroacetyl, difluoromethyl or trifluoromethyl;

$Z^2$ is independently a single bond, —O—, —COO—, —OCO—, —CH=CH—COO—, —OCO—CH=CH—, —OCO—$CH_2CH_2$—, —$CH_2CH_2$—COO—, —$C≡C$—COO—, —OCO—C≡C—, —$CH_2$O—, —O$CH_2$—, —$CF_2$O—, —O$CF_2$—, —CONH—, —NHCO—, —$(CH_2)_4$—, —$CH_2CH_2$—, —$CF_2CF_2$—, —CH=CH—, —CF=CF— or —C≡C—;

n is an integer from 1 to 5, and when n is 2 or more, arbitrary two of $Z^2$ may be the same bonding groups or different bonding groups and arbitrary two of $A^4$ may be the same rings or different rings;

$Q^3$ is independently alkylene having 2 to 20 carbons, and in the alkylene, arbitrary hydrogen may be replaced by fluorine or chlorine, and arbitrary —$CH_2$— may be replaced by —O—, —COO—, —OCO—, —CH=CH— or —C≡C—;

$R^2$ is hydrogen, fluorine, chlorine, cyano, trifluoromethyl, trifluoromethoxy, alkyl having 1 to 20 carbons or alkoxy having 1 to 20 carbons; and $P^2$ is independently any one of polymerizable groups represented by formula (p-1) to formula (p-4), and $R^c$ is independently hydrogen, halogen or alkyl having 1 to 5 carbons.

8. The polymerizable liquid crystal composition according to claim 7, wherein in formula (1-1) and formula (1-2), $A^1$ and $A^2$ are each independently 1,4-cyclohexylene, 1,4-phenylene, naphthalene-2,6-diyl or fluorene-2,7-diyl, and in the 1,4-phenylene and fluorene-2,7-diyl, arbitrary hydrogen may be replaced by fluorine, methyl or trifluoromethyl; $Z^1$ is independently a single bond, —COO—, —OCO—, —CH=CH—COO—, —$CH_2CH_2$—COO—, —OCO—CH=CH—, —OCO—$CH_2CH_2$—, —$CH_2CH_2$— or —C≡C—; and m is an integer from 1 to 3, in formula (M1) and formula (M2), $A^3$ and $A^4$ are each independently 1,4-cyclohexylene or 1,4-phenylene, and in the 1,4-phenylene, arbitrary one or two hydrogens may be replaced by fluorine, methyl or trifluoromethyl; $Z^2$ is independently —O—, —COO— or —OCO—; n is an integer from 1 to 3; $Q^3$ is independently alkylene having 2 to 20 carbons, and in the alkylene, arbitrary hydrogen may be replaced by fluorine or chlorine, and arbitrary —$CH_2$— may be replaced by —O—, —COO— or —OCO—; $R^2$ is hydrogen, fluorine, cyano, trifluoromethyl, trifluoromethoxy, alkyl having 1 to 8 carbons or alkoxy having 1 to 8 carbons; and $P^2$ is independently any one of polymerizable groups represented by formula (p-1) to formula (p-4), and $R^c$ is independently hydrogen, methyl or ethyl.

9. The polymerizable liquid crystal composition according to claim 7, wherein in formula (1-1) and formula (1-2), $A^1$ and $A^2$ are each independently 1,4-cyclohexylene or 1,4-phenylene, and in the 1,4-phenylene, arbitrary one or two hydrogens may be replaced by fluorine or methyl; $Z^1$ is independently a single bond, —COO— or —OCO—; m is 1 or 2; $Q^1$ and $Q^2$ are each independently alkylene having 2 to 15 carbons, and in the alkylene, arbitrary —$CH_2$— may be replaced by —O—, —COO— or —OCO—; $R^1$ is hydrogen, fluorine, cyano, trifluoromethyl, trifluoromethoxy, alkyl having 1 to 8 carbons or alkoxy having 1 to 8 carbons; $R^a$ is hydrogen or methyl; and $R^b$ is independently hydrogen, methyl or ethyl, in formula (M1) and formula (M2), $A^3$ and $A^4$ are each independently 1,4-cyclohexylene or 1,4-phenylene, and in the 1,4-phenylene, arbitrary one or two hydrogens may be replaced by fluorine, methyl or trifluoromethyl; $Z^2$ is independently —O—, —COO— or —OCO—; n is 1 or 2; $Q^3$ is independently alkylene having 2 to 15 carbons, and in the alkylene, arbitrary hydrogen may be replaced by fluorine or chlorine, and arbitrary —$CH_2$— may be replaced by —O—, —COO— or —OCO—; $R^2$ is hydrogen, fluorine, cyano, trifluoromethyl, trifluoromethoxy, alkyl having 1 to 8 carbons or alkoxy having 1 to 8 carbons; and $P^2$ is independently any one of polymerizable groups represented by formula (p-1) to formula (p-4), and $R^c$ is independently hydrogen, methyl or ethyl.

10. The polymerizable liquid crystal composition according to claim 7, wherein the ratio of a polymerizable liquid crystal compound selected from the group of compounds represented by formula (1-1) and formula (1-2) is in the range of approximately 5% to approximately 95% by weight, and the ratio of a compound selected from the group of compounds represented by formula (M1) and formula (M2) is in the range of approximately 5% to approximately 95% by weight, based on the total weight of compounds represented by formula (1-1), formula (1-2), formula (M1) and formula (M2).

11. The polymerizable liquid crystal composition according to claim 10, wherein the ratio of a polymerizable liquid crystal compound selected from the group of compounds represented by formula (1-1) and formula (1-2) is in the range of approximately 30% to approximately 90% by weight, and the ratio of a compound selected from the group of compounds represented by formula (M1) and formula (M2) is in the range of approximately 10% to approximately 70% by weight, based on the total weight of compounds represented by formula (1-1), formula (1-2), formula (M1) and formula (M2).

12. The polymerizable liquid crystal composition according to claim 10, wherein the ratio of a polymerizable liquid crystal compound selected from the group of compounds represented by formula (1-1) and formula (1-2) is in the range of approximately 40% to approximately 85% by weight, and the ratio of a compound selected from the group of compounds represented by formula (M1) and formula (M2) is in the range of approximately 15% to approximately 60% by weight, based on the total weight of compounds represented by formula (1-1), formula (1-2), formula (M1) and formula (M2).

13. The polymerizable liquid crystal composition according to claim 7, further comprising another polymerizable compound that is different from compounds represented by formula (1-1), formula (1-2), formula (M1) and formula (M2).

14. The polymerizable liquid crystal composition according to claim 7, further comprising a polymerizable and optically active compound.

15. The polymerizable liquid crystal composition according to claim 7, further comprising a non-polymerizable liquid crystal compound.

16. The polymerizable liquid crystal composition according to claim 7, further comprising a non-polymerizable and optically active compound.

17. A polymer formed by the polymerization of at least one liquid crystal compound according to claim 1.

18. A polymer formed by the polymerization of the liquid crystal composition according to claim 6.

19. An optically anisotropic film formed by the polymerization of the polymerizable liquid crystal compound according to claim 1.

20. An optically anisotropic film formed by the polymerization of the polymerizable liquid crystal composition according to claim 6.

21. The optically anisotropic film according to claim 19, wherein it has optical properties of an A-plate.

22. The optically anisotropic film according to claim 20, wherein it has optical properties of an A-plate.

23. The optically anisotropic film according to claim 19, wherein it has optical properties of a C-plate.

24. The optically anisotropic film according to claim 20, wherein it has optical properties of a C-plate.

25. The optically anisotropic film according to claim 19, wherein it has optical properties of a negative C-plate.

26. The optically anisotropic film according to claim 20, wherein it has optical properties of a negative C-plate.

27. An optically anisotropic film according to claim 19, wherein it has optical properties of an O-plate.

28. An optically anisotropic film according to claim 20, wherein it has optical properties of an O-plate.

29. A liquid crystal display device containing the optically anisotropic film according to claim 19.

30. A liquid crystal display device containing the optically anisotropic film according to claim 20.

* * * * *